United States Patent [19]

Yamada et al.

[11] Patent Number: 5,617,537
[45] Date of Patent: Apr. 1, 1997

[54] MESSAGE PASSING SYSTEM FOR DISTRIBUTED SHARED MEMORY MULTIPROCESSOR SYSTEM AND MESSAGE PASSING METHOD USING THE SAME

[75] Inventors: Shigeki Yamada, Tokorozawa; Katsumi Maruyama, Kokubunji; Minoru Kubota, Tokyo; Satoshi Tanaka, Fuchu, all of Japan

[73] Assignee: Nippon Telegraph and Telephone Corporation, Tokyo, Japan

[21] Appl. No.: 317,647

[22] Filed: Oct. 3, 1994

[30] Foreign Application Priority Data

Oct. 5, 1993 [JP] Japan .................................... 5-248973
Aug. 26, 1994 [JP] Japan .................................... 6-202071

[51] Int. Cl.⁶ .............................. G06F 13/00; G06F 15/16
[52] U.S. Cl. ............................... 395/200.01; 395/200.07; 395/200.08; 395/448; 395/474; 395/670; 395/842
[58] Field of Search ....................... 395/650, 800, 395/480, 448, 200.01, 200.07, 200.08

[56] References Cited

U.S. PATENT DOCUMENTS

| | | | |
|---|---|---|---|
| 4,811,216 | 3/1989 | Bishop et al. ................. | 395/480 |
| 4,951,193 | 8/1990 | Muramatsu et al. . | |
| 5,043,873 | 8/1991 | Muramatsu et al. ............. | 395/650 |

(List continued on next page.)

FOREIGN PATENT DOCUMENTS

| | | |
|---|---|---|
| 0345738 | 12/1989 | European Pat. Off. . |
| 0360153 | 3/1990 | European Pat. Off. . |
| 0365731 | 5/1990 | European Pat. Off. . |
| 6-19785 | 1/1994 | Japan . |

OTHER PUBLICATIONS

T. Shimizu, et al., "Low–Latency Message Communication Support for the AP1000", *Proceedings of the 19th International Symposium on Computer Architecture*, 1992, pp. 288–297.

Blumrich, M.A., et al., "Virtual Memory Mapped Network Interface for the Shrimp Multicomputer", *Proceedings of the 21st International Symposium on Computer Architecture*, 1994, pp. 142–152.

(List continued on next page.)

*Primary Examiner*—Krisna Lim
*Assistant Examiner*—Saleh Najjar
*Attorney, Agent, or Firm*—Pollock, Vande Sande & Priddy

[57] ABSTRACT

In a multiprocessor system, each processor module comprises a processor, a distributed shared memory, a distributed memory coupler for controlling copying between distributed shared memories and a distributed memory protector for protecting said distributed shared memory against illegal access. The distributed shared memories are assigned global addresses common to all the processor modules, and the distributed shared memory of each processor module has its addresses shared with the distributed shared memory of each processor module which is the destinatiion of data transfer. Message buffers and message control areas on the distributed shared memory are divided into areas specified by a combination of sending and receiving processor modules. A processing request area on the distributed shared memory is divided corresponding to each receiving processor module and arranged accordingly. The processing request area on the receiver's side distributed shared memory has a FIFO structure. The sender's side distributed memory coupler stores identifying information of the destination processor module between the processor module communication and, upon occurrence of a write into the distributed shared memory, sends a write address and write data to the destination processor module. The receiver's side distributed memory coupler copies the received write data into the distributed shared memory of the processor module to which the distributed shared memory coupler belongs, by receiving write address and write data from the sender's side distributed memory coupler.

24 Claims, 25 Drawing Sheets

U.S. PATENT DOCUMENTS

| | | | |
|---|---|---|---|
| 5,093,913 | 3/1992 | Bishop et al. | 395/650 |
| 5,129,093 | 7/1992 | Muramatsu et al. | 395/800 |
| 5,146,607 | 9/1992 | Sood et al. | 395/800 |
| 5,179,665 | 1/1993 | Rosland et al. | 395/200.08 |
| 5,182,801 | 1/1993 | Asfour | 395/200.08 |
| 5,214,759 | 5/1993 | Yamaoka et al. | 395/200.08 |
| 5,276,806 | 1/1994 | Sandberg et al. | |
| 5,305,362 | 4/1994 | Butts, Jr. et al. | 395/448 |
| 5,455,920 | 10/1995 | Muramatsu | 395/200.08 |

OTHER PUBLICATIONS

Wilson, A.W., Jr., et al., "Hardware Assist for Distributed Shared Memory", *Proceedings of the 13 International Conference on Distributed Computing Systems*, 1993, pp. 246–255.

Wittie, L.D., et al., "Eager Sharing for Efficient Massive Parallelism", *Proceedings of the 21st International Conference on Parallel Processing*, 1992, pp. II–251 –II–255.

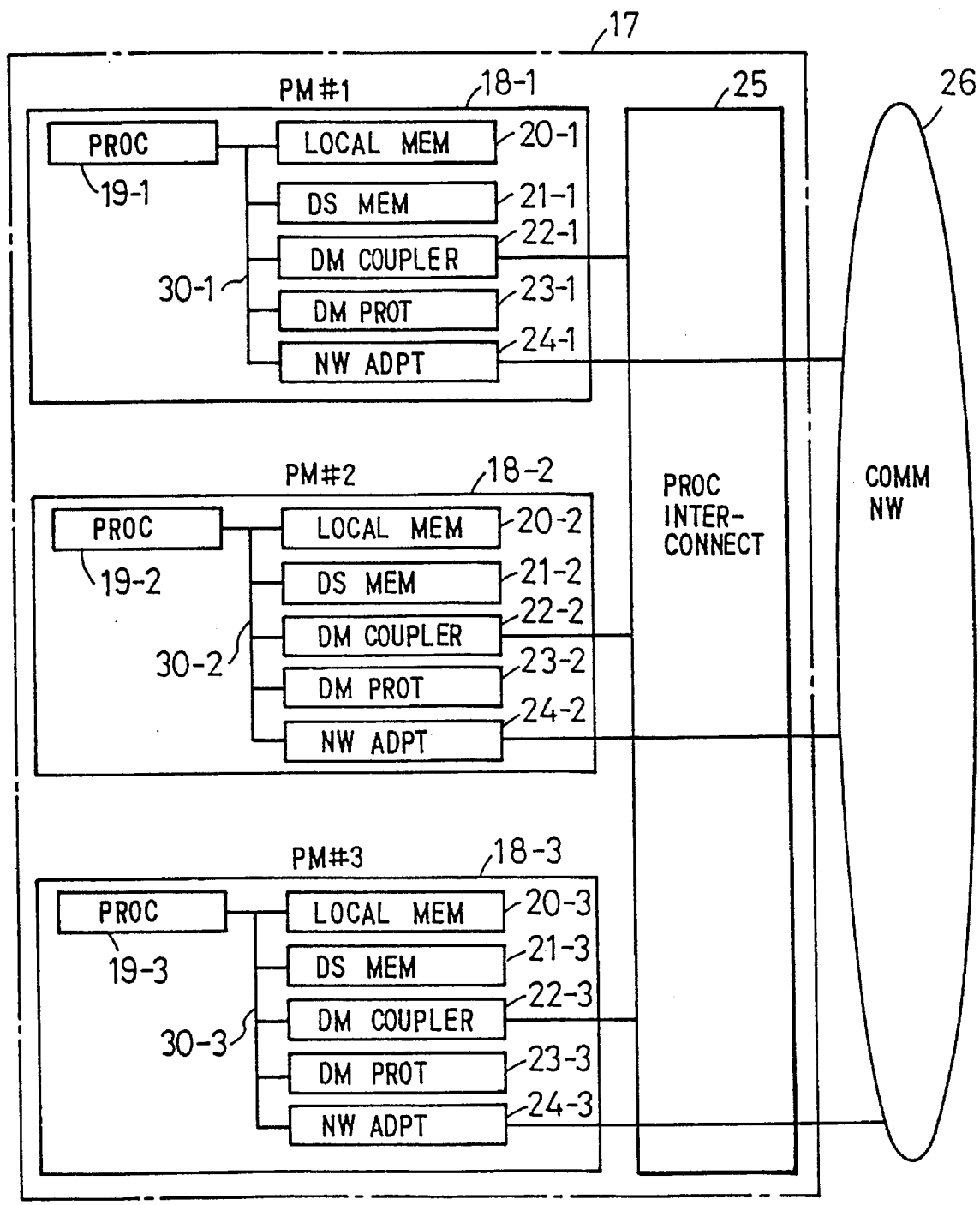

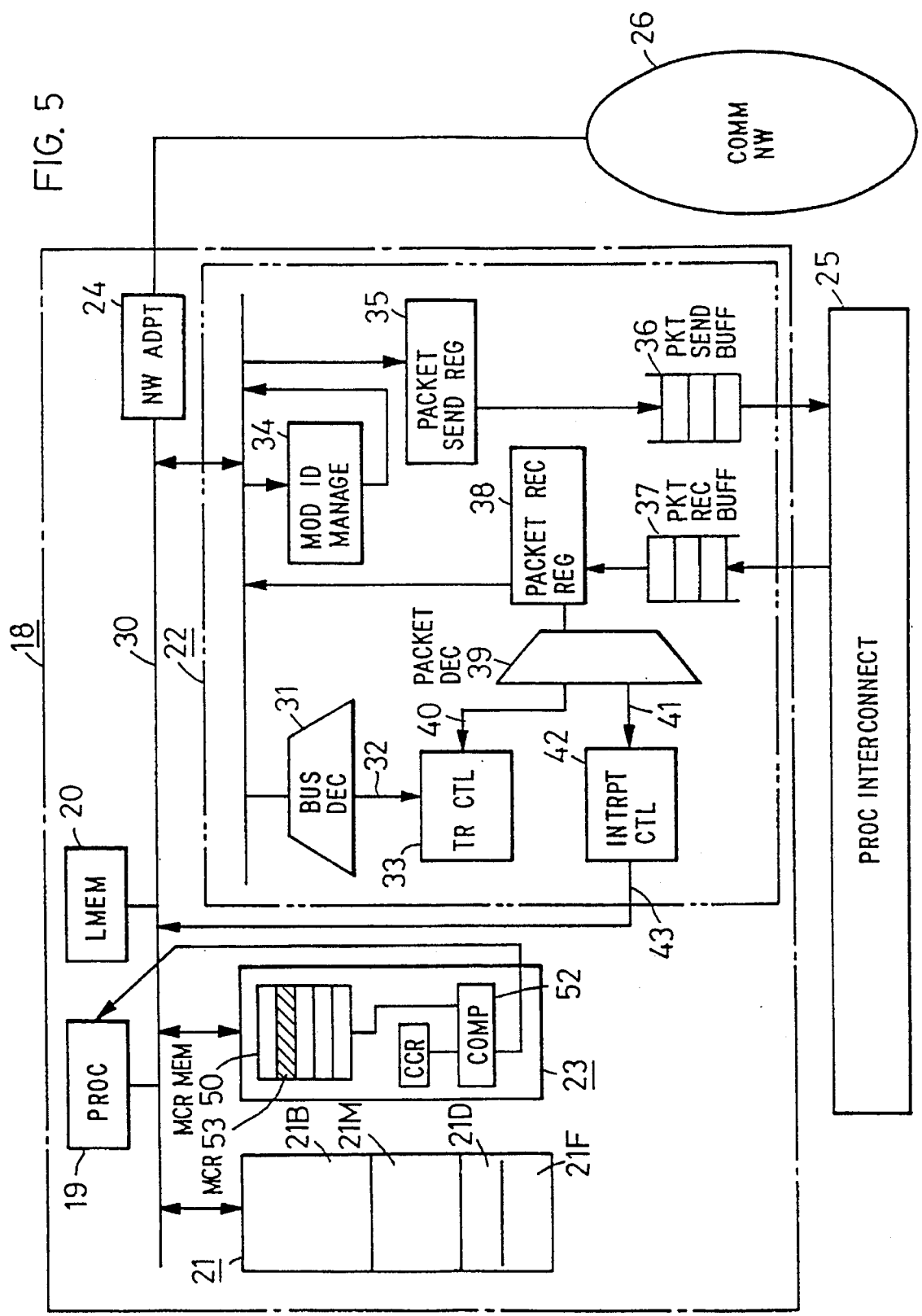

V=0: VACANT
   1: OCCUPIED

FIG. 22A
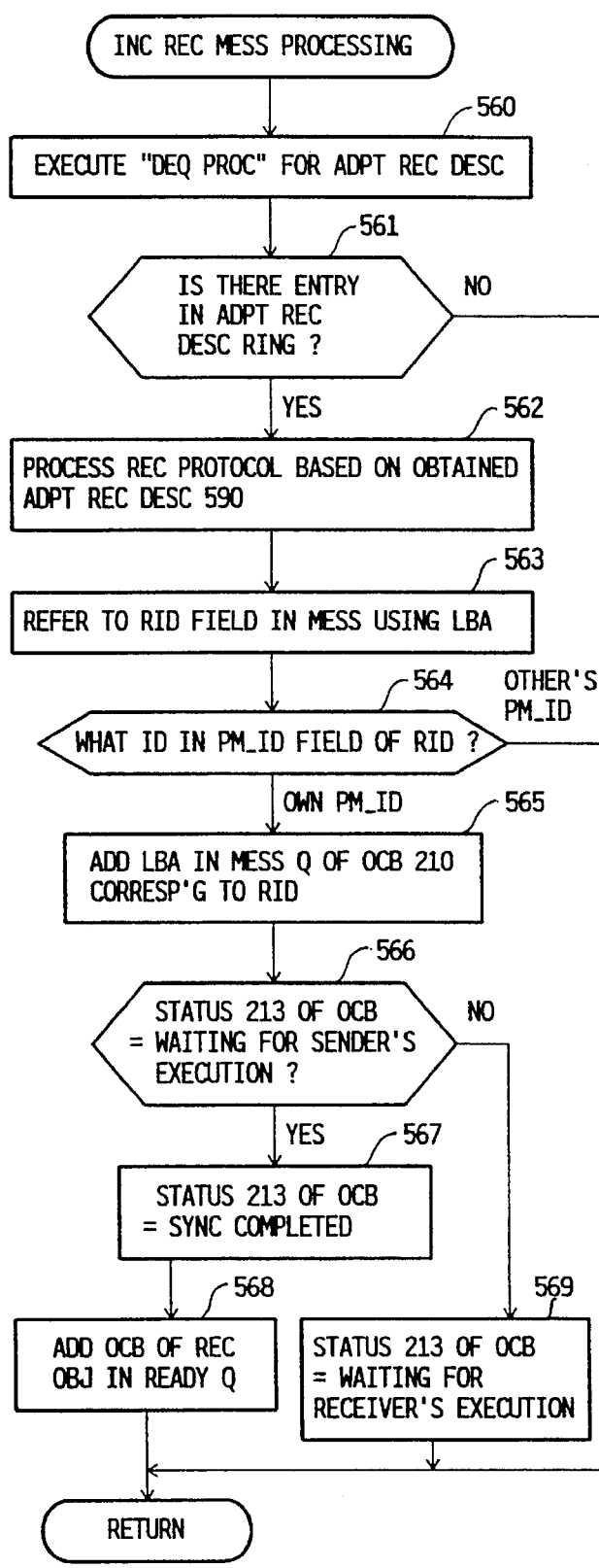
FIG. 22B
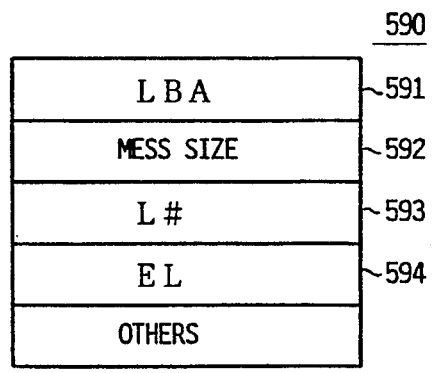
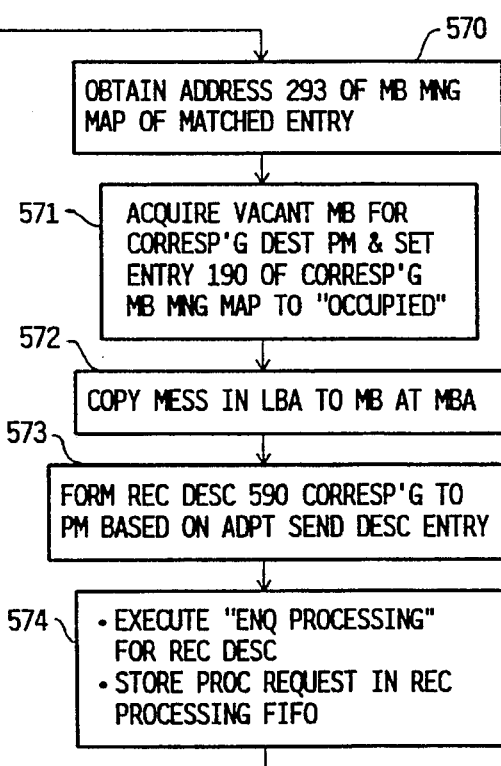

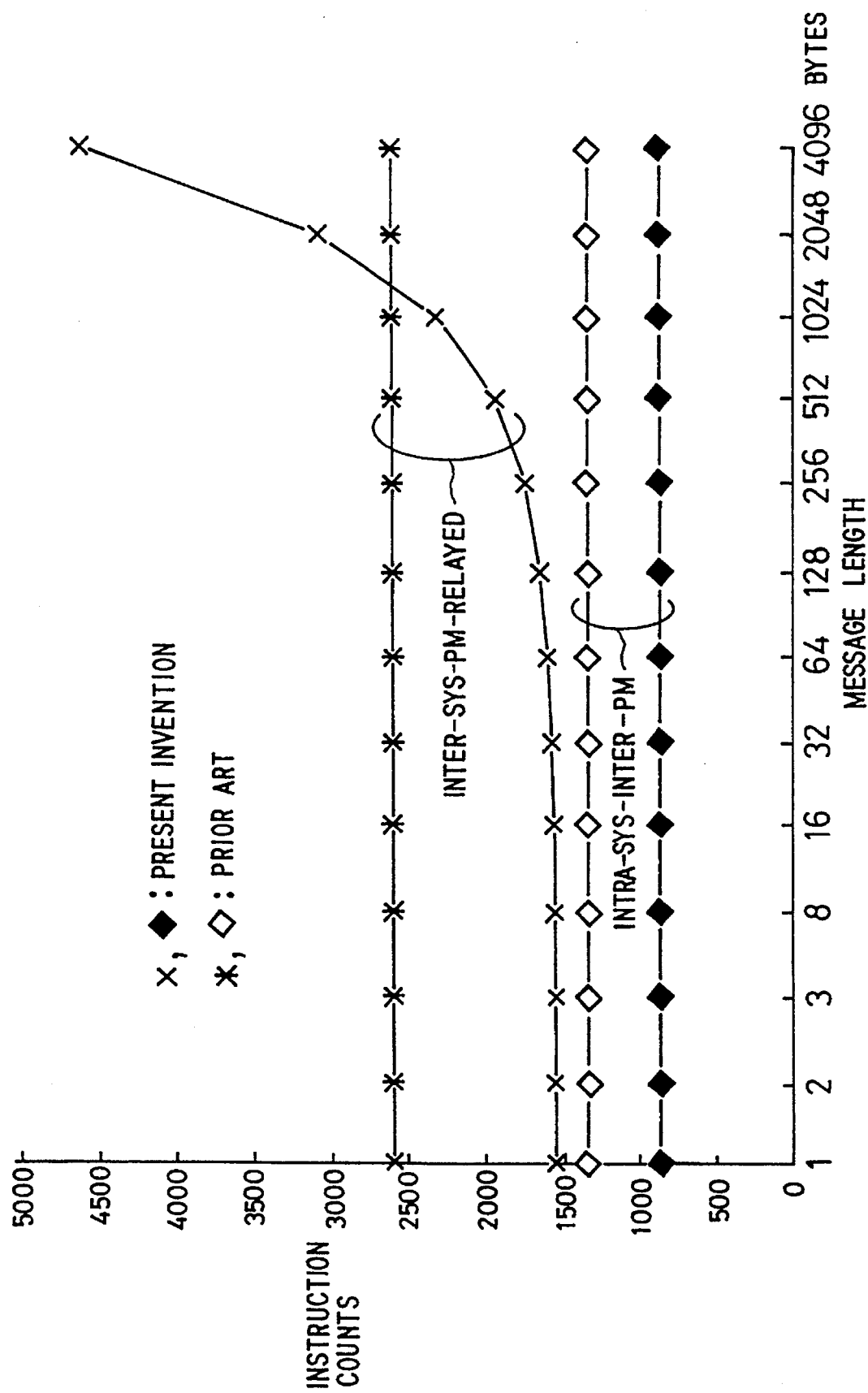

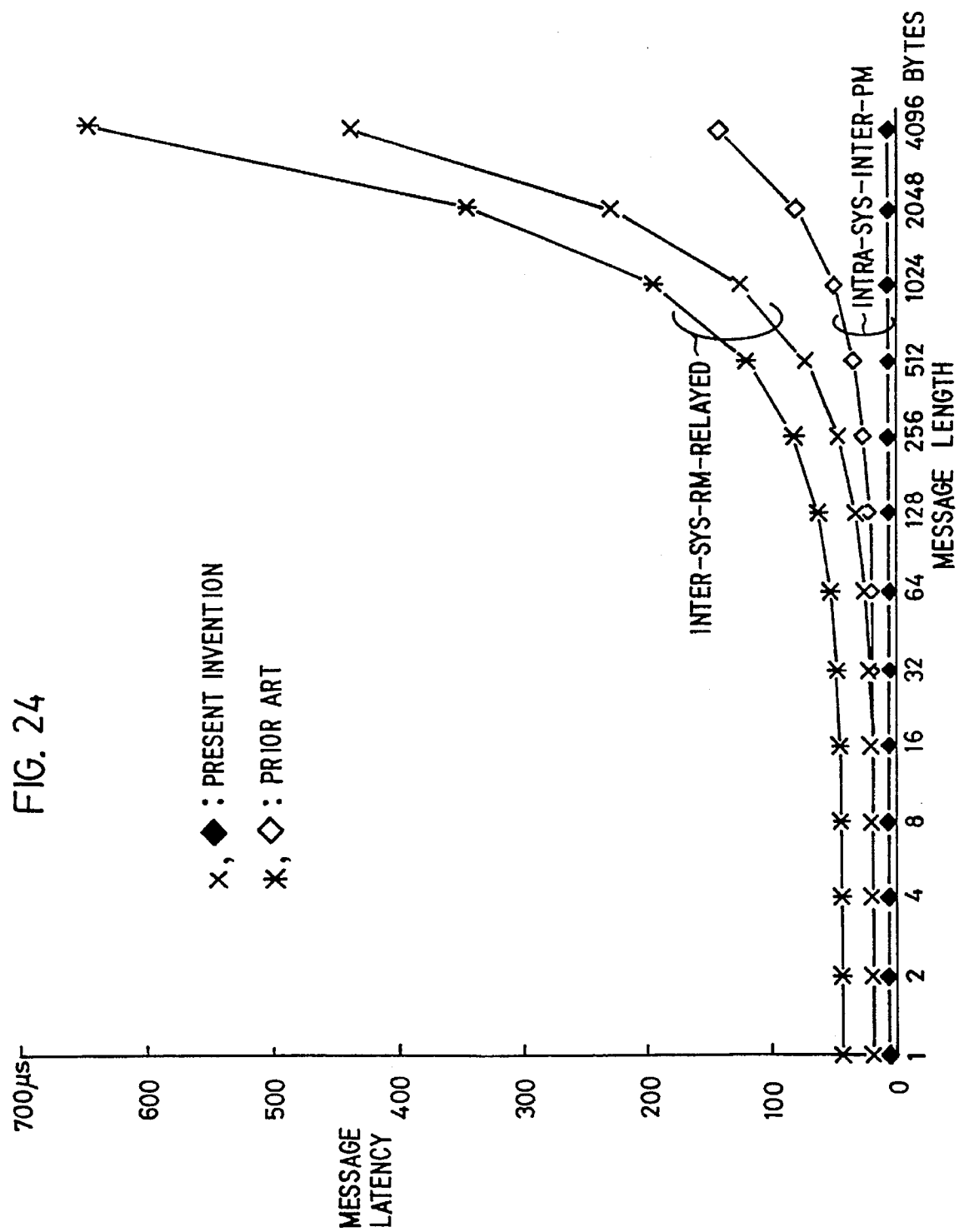

MESSAGE PASSING SYSTEM FOR DISTRIBUTED SHARED MEMORY MULTIPROCESSOR SYSTEM AND MESSAGE PASSING METHOD USING THE SAME

BACKGROUND OF THE INVENTION

1. Field of the Invention

The present invention relates to a method and apparatus which implement a high-speed, high-reliability message transfer between processors in a multiprocessor system with a distributed shared memory and, more particularly, relates to a parallel multiprocessor system suitable for handling highly-frequent, relatively small-sized message communications and a message passing method using the same.

2. Description of the Prior Art

With a view to effectively improving the efficiency of software development, object-oriented programming techniques are now coming into widespread use in which the objects, each encapsulating a procedure and data, are executed by exchanging messages.

A description will be given, with reference to FIGS. 1 and 2, of a conventional multiprocessor system which executes object-oriented programs. For detailed information, see T. Shimizu et al., "Low-Latency Communication Support for the AP1000," Proceedings of the 19th International Symposium on Computer Architecture, pp. 288–297, 1992. In FIG. 1, reference numerals 1-1 and 1-2 denote processor modules (hereinafter referred to simply as PMs) in the multiprocessor system; 2-1 and 2-2 denote processors; 3-1 and 3-2 denote local memories accessible from the processors 2-1 and 2-2, respectively; 4-1 and 4-2 denote DMA (Direct Memory Access) controllers for message transfer between the PMs 1-1 and 1-2; 5 denotes an interprocessor communication network; 3B-1 denotes a message buffer area provided on the local memory 3-1; and 3B-2 denotes a message buffer area provided on the local memory 3-2. The local memories 3-1 and 3-2 have areas for storing objects to be executed by the processors 2-1 and 2-2 and areas for storing kernels which control and manage the execution of the processors 2-1 and 2-2.

Now, consider a message transfer from the PM 1-1 to the PM 1-2 in the system of FIG. 1. In response to a request (step S1 in FIG. 2) from a sender object (10 in FIG. 2) which is being executed by the processor 2-1, a kernel (11-1 in FIG. 2) which is a main program of an operating system reserves the message buffer area 3B-1 in the local memory 3-1 in step S2 and reports it to the sender object 10. Then, the sender object 10 writes a message in the message buffer area 3B-1 in step S3 in FIG. 2. This is indicated by the thick arrow L10 in FIG. 1. The sender object 10 issues a send request to the kernel 11-1 in step S4, and in step S5 the kernel 11-1 sets in the DMA controller 4-1 control information such as the base address (ADR1 in FIG. 1) of the message buffer area 3B-1, the message size (n) and the destination processor module number. This is indicated by the thick arrow L11 in FIG. 1.

In step S6 the kernel 11-1 activates the DMA controller 4-1, which reads the message from the message buffer area 3B-1 based on the control information set therein and transmits it to the DMA controller 4-2 in the receiver's side PM 1-2 via the interprocessor communication network 5 in steps S7 and S8. This is indicated by the thick arrow L12 in FIG. 1.

The DMA controller 4-2 generates an interrupt to the kernel (11-2 in FIG. 2) of the processor 2-2 in step S10 in FIG. 2 while it stores the message in a temporary storage in step S9. This is indicated by the thick arrow L13 in FIG. 1. In step S11 the kernel 11-2 reserves the message buffer area 3B-2 on the local memory 3-2 of the receiver's side PM 1-2 and in step S12 it sets in the DMA controller 4-2 control information such as the address (ADR2 in FIG. 1) of the message buffer area 3B-2 and the message size (n). Upon DMA initiation by the kernel 11-2 in step S13, the DMA controller 4-2 transfers the message to the message buffer area 3B-2 in step S14 (which is indicated by the thick arrow L14 in FIG. 1) and indicates the message transfer completion to the kernel 11-2 in step S15.

In step S16 the kernel 11-2 recognizes a receiver object 12 in FIG. 2 on the basis of the destination included in the message to activate the receiver object 12 in step S17. In step S18 the receiver object 12 reads out the message from the message buffer area 3B-2 in the local memory 3-2 (which is indicated by the thick arrow L15 in FIG. 1). In this way, the message passing is implemented between the PMs.

It is desirable that the message transfer to the receiver's side PM be initiated as soon as possible when the sender object 10 writes the message into the message buffer area 3B-1 in step S3 in FIG. 2. Also it is desirable that the receiver's side delivers the message to the receiver object as soon as possible when having received it in step S9 in FIG. 2. In the prior art, however, the message handling involves many kernel processes such as the preparation for the DMA initiation in steps S5 and S12, the allocation (or acquisition) of the message buffer area at the receiver's side in step S11 and the interrupt handling in steps S10 and S15—this inevitably results in high latency of message transfer and large overhead of kernel execution. Specifically, when the bandwidth of the interprocessor communication network 5 is high, the relative ratio of the kernel processing overhead increases relatively to the message transfer latency; hence, it is essential to reduce the processing overhead.

In steps S10 and S15 in FIG. 2 the prior art utilizes the interrupt as a means to report the arrival of the message from the sender's PM to the kernel. To acknowledge the interrupt request, however, it is necessary to save information of the object being currently executed and switch the context to interrupt handling. This requires large kernel execution overhead. Therefore, the interrupt scheme is not suited to a massively parallel processor system because it must handle a large number of interrupts per unit time, and therefore the processing overhead becomes very large and the transfer latency also increases.

To avoid the interrupt, there has been proposed a request accept scheme called polling. The polling system is one wherein processing requests are prestored in predetermined memories or registers and a processor reads them out afterward when the processor is ready to process them. With this scheme, the context switching overhead needed is smaller than in the case of using the interrupt scheme, but since it is necessary to read all the memories or registers which store processing requests, the situation occasionally arises where memories or registers with no processing requests stored therein are read in vain when processing requests are generated infrequently. In massively parallel processor systems, in particular, a large number of and a large variety of processing requests are generated, and consequently, a large overhead is needed to read out all of them at regular time intervals and the number of needless readouts increases accordingly, impairing the processing efficiency.

In U.S. Pat. No. 4,951,193 there is disclosed a method which transfers data and control information between processors for processing in parallel a plurality of tasks partitioned from a process in a DO loop in scientific computations. In U.S. Pat. No. 5,276,806 there is disclosed a technique by which when data is written to a certain location of a distributed shared memory of a certain processor node in a distributed shared memory system, the copy data is also written into the locations of distributed shared memory having the same address at all the other nodes. In Japanese Patent Application Laid-Open No. 19785/94 (filed in the name of J. Sandberg claiming priority based on U.S. patent application No. 859,087 dated Mar. 27, 1992) there is disclosed a system in which distributed shared memories, which form a shared virtual memory (SVM) address space, are shared by a plurality of nodes (work stations) through a network. In this system, each page of the shared virtual address space is mapped to data location memories in the system so that when data is written to a certain memory location, the same data is copied as well to the same address location of another distributed shared memory specified by an n-bit vector. In a publication by J. Sandberg et al., entitled "Virtual Memory Mapped Network Interface for the SHRIMP Multicomputer," Proceedings of the 21st International Symposium on Computer Architecture, pp. 142–152, 1994, there is set forth a system which is basically similar to that proposed in the above-mentioned Japanese patent application laid-open gazette but implements a network interface environment that minimizes the message passing overhead. Another publication by A. W. Wilson, Jr., entitled "Hardware Assist for Distributed Shared Memory," Proceedings Of 13th International Conference on Distributed Computing Systems, pp. 246–255, 1993 concerns a software distributed shared memory (SDSM) system, which reduces the frequency of page transfer, using an update-based coherency protocol that sends write data to the copy destination each time the shared data is updated. Still another publication by L. D. Wittie et al., entitled "Eager Sharing for Efficient Massive Parallelism," Proceedings of 21st International Conference on Parallel Processing pp. II-251–255, 1992, concerns a massively parallel processor system, in which each work station is provided with an interface to monitor a memory bus and when a data is written to a local memory, its address is compared with preset directory entries and if it is a shared variable memory area, a copy of the update data is sent to all the nodes in the multicasting group.

However, these prior art publications make no mention of a method which improves the efficiency of all the functions necessary for message passing on an all-inclusive basis, including the management of message buffers on the distributed shared memory and the detection of message send and receive requests.

SUMMARY OF THE INVENTION

It is therefore an object of the present invention to provide a distributed shared memory processor system which permits efficient management of message buffers on the distributed shared memory to reduce kernel overhead and implement low-latency, message transfer with low overhead.

Another object of the present invention is to provide a method which implements a high-speed, high-reliability message transfer between processor modules in a multiprocessor system which is made up of a plurality of processor modules and an interprocessor communication network.

The plurality of processor modules, which form the multiprocessor system according to the present invention, each have a distributed shared memory which has a global address shared by all the processor modules and includes a plurality of communication areas for sending which are dedicatedly assigned to respective ones of all possible combinations of point-to-point communication between said one of the plurality of processor modules at a sender's side and each of the plurality of processor modules at the receiver's side and a plurality of communication areas for receiving which are dedicatedly assigned to respective ones of all possible combinations of point-to-point communication between one of the plurality of processor modules at the receiver's side and each of said processor modules at the sender's side. The communication areas are each provided with message buffers for storing messages. Furthermore, the processor modules each includes: message buffer management means which responds to a request by an application object for writing a message into the communication area corresponding to a desired one of the processor modules designated as a receiver's side module to acquire a vacant message buffer in the communication area at the sender's side processor module corresponding to the above-mentioned receiver's side processor module; and distributed shared memory control means which, a the application object writes a message into the acquired message buffer in he sender's side communication area corresponding to the receiver's side communication area, transfers the address of the acquired message buffer and the message to the processor module at the receiver's side specified by the application object to write the message into the receiver's side message buffer of the same address shared with the acquired message buffer.

The message passing method according to the present invention, which uses the above-mentioned multiprocessor system, comprises the steps:

a) the sender's side processor module acquires, by the message buffer management means, a vacant sending message buffer in the communication area corresponding to the sender's side processor module;

b) a message is written into the acquired sending message buffer; in the case where the sender's side processor module is different from the receiver's side processor module c) the distributed shared memory control means at the sender's side extracts identifying information of the receiver's side processor module from the address of the sender's side message buffer and transfers the address of the sender's side message buffer and write data to the receiver's side processor module;

d) on the basis of the address of the sender's side message buffer and the write data transferred thereto, the distributed shared memory control means at the receiver's side copies the message into that receiver's side message buffer of the receiver's side distributed shared memory which has the same address as that of the sender's side message buffer; and e) the receiver's side processor module reads out the message from the receiver's side message buffer.

BRIEF DESCRIPTION OF THE DRAWINGS

FIG. 3 is a block diagram illustrating the system configuration of the present invention;

FIG. 5 is a block diagram illustrating the internal configuration of a processor module in the present invention;

FIG. 22A is a flowchart of INC receive processing;

FIG. 22B is a diagram illustrating the structure of an adaptor receiving descriptor ring;

FIG. 23 is a graph showing the relationships between the message length and the number of instructions of the kernel program, obtained by simulation in this invention system and a conventional DMA system; and FIG. 24 is a graph showing the relationships between the message length and the message latency, obtained by simulation in this invention system and the DMA system.

DESCRIPTION OF THE PREFERRED EMBODIMENTS

Figure 1:
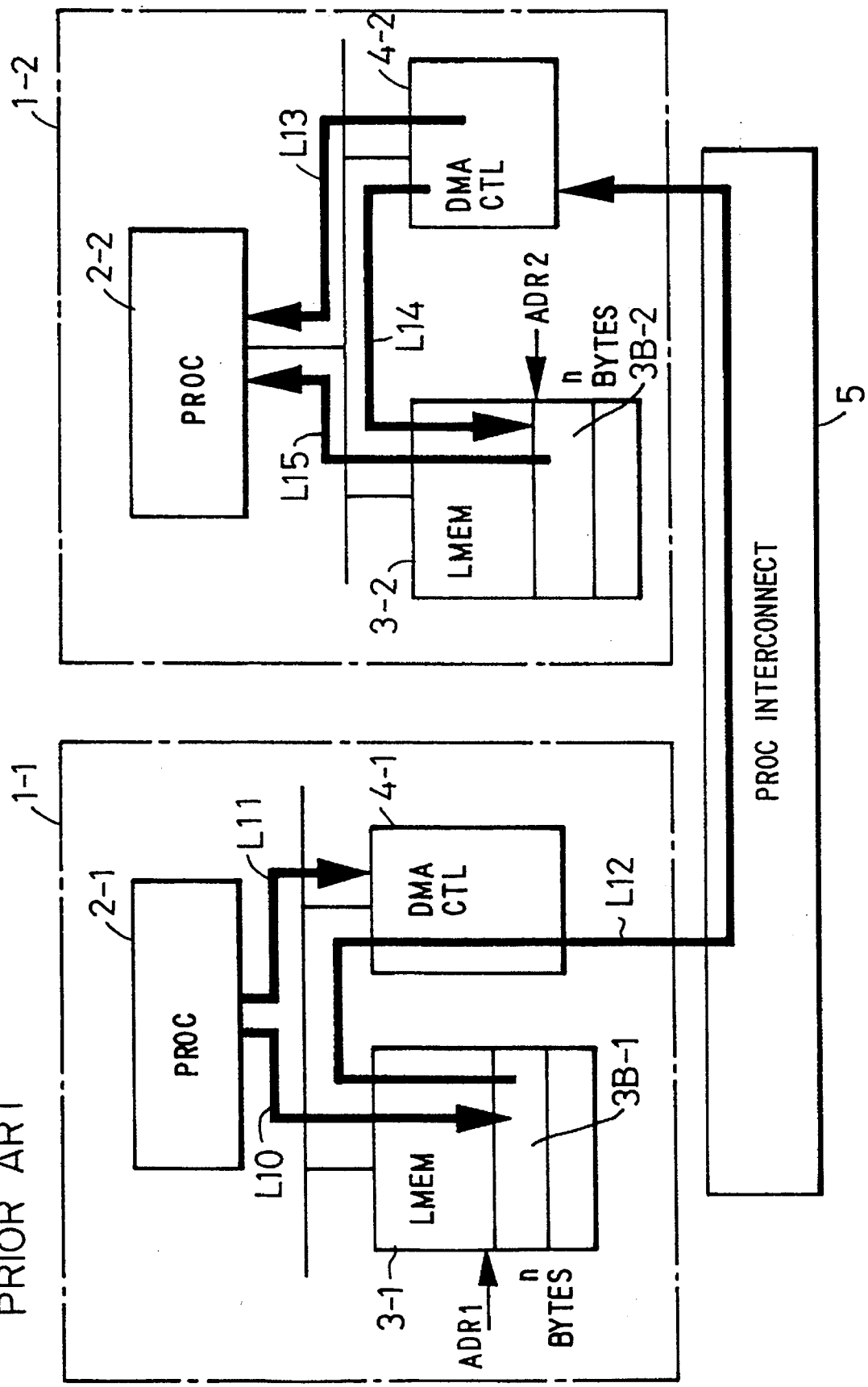
FIG. 1 is a block diagram illustrating the system configuration of a conventional multiprocessor system with local memories.
Figure 2:
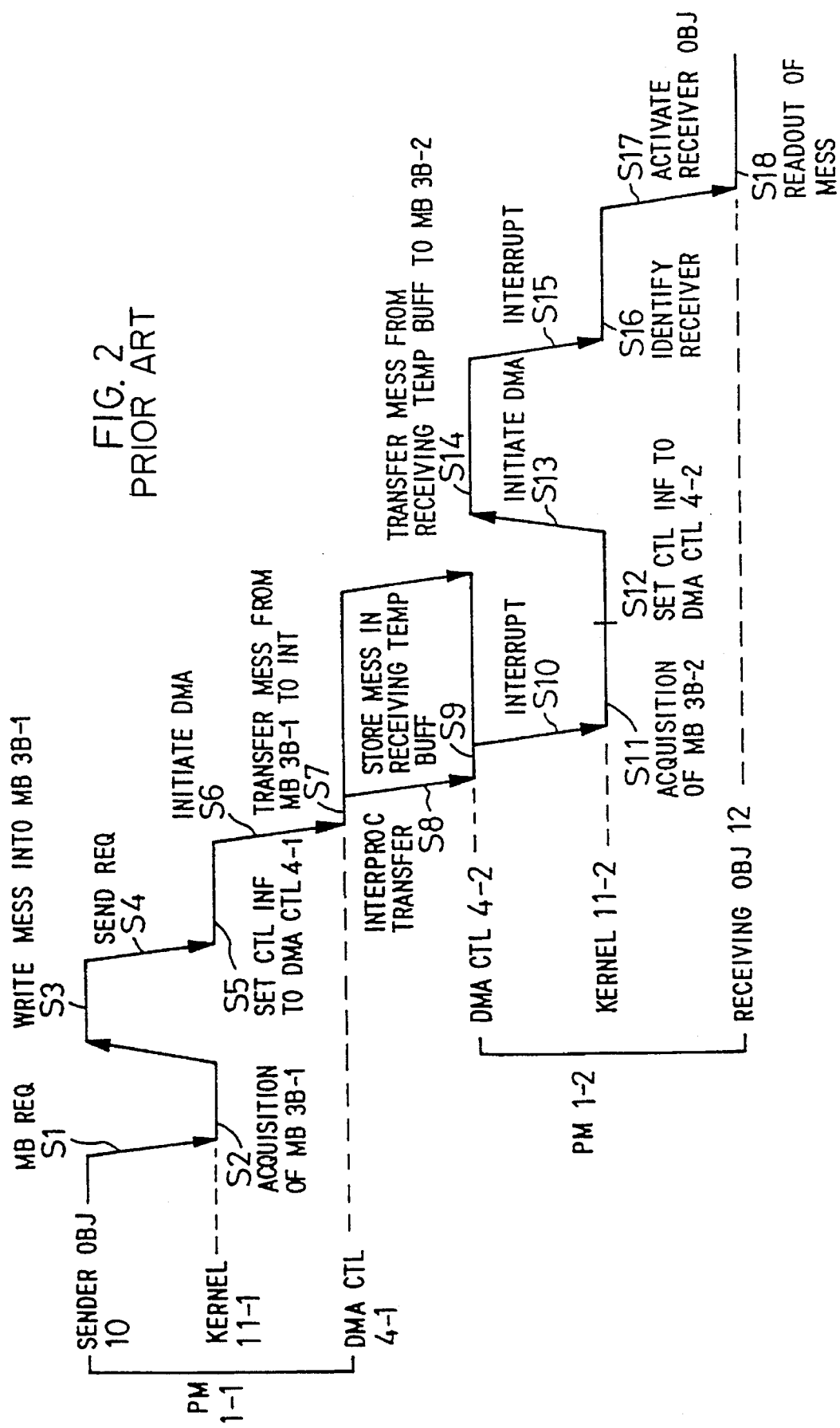
FIG. 2 is a sequence chart of a conventional interprocessor message communication.

The multiprocessor system according to the present invention is predicated on the processing environments listed below.

(a) Use of asynchronous message passing: After sending a message to the receiver object, the sender object is allowed to continue its processing without awaiting the receiver object's acknowledgement. This is called asynchronous message passing.

(b) Each object is identified uniquely by an "object ID." The object ID is assigned a value so that it permits unique identification throughout the network system containing a plurality of multiprocessor systems. The destination of a message is specified by the object ID and the message is sent directly to the specified object. A plurality of high order bits of the object ID indicate an identifying number of the receiving system and an identifying number of the receiving processor module in the system (which will be described later with reference to FIG. 8C).

(c) Each processor has two execution modes: a supervisor mode (referred to also as a system mode or privileged mode) and a user mode (referred to also as an application or non-privileged mode).

I. System Architecture

FIG. 3 illustrates in block form an example of multiprocessor system 17 which is made up of, for example, three processor modules (hereinafter referred to simply as PMs) 18-1, 18-2 and 18-3 interconnected via an interprocessor communication network 25. Reference numerals 19-1, 19-2 and 19-3 denote processors; 20-1, 20-2 and 20-3 denote local memories accessible from the processors 19-1, 19-2 and 19-3 respectively corresponding thereto; and 21-1, 21-2 and 21-3 denote distributed shared memories (hereinafter also referred to as DS memories or simply as DSMs) which are assigned global addresses common to all the processor modules. The local memory 20 of each processor module PM has an area dedicated to the storing of an object to be executed in the processor module PM and an area dedicated to then storing of a kernel which controls and manages sender and receiver objects. The processor 19-1 is able to access the distributed shared memory (DSM) 21-1 but unable to access the other DS memories 21-2 and 21-3. Similarly, it is only the DS memories 21-2 and 21-3 that the processors 19-2 and 19-3 are respectively able to access.

Distributed memory couplers 22-1, 22-2 and 22-3 in the sending PM send data, written into the DS memories 21-1, 21-2 and 21-3, respectively, to a prespecified one or more of the other processor modules (one or more of the PMs 18-1, 18-2 and 18-3). On the other hand, distributed memory couplers 22-1, 22-2 and 22-3 in the receiving PM receive the data from the other processor modules, and write them into those of the same address locations of the DS memories 21-1, 21-2 and 21-3 as at the sender's side. Distributed memory protectors 23-1, 23-2 and 23-3 are provided to protect message buffers of the DS memories 21-1, 21-2 and 21-3 against illegal accesses thereto. Network adaptors 24-1, 24-2 and 24-3 are provided to exchange messages or the like with other distributed systems via a communication network 26.

The processor interconnect 25 transfers therethrough messages or their control information between the PMs in the multiprocessor system 17. The processor interconnect can be implemented by a system bus, LAN, packet switching network, ring network or the like, as long as it permits a point-to-point communication between the sender PM and the receiver PM. The communication network 26 interconnects a plurality of multiprocessor systems 17, and in this embodiment it is assumed to be an ATM (Asynchronous Transfer Mode) network in which transfer data is partitioned into blocks of a fixed length and each block is transferred in a 53-byte cell including a destination header, but other types of interconnector are also applicable.

II. Outlines of Constituents

Prior to a detailed description of the system according to the present invention, a brief description will be given of the distributed memory coupler 22, the distributed shared memory 21 and the distributed memory protector 23 which are principal constituents of each PM.

The distributed memory coupler 22 stores identifying numbers PM_ID of receiver PMs, sharing addresses of the DS memory 21. At the sender PM 18, upon the write to a shared address location of the DS memory 21, the distributed memory coupler 22 transfers write data to the receiver PM specified by the identifying number PM_ID and the distributed memory coupler 22 in the receiver PM writes the received data into the DS memory 21 at the receiver PM. This copying operation takes place in parallel with writing into the sender's distributed shared memory without kernel intervention, and hence is fast and is free from kernel overhead. Furthermore, by prestoring the sender PM identifying number PM_ID in the receiver's distributed memory coupler, the contents written in the receiver's distributed shared memory can be transferred back to the sender's distributed shared memory. This eases synchronization and communication between the sender and the receiver.

Figure 4A:
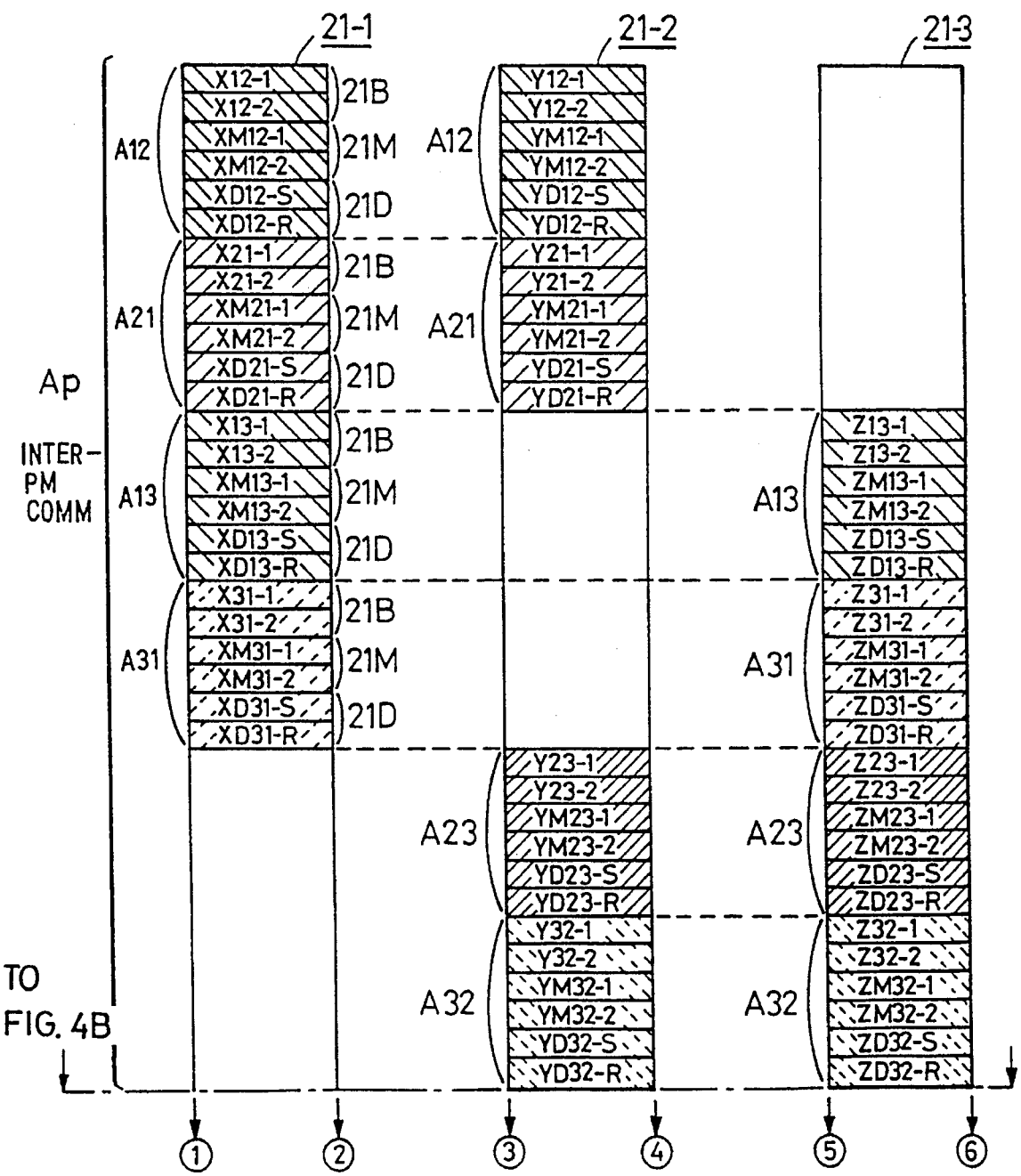
FIG. 4 shown in two sheets as FIGS. 4A and 4B to be connected to each other via ① through ⑥ is a diagram showing a memory map of distributed shared memories.
Figure 4B:
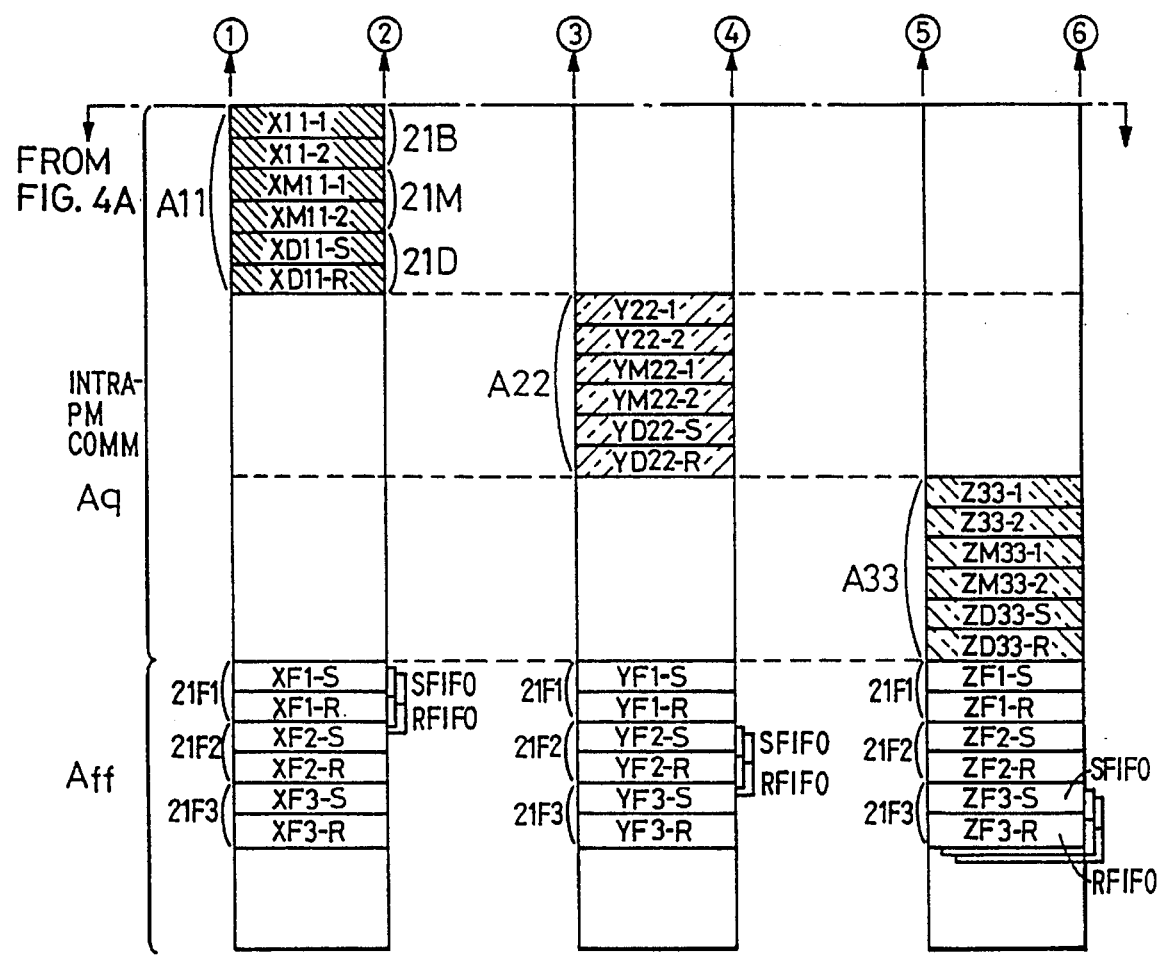

As shown in FIG. 4, the distributed shared memories 21-1, 21-2 and 21-3 of the processor modules 18-1, 18-2 and 18-3 (also referred to as PM#1, PM#2 and PM#3) each have an inter-PM communication area Ap, an intra-PM communication area Aq and a FIFO communication area Aff which are defined by global physical addresses. In the inter-PM communication area Ap of the DS memory 21 of each processor module 18, there are defined exclusively a pair of sending and receiving areas for each combination of the said each processor module and one of the other processor modules. In the DS memory 21-1 of PM#1 (18-1), for example, there are defined by physical addresses a communication area A12 for sending from PM#1 to PM#2 (18-2) and a communication area A21 for receiving from PM#2 to PM#1; in the DS memory 21-2 of PM#2 (18-2) there are defined, by the same physical addresses as those mentioned above, a communication area A12 for receiving from PM#1 to PM#2 and a communication area A21 for sending from PM#2 to PM#1. Similarly, communication areas A13 and A31 for communication between PM#1 and PM#3 (18-3) are defined by the same physical addresses in the DS memories 21-1 and 21-3 of PM#1 and PM#3, and communication areas A23 and A32 are similarly defined for PM#2 and PM#3.

In the communication area A12 of PM#1 there are defined by physical addresses a plurality (two in FIG. 4) of message buffer (hereinafter referred to simply as MB) areas X12-1 and X12-2, MB management map areas XM12-1 and XM12-2 of the same number as the MB areas and sending and receiving descriptor ring areas XD12-S and XD12-R. In the communication area A12 or PM#2 corresponding to the communication area A12 of PM#1, too, there are similarly defined by the same physical addresses, MB areas Y12-1 and Y12-2, MB management map areas YM12-1 and YM12-2 and sending and receiving descriptor ring areas YD12-S and YD12-R. The same goes for the other communication areas A21, A13, and so on.

In PM#1 messages to be sent to PM#2 are written by a sender object into a vacant one of the MB areas X12-1 and X12-2 of the communication area A12, and the state of use (occupied:"1" and vacant:"0," for example) of the MB is written in the corresponding MB management map area (XM12). The areas in the communication areas A12 of PM#1 and PM#2 are similarly allocated to the same physical addresses, and as described later on, when a message is written into the MB area X12-1 of PM#1, the same message is copied into the MB area Y12-1 of PM#2. As described above, according to the present invention, the DS (distributed shared) memory of each PM is partitioned into distinct communication areas determined by a sender PM and a receiver PM; consequently, when the identifying number of a message destination PM is given to the sender PM, the sender PM can readily determine the message buffer in the communication area of the DS memory into which the message is to be written.

In the intra-PM communication area Aq of each processor module, there are also defined by physical addresses intra-PM communication areas A11, A22 and A33 allocated exclusively to the respective processor modules themselves. As is the case with each communication area in the inter-PM communication area Ap, the communication area A11 has message buffer (MB) areas X11-1 and X11-2, MB management map areas XM11-1 and XM11-2 and descriptor ring areas XD11-S and XD11-R. The intra-PM communication will be described later.

According to another aspect of the present invention, in the FIFO communication areas Aff defined by the same physical addresses common to the DS memories 21-1, 21-2 and 21-3 of the respective processor modules, there are defined by common physical addresses, processing request areas exclusive for requests to PM#1, PM#2 and PM#3, respectively. Each processing request area, for example, the area for the processing request to PM#1, has a send processing request area XF1-S and a receive processing request area XF1-R. Besides, in each processor module, only the area for processing requests to that processor module consists of FIFO memories (first-in-first-out memories) for both of the send processing request area and the receive processing request area. For example, in the case of transferring a message from PM#1 to PM#2, when a message receive processing request to the PM#2 is written in the receive processing request area XF2-R in the PM#1, this receive processing request data is also copied into the receive processing request area YF2-R of the same physical address in the PM#2 as described later. In the inter-PM communication, even if a plurality of sender PMs write simultaneously in their own DS memories receive processing requests to the same receiver PM, these receive processing requests are ordered through inter-PM communication line, and the receiver PM receives these receive requests during a short period. According to the present invention, the FIFO-memory area of each processor module for processing requests thereto allows serial storing and serial servicing of processing requests which have been raised in parallel in the sender PMs.

The distributed memory protector 23 includes memory capability registers (MCRs) 53 which have a one-to-one correspondence with the message buffers MBs (21B) on the distributed shared memory 21. The identifying number ID of an object having the right to access the message buffer MB (21B) is stored in each memory capability register 53. The distributed memory protector 23 further includes a current capability register (CCR) 51 which contains the identifying number of an object running in the processor 19. Upon each access to the message buffer MBm the current capability register CCR 51 and the memory capability register MCR 53 associated with the MB are compared to see if the access is illegal. This helps to build a highly reliable system even when the distributed shared memory space is shared by various objects in the system.

III. Detailed Description of the System

III-1. Distributed Shared Memory Map

Next, a detailed description will be given of the DS memories 21-1, 21-2 and 21-3 described in brief with reference to FIG. 4. In the interests of brevity, the embodiment of FIG. 4 has been described above to employ physical addresses; but logical or virtual addresses may be used, in which case a conventional logical-to-physical address translation should be provided. The DS memories 21-1, 21-2 and 21-3 are assigned common addresses and the communication areas in each DS memory 21 are split into the inter-PM communication area Ap, the intra-PM communication area Aq and the FIFO communication area Aff. The inter-PM communication area Ap is an area to store inter-PM communication information in the multiprocessor 17; the intra-PM communication area Aq is an area to store communication information which is sent and received within the same processor module PM; and the FIFO communication area Aff is an area to store processing requests on a first-in; first-out basis.

The communication areas A12, A21, A13 ... , A11, A22, and so on, provided exclusively for respective destination PMs in the inter-PM communication area Ap and the intra-PM communication area Aq are each divided into:

(1) a message buffer area 21B composed of a plurality of MBs for storing messages;

(2) a MB control map area 21M composed of a plurality of MB management maps for indicating the acquired/ released states (i.e. the occupied/vacant states) of respective MBs; and (3) a descriptor ring area 21D composed of a plurality of descriptor rings each of which consists of a plurality of descriptors placed in contiguous address locations each including the MB address and other control information.

It will be described later how these areas are used.

The MB area 21B, the MB management map area 21M and the descriptor ring area 21D are assigned physical memories in units of pages defined by physical addresses, and these pages are managed by the virtual memory page table. In the page table for the MB area 21B, there is set protection information to permit access to the MB area in both a supervisor mode (a mode in which a kernel or various system control programs by the kernel are executed) and a user mode (a mode in which various application programs are executed) of the processor 19. The MB access in the user mode allows application programs to directly read and write messages in the MB area 21B, and hence provides increased efficiency of processing. On the other hand, in the page tables for the MB management map area 21M and the descriptor ring area 21D there is set protection information which permits access to the areas only in the supervisor mode of the processor 19. This protects the MB management map area 21M and the descriptor ring area 21D against illegal access from application programs.

To identify the individual areas on the distributed shared memory 21 in FIG. 4, an identifier Mij-k will hereinafter be used. Here, M is an identification symbol for the MB area, the MB management map area, the descriptor ring area and the FIFO communication area which correspond to each processor module; these areas corresponding to PM (18-1) are indicated by x, XM, XD and XF, respectively. Similarly, the MB area, the MB management area, the descriptor ring area and the FIFO communication area corresponding to PM (18-2) are identified by Y, YM, YD and YF, respectively, and the MB area, the management map area, the descriptor ring area and the FIFO communication area corresponding to PM (18-3) are identified by Z, ZM, ZD and ZF, respectively.

In the above, i and j indicate the identification number (PM_ID) of the sending PM and the identification number (PM_ID) of the receiving PM, respectively, and are given numbers 1, 2 and 3 corresponding to PM#1, PM#2 and PM#3. In this instance, however, the FIFO communication areas XF, YF and ZF have the value j alone and do not have the value i. The reason for this is that because the FIFO communication areas are each divided corresponding to the receiver PM and used in common to each sender PM indicated by the i, the value i is not needed as area specifying information.

Furthermore, k is to identify pluralities of MBs, MB management maps, descriptor rings and FIFO communication areas in the areas of the same kind and values are assigned to them in a sequential order starting with 1. For example, Z13-2 indicates a second one of the MBs in the PM#1 (18-1) to PM#3 (18-3) communication area on the distributed shared memory 21-3. As seen from FIG. 4, i≠j holds for the inter-PM communication area Ap and i=j holds for the intra-PM communication area. In this instance, however, those areas of the descriptor rings and the FIFO communication areas in which send processing requests and receive processing requests are stored are indicated by suffixes S and R, respectively. For instance, XD12-R indicates a receive descriptor ring on the distributed shared memory 21-1 to be forwarded from the PM#1 (18-1) to PM#2 (18-2) and ZF2-S a FIFO communication area on the distributed shared memory 21-3 for send processing to be forwarded from any PM to PM#2.

Each distributed shared memory 21 is mounted with only memory chips which are necessary for message passing to and from the PM containing the distributed shared memory. For example, in the distributed shared memory 21-1 shown in FIG. 4, only the hatched areas are mounted and the other areas are not mounted.

Two message buffers which are common in the values i, j and k but different in the value M form a pair. The message buffers of this pair are placed in the same address locations of different distributed shared memories. For instance, in FIG. 4 the message buffers X12-1 and Y12-1 make a pair and have the same address.

Each pair of message buffers are dynamically allocated and deallocated by the kernel at the sender PM. The message buffers each have a size of a fixed length, and as shown in FIG. 4, a plurality of message buffers for the same destination PM_ID are assigned to contiguous address locations in the distributed shared memory. This will hereinafter be called a destination PM corresponding MB pool. The MB management map is provided for each MB pool and MB management map entries of the same number as that of the message buffers in the MB pool are prepared and assigned to contiguous areas in the distributed shared memory. For example, the message buffers X12-1 and X12-2 in FIG. 4 form one MB pool and an MB management map entry XM12-1 corresponds to the message buffer X12-1 and an MB management map entry XM12-2 corresponds to the message buffer X12-2. What is meant by the word "correspond" is that the MB management nap entry address can be calculated using the starting address of the message buffer (hereinafter referred to simply as an MB address) and vice versa. Each MB management map entry represents whether the corresponding message buffer is "vacant" or "occupied" and its value is set by a kernel. As is the case with the message buffer, the MB management map entry of the sender's distributed shared memory and the MB management map entry of the receiver's distributed shared memory, both of which have the same address, make a pair; for instance, MB management map entries XM12-2 and YM12-2 form a pair.

As for the descriptor ring area, too, a plurality of descriptors for the same destination PM_ID are allocated to contiguous address locations in the distributed shared memory; the aggregate of the thus allocated descriptors is called a descriptor ring in its entirety. The reason for which it is called a "ring" is that a plurality of descriptors contained in the descriptor ring are used cyclically in ascending order of address. The descriptor ring area of the same address as that of each descriptor ring area at the sender PM is placed in the distributed shared memory of the receiver PM. The descriptor rings fall into a "sending descriptor ring" which is used to hand message control information from a sender object over to another processor module or another system and a "receiving descriptor ring" which is used to hand message control information received from another processor module or another system over to a receiver object. As is the case with the message buffers and the MB management maps, the descriptor rings of the same address at the sender PM and the receiver PM also make a pair. The correspondence between the descriptors in the descriptor ring and the message buffer is determined dynamically by the kernel. For example, in the case of sending a message from PM#1 (18-1) to PM#2 (18-2), the kernel of the former acquires a proper vacant message buffer (X12-2, for instance) from the MB pool on the basis of MB management map area information, then selects the corresponding sending descriptor ring (XD12-S, for example) and stores the MB address in a "vacant" descriptor of the lowest address location. In this way, the correspondence between the descriptor and the message buffer is determined dynamically. Incidentally, it is the sending descriptor ring YD12-S that pairs off with the sending descriptor ring XD12-S.

The FIFO communication area in FIG. 4 is partitioned into a "send processing FIFO area" which is used to indicate a message send processing request from a sender object to another processor module or another system and a "receive processing FIFO area" which is used to indicate a message receive processing request received from another processor module or another system to a receiver object. The FIFO communication area in the sender PM is formed by conventional RAM (a random access memory) but the FIFO communication area in the receiver PM is formed by a FIFO (a First-In First-Out) memory. For example, a PM#1-destined receive processing FIFO area XF1-R on PM#1 (18-1) is formed by a FIFO memory to store receive processing requests from other processor modules, whereas a PM#1-destined receive processing FIFO area YF1-R on PM#2 and a PM#1-destined receive processing FIFO area ZF1-R on PM#3 are each formed by a RAM. With such a structure, when the processor modules PM#2 and PM#3 write the receive processing requests in the receive processing FIFO areas YF1-R and ZF1-R, respectively, in succession in a short time, the requests reach, in succession, the receive processing FIFO area XF1-R of the processor module (PM#1). Then, these receive processing requests are stored in the FIFO memory in succession, from which they are read out by the PM#1 in order of arrival and processed accordingly.

III-2. Processor Module Configuration

FIG. 5 illustrates the internal structure of one of the processor modules 18-1, 18-2 and 18-3 of the same construction. In the following description, when one of the same constituents common to the three processor modules is described as a representative thereof, the reference numeral that denotes the representative constituent will exclude the suffix -1, -2 or -3 indicating the processor module to which the constituent belongs. Conversely, when appended with the suffix -1, -2 or -3 in the description given of FIG. 5, the reference numeral will denote a constituent belonging to the corresponding specific processor module. For example, an arbitrary distributed shared memory that represents the distributed shared memories 21-1, 21-2 and 21-3 will be identified by 21. In FIG. 5, there are provided on the distributed shared memory 21 the message buffer area 21B, the MB management map area 21M, the descriptor ring area 21D and the FIFO area 21F. The respective devices 20 through 24 in the processor module (PM) 18 are connected via a processor bus 30 to the processor 19. The distributed memory coupler 22 has a feature which, upon occurrence of a write access to the distributed shared memory area, sends copy data to the same address location of the distributed shared memories of the other processor modules as well and a feature which receives copy data from the other processor modules and writes it into the distributed shared memory of the processor module to which the distributed memory coupler 22 belongs.

Next, a description will be given of constituents in the distributed memory coupler 22. A bus signal decoder 31 decodes a signal on the signal line of the processor bus 30 and, upon occurrence of write access to the distributed shared memory 21, provides a "1" onto a signal line 32 to activate a transfer control part 33. The transfer control part 33 exerts control over the distributed memory coupler 22 and feeds various control signals (not shown) to internal logics. A module ID management part 34 prestore the destination processor module ID(PM_ID) that is needed when write data to the distributed shared memory 21 is transferred to and from the processor modules. The module ID management part 34 will be described later in more detail with reference to FIG. 6. A packet send register 35 stores a distributed shared memory address and write data to be transferred to another processor module or interrupt information to another processor module. A packet send buffer 36 provides a feature which receives data from the packet send register 35 and temporarily holds it until it is transferred to another processor module. A packet receive buffer 37 provides a feature which receives data transferred from another processor module and temporarily holds it until it is delivered to a packet receive register 38. A packet decoder 39 decodes data in the packet receive register 38 and, if the decoded result is a request for write into an address location in the distributed shared memory 21, then the packet decoder 39 sends a request via a signal line 40 to the transfer control part 33 for the write into the distributed shared memory 21. If the decoded result is an interrupt from another processor module, then the packet decoder 39 sends an interrupt processing request via a signal line 41 to an interrupt control part 42. The interrupt control part 42 responds to the request to send an interrupt request to the processor 19 via a signal line 43.

The distributed memory protector 23 is a hardware mechanism provided to protect the message in the message buffer (21B) from an illegal access, and it comprises a current capability register (hereinafter abbreviated as CCR) 51, an MCR (Memory Capability Register) memory 50 and a comparator 52. The CCR 51 is a register which stores current capability. The current capability herein mentioned is the identifier ID of an application object (an object which is executed in the user mode of the processor, hereinafter abbreviated as APL object) which is being executed in the processor 19. The MCR memory 50 comprises a plurality of memory capability registers 53, each of which stores memory capability associated with one message buffer 21B. The memory capability herein mentioned is an identifier ID of an application object granted the right to access the associated message buffer 21B. Upon occurrence of a memory access to the message buffer 21B, the associated memory capability register (hereinafter abbreviated as MCR) 53 is selected from among the MCRs in the MCR memory 50 on the basis of the MB address and the stored content MC is read out from the selected MCR 53. The comparator 52 compares the content MC of the selected MCR 53 and the stored content CC of the CCR 51 to determine if the memory access is a legal access to the message buffer; if the contents do not match, the comparator 52 concludes that the access is illegal. Upon detection of the illegal access, the comparator causes the concurrent access to the message buffer 21B to be aborted and sends an urgent notice to the processor 19 via a signal line 54.

The control sequence is mentioned below when the distributed memory protector 23 is applied to the message passing from a sender object in the processor module PM 18-1 to a receiver object in the processor module PM 18-2.

(a) Prior to the execution of the sender object, the kernel of the sending PM (18-1) sets the current capability CC, i.e. the sender object ID to the current capability register CCR 51.

(b) The kernel of the sender PM (18-1) acquires a sending MB (21B-1) on the distributed shared memory 21-1 and then sets the memory capability MC to the MCR 53-1 associated with the sending MB (21B-1). The memory capability MC at this time point is the identifier ID of the object which has requested the acquisition of the message buffer, that is, the sender object ID.

(c) Upon each memory access from the sending processor 19-1 to the sending MB (21B-1), the content of the MCR (53-1) (the object ID) associated with the MB (21B-1) and the content (the object ID) of the CCR (51-1) are compared. When the values of the object IDs in the MCR (53-1) and the CCR (51-1) are matched, the access is legal, but if they are not equal, then the access is illegal.

(d) Assume that the message sent from the sending PM (18-1) has reached the receiving MB (21B-2) of the receiving PM (18-2). The kernel of the receiving PM (18-2) sets the current capability CC, i.e. the receiver object ID to the CCR (51-2) prior to the execution of the receiver object.

(e) The kernel of the receiving PM (18-2) sets the memory capability MC to the MCR (53-2) associated with the receiving MB (21B-2). The memory capability at this time point is the identifier ID of the object which is the destination of the message, that is, the receiver object ID.

(f) Upon each memory access from the receiving processor (19-2) to the receiving MB (21B-2), the values of the object IDs in the MCR (53-2) and the current capability register CCR (51-2) are compared in the comparator 52-2; if they are equal, the access is decided to be legal and if not, it is decided to be illegal.

In the above, during the period over which the memory capability MC and the current capability CC are set in the MCR (53) and CCR (51), respectively, (that is, during a protection window open-up period), only the sender or receiver object given the ownership for a message buffer is allowed to access it. When an irrelevant object accesses the message buffer during the protection window open-up period, a mismatch is found between the capabilities in the MCR (53) and the CCR (51) and the access is decided to be illegal. Except during the protection window open-up period all application objects including the sender and receiver objects are prohibited from access to this message buffer. Thus, robust memory protection is provided. Incidentally, the distributed memory protector 23 is activated only in the user mode MB access but does not operate in the supervisor mode MB access, permitting memory access unconditionally. The reason for this is that a program executed in the supervisor mode (a kernel, for example) is usually less likely to contain latent bugs than the application object executed in the user mode, and hence is less likely to make illegal access.

III-3. Configuration of the Module ID Management Part

Figure 6A:
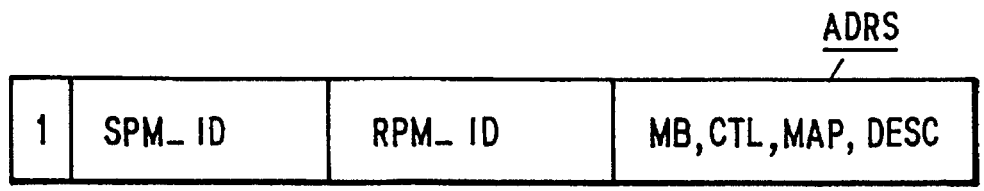
FIG. 6A is a diagram showing an address format which is used to determine a destination processor module without using the module ID management part shown in FIG. 6.
Figure 6:
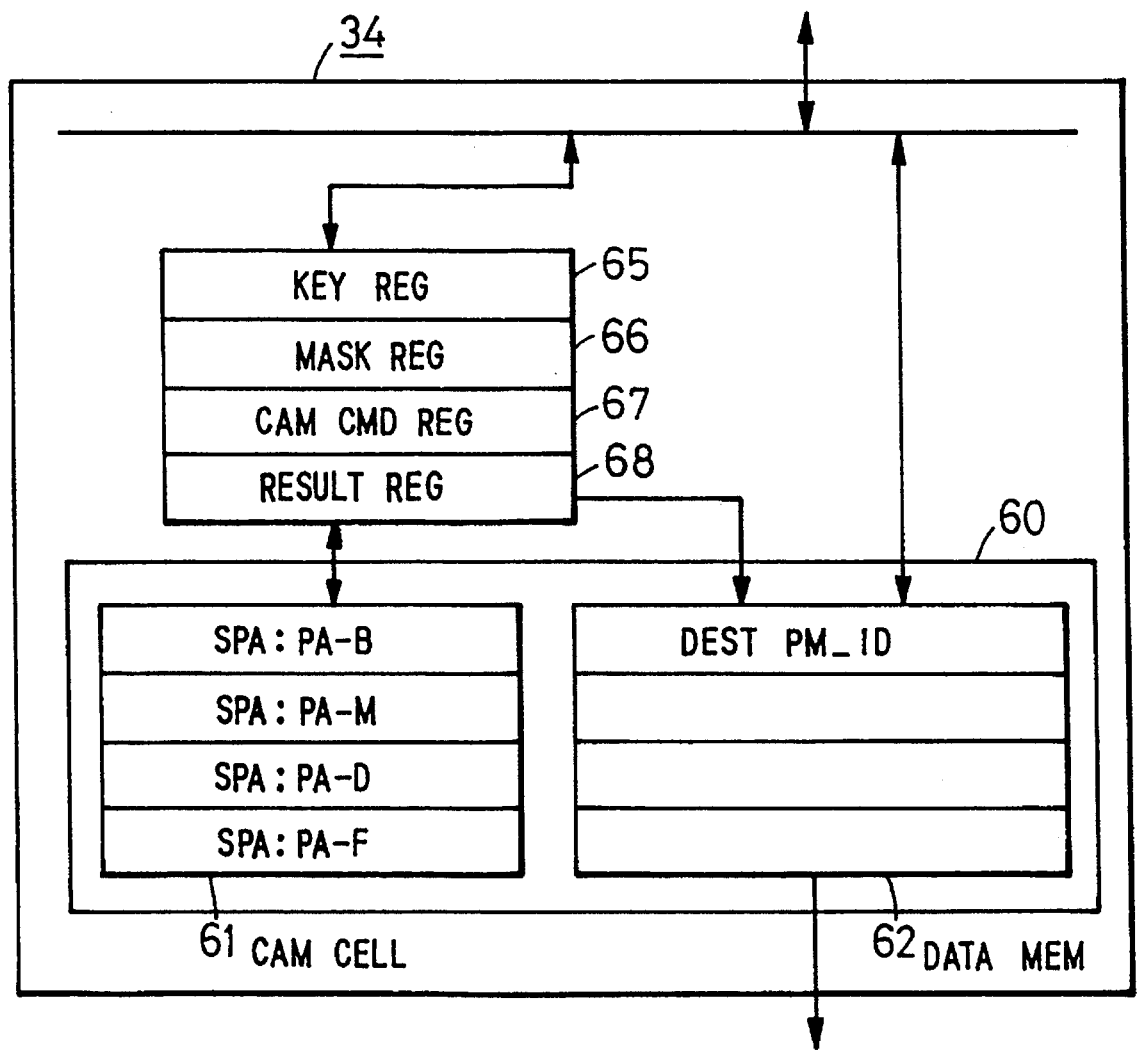
FIG. 6 is a block diagram of a module ID management part in a distributed memory coupler.

FIG. 6 illustrates the internal structure of the module ID management part 34. In FIG. 6, a module ID directory 60 comprises a CAM (Content Addressable Memory) cell part 61 and a data memory part 62. The CAM is a memory which compares retrieval key data with the contents of all cells (CAM cells) in parallel and selects the CAM cell of the content that meets the specified retrieval condition. Each CAM cell stores a "distributed shared memory page address (SPA)." The distributed shared page address (SPA) is a page of the address shared with other processor modules. In SPA there are set, for example, a page address PA-B of the MB pool, a page address PA-M of its MB management map, a page address PA-D of the descriptor ring and a page address PA-F of FIFO communication area which are placed in contiguous areas of the distributed shared memory 21. As referred to previously with respect to FIG. 4, the message buffer MB 21B, the MB management map 21M, the descriptor ring 21D and the FIFO communication area 21F are allocated to different pages partitioned by the destination PM.

On the other hand, the data memory part 62 is a RAM which stores auxiliary data corresponding to the word of each CAM cell. In the data memory part 62 there are stored identifiers of destination processor modules (destination PM_ID) sharing the distributed shared memory page address (SPA).

For the MB management map 21M and the descriptor ring 21D the module ID management parts of both the sending and receiving processor modules keep the shared address and the partner's PM_ID. That is, the CAM cell part 61-1 and the data memory part 62-1 of the module ID directory 60-1 of the sending processor module store therein the shared page address SPA and the receiving PM_ID. Also in the CAM cell part 61-2 and the data memory part 62-2 of the module ID directory 60-2 of the receiving processor module, there are stored the same pair of shared page address SPA and sending PM_ID. Thus, in the module ID directory 60 of each processor module, there are stored PM_IDs of all processor modules desired to copy data. Thus, the MB management map 21M and the descriptor ring 21D can be copied from the sending and receiving processor modules to the partner modules.

A key register 65 in FIG. 6 stores retrieval key data which is compared with the contents of the CAM cell part 61. A mask register 66 is a register which specifies the bit position not to be compared when the retrieval key data in the key register 65 and the contents of the CAM cell part 61 are compared. A CAM command register 67 stores various commands controlling the CAM cell part 61. A result register 68 is a register which indicates the retrieved results such as the presence or absence of the single matched CAM cell, the presence or absence of plural matched cells and the presence or absence of vacant cells. After the matching of the contents of the key register 65 and the CAM cell part 61, a data memory word corresponding to the matched CAM cell is read out from the data memory part 62. Incidentally, the CAM cell part 61 need not necessarily be implemented with the content addressable memory; the same feature as that of the CAM can also be implemented by a combination of hashing techniques and a RAM as is well-known in the art.

The module ID management part 34 operates as described below. Upon write access to the distributed shared memory 21, its address is put into the key register 65 and the corresponding page address is compared with the contents of the CAM cell part 61. When a cell having matched the page address is detected, since this indicates that the page address is shared with the other processor module, the corresponding destination PM_ID is read out from the data memory part 62, added to the shared page address SPA and combined with write data to generate a sending packet, which is stored in the packet sending register 35 in FIG. 5. The packet is sent from the packet sending register 35 to the destination processor module via the packet sending buffer 36.

In the distributed memory coupler 22 at the receiving processor module, the packet receiving buffer 37 receives the data transferred from the sending processor module and hands it over to the packet receiving register 38. The packet receiving register 38 decodes the received data and writes it in the specified address location in the distributed shared memory 21. In this way, data is copied from the sender's distributed shared memory to the receiver's distributed shared memory. Incidentally, write access to the sender's distributed shared memory is completed before copy access to the receiver's distributed shared memory is completed.

This embodiment has been described basically in connection with the case of performing point-to-point copying between processor modules, but point-to-multipoint copying (i.e. broadcasting) is also possible. In such an instance, there are prestored in the module ID directory 60 a plurality of destination PM_IDs for one distributed shared page address SPA. As a result, a plurality of packets are generated for a single write to the distributed shared memory and respectively sent to specified processor modules; hence, the data can be copied to the distributed shared memories of the plural processor modules. By prestoring the receiver's PM_ID in the module ID directory 60-1 of the sending processor module and the sender's PM_ID in the module ID directory 60-2 of the receiver's side processor module for the same distributed memory page address SPA, it is possible to perform what is called bi-directional communication in which data is copied to the distributed shared memory of either of the sender's side and the receiver's side from the other, regardless of which side writes the data into the distributed shared memory.

Incidentally, if shared page addresses and the corresponding destination PM_IDs are predetermined and stored as a table in the module ID management part 34 as mentioned above, the allocation of the shared addresses of the distributed shared memory 21 and the corresponding PM_ID of the respective processor modules 18 can freely be determined independently of each other. However, the module ID management part 34 with such a table of shared addresses and destination PM_IDs can be omitted at the sacrifice of the above-said advantage. For example, as shown in FIG. 6A, by assigning the value of high order plural bits B1 of the address ADRS of the distributed shared memory to the identification number SPM_ID of the sending processor module and the succeeding lower order plural bits B2 to the identification number RMP_ID of the receiving processor module, it is possible to specify the identification number of either of the sending and receiving processor modules in the specified shared address ADRS. The leading bit "1" of the address format shown in FIG. 6A is a bit for identifying the distributed shared memory 21 and the bit area B3 lower-order than the receiving processor module identification number area B2 is to specify any one of the message buffer MB, the MB management map, the descriptor ring and the FIFO area.

III-4. Format of the Packet Transferred between Processor Modules

Figure 7:
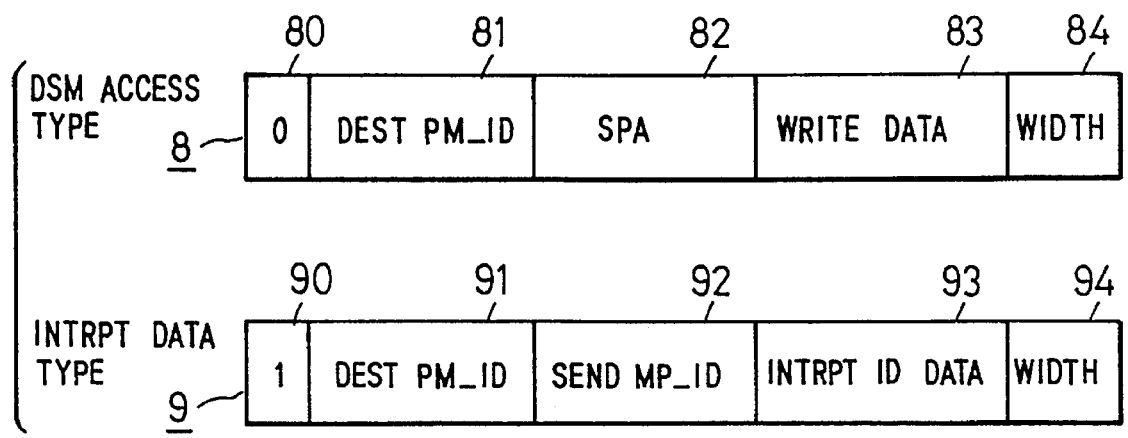
FIG. 7 shows the format of packets which are transferred between processor modules.

FIG. 7 illustrates a data format common to the packet sending register 35 and the packet receiving register 38, whose format falls into a distributed shared memory access type 8 and an interrupt data type 9. Reference numerals 80 and 90 denote attribute identification fields; "0" indicates the distributed shared memory access type 8 and "1" the interrupt data type 9. The distributed shared memory access type data format 8 comprises fields 81 through 84 for the destination PM_ID, outputted from the module ID management part 34, the distributed shared memory address SPA, the write data WRITE DATA and write width WIDTH. The write width field 84 is to specify, for instance, a byte, half word (16 bits), of a long word (32 bits).

On the other hand, the interrupt data type format 9 comprises fields 91 through 94 for the destination PM_ID, outputted from the module ID management part 34, the sending module ID indicating the interrupt source, interrupt identification data INTRPT ID DATA indicating the kind of the interrupt and the write width WRITE WIDTH. Incidentally, when the destination PM_ID fields 81 and 91 have predetermined specific values, the packet can be formed as a broadcast type packet so that all the processor modules receive it.

IV. Various Message Passing Patterns and Their Processing Flows

Figure 8A:
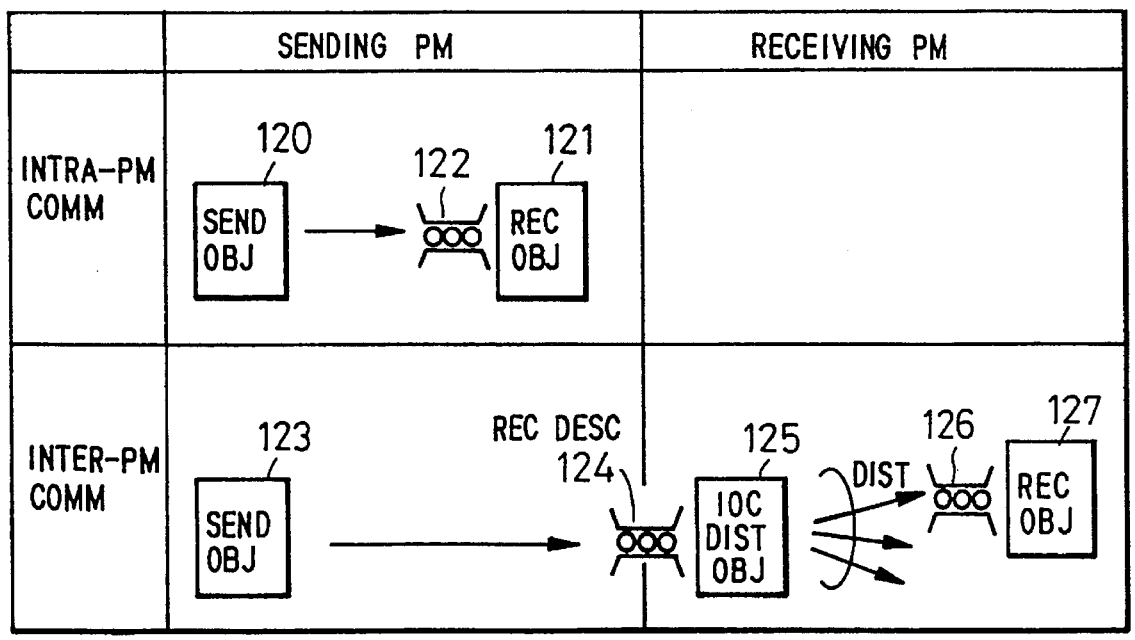
FIG. 8A is a flowchart of intra-system message communication processing.
Figure 8B:
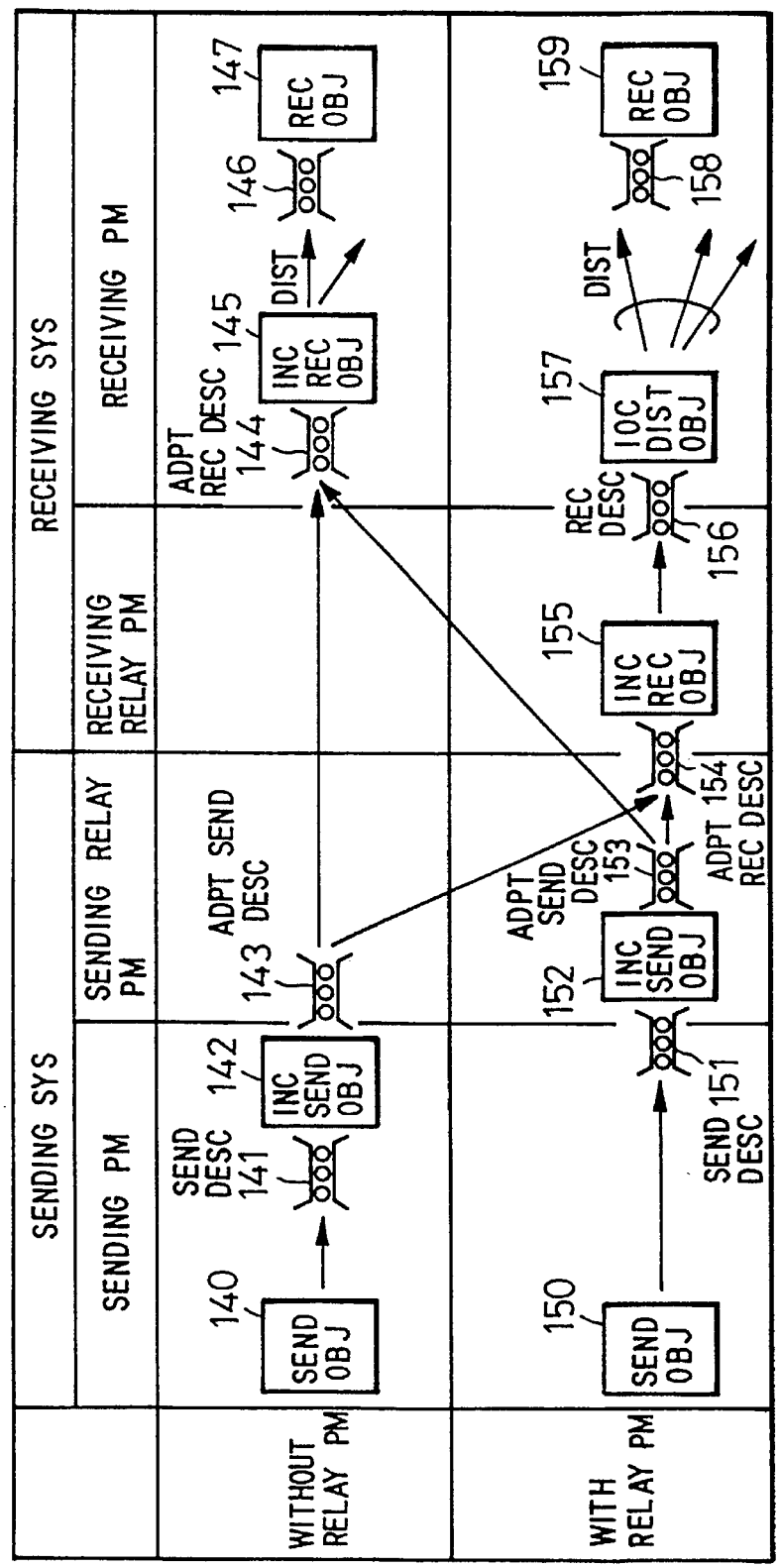
FIG. 8B is a flowchart of inter-system message communication processing.

FIGS. 8A and 8B are schematic diagrams showing various message passing patterns for use in the present invention and their processing flows. The message passing patterns are classified as listed below.

Intra-System Message Communication (FIG. 8A): This refers to the case where the sender object and the receiver object belong to the same multiprocessor system (17 in FIG. 5). The intra-system message communication falls into the following two types.

Intra-PM Communication (upper row in FIG. 8A): This refers to the case where the sender object 120 and the receiver object 121 belong to the same processor module. In this instance, since the kernel knows the address of a message queue 122 of the receiver object 121, the kernel can store the message directly from the sender object 120 to the message queue 122 of the receiver object 121. The receiver object 121 takes out the message from the message queue 122 and performs the corresponding message processing.

Inter-PM Communication (lower row in FIG. 8A): This refers to the case where the sender object 123 and the receiver object 127 belong to different processor modules in the same multiprocessor system 17. In this instance, since the kernel of the processor module (the sending processor module) to which the sender object belongs is unable to see control information (the address of a message queue 126, for example) of the receiver object 127 in the receiving processor module, the message cannot be stored directly in the message queue 126 of the receiver object 127. Then, the sending kernel stores the message in a preknown receiving descriptor ring 124, and in the receiving processor module an IOC (Inter-Object Communication) distribution object 125 (described later with reference to FIG. 20) reads out the receiving descriptor ring 124 and stores the message in the message queue 126 of the receiver object 127.

Inter-System Message Communication (FIG. 8B): This refers to the case where the sender object and the receiver object belong to different multiprocessor systems 17. The inter-system message communication falls into the case where the sending or receiving system includes no relaying PM and the case where the system includes a relaying PM.

When no replaying PM is included: In the case of the sending system, the processor module to which a sender object 140 belongs (a sending PM) and a processor module which has a communication link to the receiving system (a sending relay PM) are the same. In the case of the receiving system, a processor module which terminates the communication link (a receiving relay PM) and the processor module to which a receiver object 147 belongs (a receiving PM) are the same.

When no sending relay PM is included in the sending system, the kernel in the sending processor module stores the message from the sender object 140 in a sending descriptor ring 141 in the processor module to which the sender object 140 belongs. An INC (Inter-System Communication) send processing object 142 (described later with reference to FIG. 21A) reads out the sending descriptor ring 141, then executes network protocol processing for the message and stores the message in an adaptor sending descriptor ring 143. The network adaptor (24 in FIG. 5) takes out the message from the adaptor sending descriptor ring 143 and sends it to a communication network (26 in FIG. 5).

When no receiving relay PM is included in the receiving system, a message is received from the communication network 26 and the network adaptor (24 in FIG. 5) of the receiving processor module stores the message in a receiving descriptor ring 144. An INC receive processing object 145 described later with reference to FIG. 22A) reads out the message from the adaptor receiving descriptor ring 144 and stores the message in a message queue 146 of the receiver object 147 in the same processor module.

When a relaying PM is included: In the case of the sending system, the processor module to which a sender object 150 belongs (a sending PM) has no communication link to the receiving system and a different processor module (a sending relay PM) has the communication link. In the case of the receiving system, a processor module which terminates the communication link (a receiving relay PM) differs from the processor module to which a receiver object 150 belongs (a receiving PM).

When a sending relay PM is included in the sending system, a send processing program of the kernel in the sending processor module (described later with reference to FIG. 18A) stores the message from the sender object 150 in a sending descriptor ring 151 for the sending relay PM. An INC (Inter-System Communication) send processing object 152 (described later with reference to FIG. 21A) of the sending relay PM reads out the message from the sending descriptor ring 151, executes network protocol processing for the message and stores the message in an adaptor sending descriptor ring 153. The network adaptor (24 in FIG. 5) takes out the message from the adaptor sending descriptor ring 153 and sends it to the communication network 26.

When a receiving relay PM is included in the receiving system, a message is received from the communication network 26 and the network adaptor 24 of the receiving relay PM store the message in an adaptor receiving descriptor ring 154. Then, an INC receive processing object 155 (described later with reference to FIG. 22A) of the receiving relay PM reads out the message from the adaptor receiving descriptor ring 154 and stores it in a receiving descriptor ring 156 for the receiving processor module which is the final destination of the message. In the receiving processor module, an IOC (Inter-Object Communication) distribution or delivery object 157 (FIG. 20) reads out the message from the receiving descriptor ring 156 and stores it in a message queue 158 of the receiver object 159.

The number of combination patterns of the inter-system message communication is a total of four, that is, (sending relay included/not included)×(receiving relay included/not included).

Figure 8C:
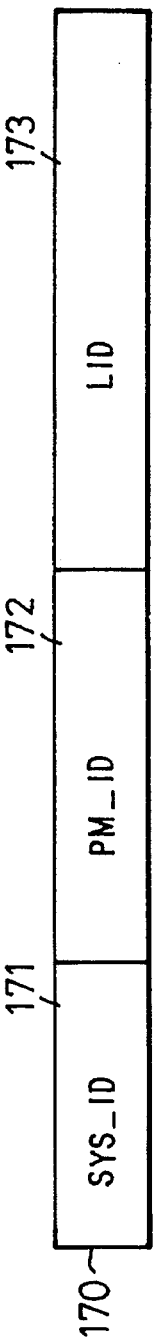
FIG. 8C is a diagram showing an object ID format.

FIG. 8C illustrates the format of an object ID (170) of each application object. A field 171 indicates the identification number SYS_ID of the multiprocessor system to which the object belongs, and this field is allocated so that it can uniquely be identified in the communication network. A field 172 indicates the processor module identification number PM_ID and takes a value that can uniquely be identified in the multiprocessor system. A field 173 indicates a local identification number LID, which is a number for uniquely identifying the object in the processor module.

IV-1. Descriptor Ring and Processing Request FIFO Area

Figure 9A:
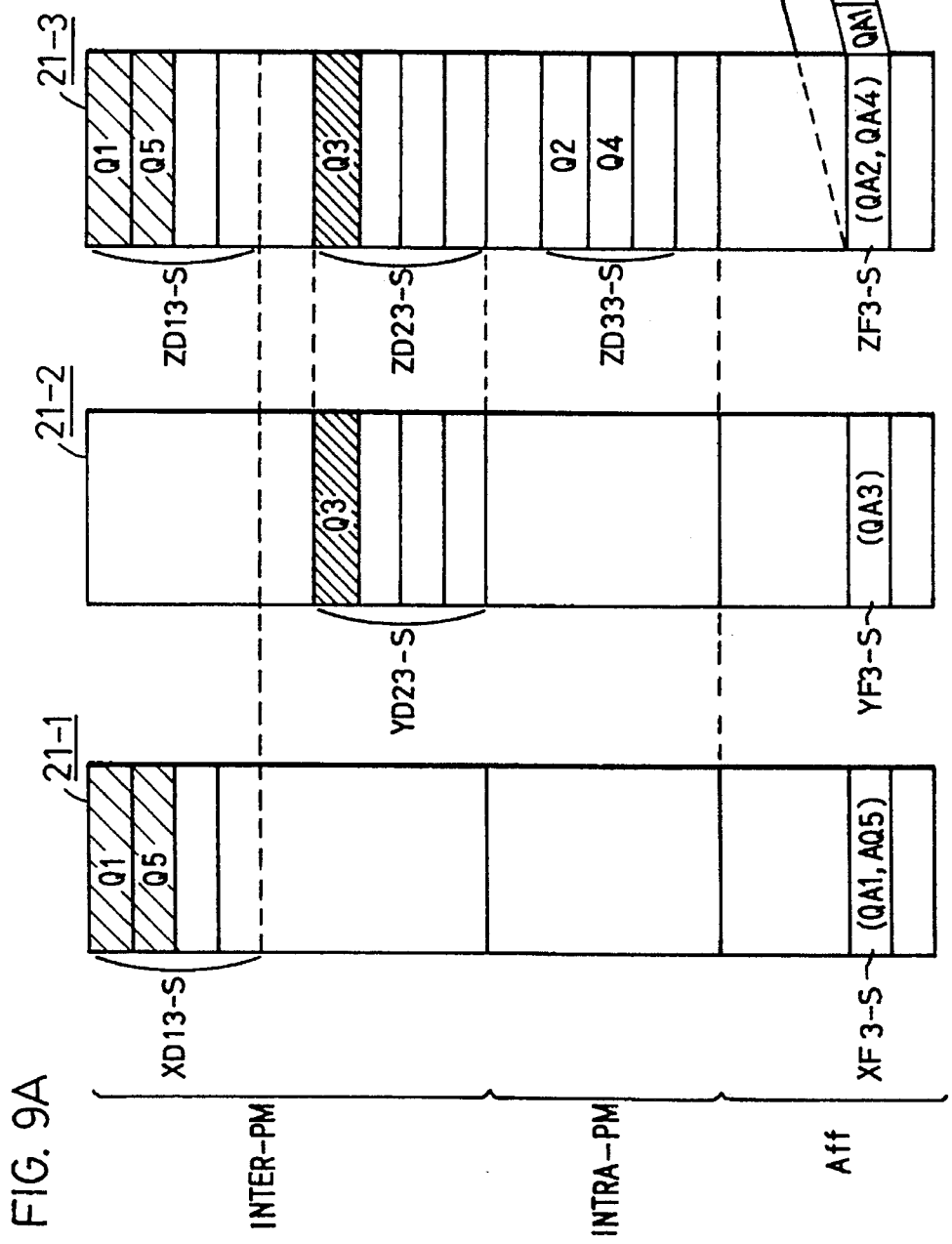
FIG. 9A is a diagram schematically illustrating examples of the arrangement of sending descriptor rings and memories for send processing requests.
Figure 9B:
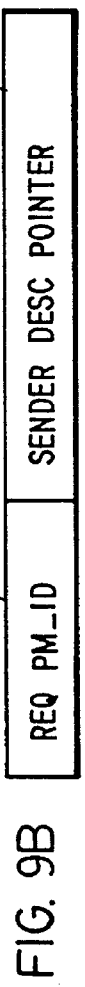
FIG. 9B is a diagram showing the format of a send processing request.

FIGS. 9A and 9B are explanatory of the relationship between a sending descriptor ring and a sending request FIFO area. Sending descriptor rings for messages from PM#1 (18-1) to PM#3 (18-3) are shown as a pair (XD13-S, ZD13-S); sending descriptor rings for messages from PM#2 (18-2) to PM#3 (18-3) are shown as a pair (YD23-S, ZD23-S); and a sending descriptor ring in the PM#3 is identified generally by ZD33-S. Furthermore, a send processing FIFO area provided in PM#1 (18-1) for handling a message to PM#3 (18-3) is identified by XF3-S; a send processing FIFO area provided in PM#2 (18-2) for handling a message to PM#3 (18-3) is identified by YF3-S; and a send processing FIFO area in PM#3 (18-3) is identified by ZF3-S.

FIG. 9A shows an example of inter-system PM relayed communication. Assume that a plurality of sender objects are distributed in PM#1 (18-1), PM#2 (18-2) and PM#3 (18-3) and that the sending relay PM is PM#3 (18-3). On the assumption that a total of five messages Mi (where i=1 ... , 5) are transferred to the communication network via PM#3 (18-3), sending descriptors for the respective messages are identified in a sequential order Q1-Q2-Q3-Q4-Q5 and send processing requests corresponding to them in a sequential order QA1-QA2-QA3-QA4-QA5. The data structure of the send processing request is made up of the identification number of the requesting processor module (PM_ID) 175 and a descriptor pointer (SENDER DESC POINTER) 176, as shown in FIG. 9B. The sending descriptor Qi comprises a logical link number L#, an MB address MBA and an execution right EX (203) as described later with reference to FIG. 10C.

The sending request is transferred in such a manner as described below. First, upon occurrence of a message M1 sending request in PM#1 (18-1), the requesting processor module PM#1 (18-1) stores the sending descriptor Q1 in the PM#3-destined message sending descriptor ring XD13-S and then stores the send processing request QA1 in the PH#3-destined message send processing FIFO area XF3-S. These stored data are copied by the distributed memory coupler 22 to the sending descriptor ring ZD13-S on PM#3 and the send processing FIFO area ZF3-S on PM#3, respectively.

When a request for sending a second message M2 occurs in PM#3 (18-3), the sending descriptor Q2 is stored in the intra-PM #3 message sending descriptor ring ZD33-S and the send processing request QA2 is stored in the PM#3-destined message send processing FIFO area ZF3-S. In this instance, the sending descriptor Q2 and the send processing request QA2 are not copied to other processor modules, since the communication is intra-PM communication. Incidentally, since the send processing FIFO area ZF3-S has a FIFO memory structure, it allows additional storing therein of the second send processing request QA2 while keeping the first-stored processing request QA1 until it is read out.

Upon occurrence of a request for sending a third message M3 in PM#2 (18-2), the sending descriptor Q3 is stored in the PM#3-destined message sending descriptor ring YD23-S and the send processing request QA3 in the PM#3-destined message end processing FIFO area YF3-S. Then, the sending descriptor Q3 and the send processing request QA3 are copied to the sending descriptor ring ZD23-S on PM#3 (18-3) and the send processing FIFO area ZF3-S on PM#3, respectively. The send processing FIFO area ZF3-S stores therein the third send processing request QA3 while keeping the previous requests QA1 and QA2.

The same goes for the sending descriptors Q4 and Q5. At the stage of completion of storing the requests Q1 through Q5, the descriptors and the requests are stored as shown in FIG. 9A.

At this stage, the INC send processing object in PM#3 (18-3) can read out the send processing requests QA1, QA2, QA3, QA4 and QA5 from the PM#3-destined message send processing FIFO area ZF3-S in the order in which they were input thereinto. From the sending or requesting processor module identification number PM_ID (175 in FIG. 9B) described in the request data and the sender descriptor pointer 176 can be known the location of the corresponding sending descriptor Qi; and then the location of the message buffer address MBA (FIG. 10C) can be obtained from the sending descriptor Qi. The INC send processing object of PM#3 processes the messages in the message buffers specified by the message buffer addresses MBA in a sequential order and sends them to the network 26 via the network adaptor 24-3.

In the conventional polling system, the three sending descriptor rings ZD13-S, ZD23-S and ZD33-S are sequentially polled to check them for the sending requests; this means that it is necessary to check all sending descriptor rings, whether the sending request is present or not. Accordingly, there are cases where sending descriptor rings with no processing request are read out in vain, and hence the processing overhead is inevitably large. In contrast thereto, according to the present invention, sending requests can be detected by simply periodically reading the PM#3-destined send processing FIFO area ZF3-S in PM#3; that is, no fruitless readout of the sending descriptor rings is involved, and consequently, the message handling efficiency is very high. Moreover, even if the storing of a processing request in the send processing FIFO area ZF3-S from PM#1 via the send processing FIFO area XF3-S and the storing of a processing request in the send processing FIFO area ZF3-S from PM#2 via the send processing FIFO area YF3-S occur concurrently, the FIFO memory structure of the send processing FIFO area ZF3-S stores all the processing requests serially—this eases contention between the multiprocessors, and hence greatly reduces the message handling overhead.

Incidentally, the FIG. 9A example has been described in connection with the case of the sending request, but also in the case of the receiving request, it is possible to efficiently detect the actually raised receiving requests by reading out the PM-destined message receiving requests from only the specified receive processing FIFO area.

IV-2. Structures of Various Control Data

Figure 10A:
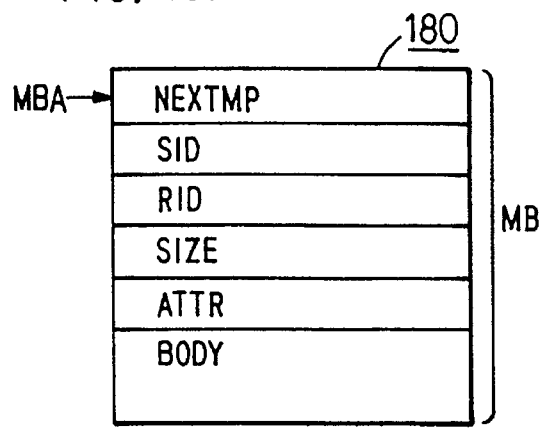
FIG. 10A is a diagram showing the data structure of a message buffer.
Figure 10B:
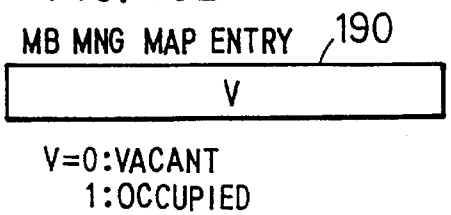
FIG. 10B is a diagram showing the data structure of an MB management map.

FIGS. 10A through 10E illustrate structures of various pieces of data for use in the present invention. FIG. 10A shows the data structure of a message buffer MB 180. Reference character NEXTMP denotes a message queue pointer for messages destined for the receiver object; SID denotes the identification number of the sender object from which the message is sent; RID denotes the identification number of the receiver object which is the destination of the message; SIZE denotes the size of the message body BODY; ATTR denotes a field indicating the attribute of the messages; and BODY denotes a field indicates the contents of the message. The base address of the message buffer 180 is provided as a message buffer address MBA. Each message buffer has a size of a fixed length, and as described previously in connection with FIG. 4, message buffers destined for the same processor module identification number PM_ID are allocated to contiguous areas of the distributed shared memory 21, forming one MB pool. The MB management map is provided for each MB pool, and the MB management map is formed by MB management map entries of the same number as that of message buffers in the MB pool. FIG. 10B shows the structure of an MB management map entry 190, and V=0 indicates the "vacant" state of the corresponding message buffer and V=1 the "occupied" state of the message buffer. The MB management map entry 190 1s structured so that its address can be obtained by a simple calculation from the value of the base address MBA of the corresponding message buffer.

Figure 10C:
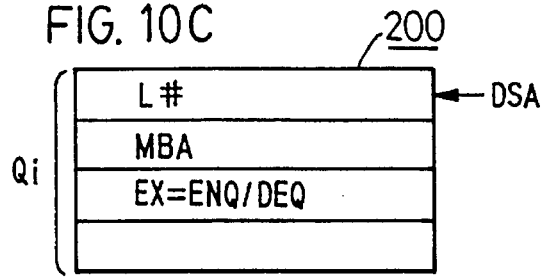
FIG. 10C is a diagram showing the data structure of a descriptor.

Similarly, a pair of sending and receiving descriptor rings are provided for each destination PM corresponding MB pool. As referred to previously with respect to FIGS. 8A and 8B, the sending descriptor ring stores control information for messages to other systems and the receiving descriptor ring stores control information for messages transferred from other systems or other processor modules in the same system. Each entry (descriptor) of the descriptor ring correspond to the associated message buffer. FIG. 10C shows the data structure of the descriptor 200. Reference character L# denotes the logical link number, which is the identification number of the communication link that is used to transfer a message on the associated message buffer to other systems via the communication network 26; MBA denotes a field in which to store the base address MBA of the associated message buffer, and this is the same as that denoted by MBA in FIG. 10A; and EX denotes information indicating an execution right, and EX="ENQ" represents the state in which the descriptor can be enqueued into the descriptor ring and EX="DEQ" the state in which the descriptor can be dequeued from the descriptor ring.

Figure 10D:
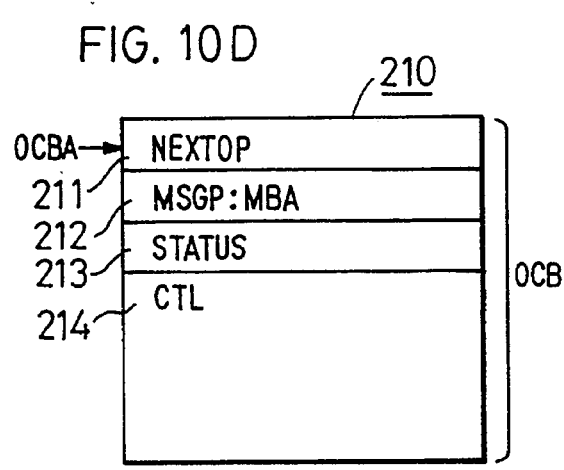
FIG. 10D is a diagram showing the data structure of an object control block.

FIG. 10D shows the structure of an object control block (OCB) 210 in which to store various pieces of control data for the execution of an application object. Reference character OCBA denotes a pointer indicating the base address of the object control block 210; NEXTOP in a field 211 denotes a pointer for the next object control block 210, linked in a ready queue; MSGP in a field 212 denotes the address MBA of the message buffer having stored therein the message destined for an object; and STATUS in a field 213 shows the object execution status and is used to control synchronization between the sender and receiver objects. A field 214 indicates other control CTL.

Figure 10E:
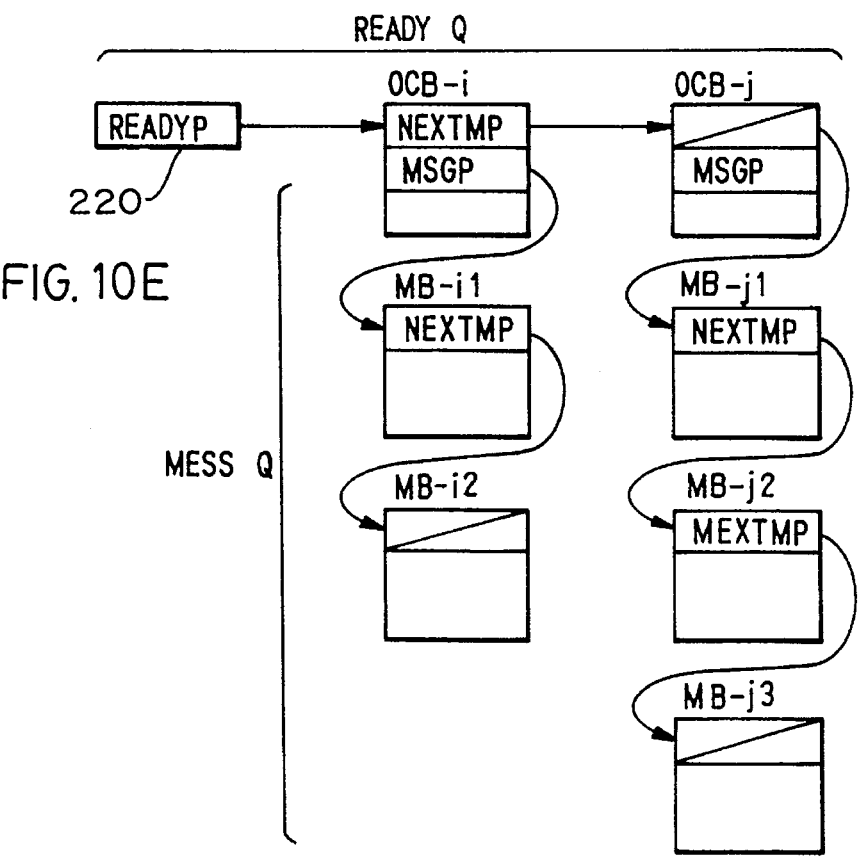
FIG. 10E is a diagram showing the data structure of a ready queue.

FIG. 10E shows the relationship between the ready queue having en queued therein object control blocks awaiting the execution for the processor 19 and various other control data structures. In this example, there are enqueued two object control blocks OCB-i and OCB-j in the ready queue pointed by READYP 220, the object control block OCB-i is shown to have received two messages and the object control block OCB-j is shown to have received three messages. Each application object is enqueued in the ready queue when it becomes executable in the processor. For instance, upon transfer of a message from a sender object, it is enqueued into the message queue of the receiver object under control of an IOC distribution processing program (described later with reference to FIG. 20) or INC receiving program (described later with reference to FIG. 22A), and the OCB (OCB-i in FIG. 10E, for instance) of the receiver object is enqueued into the ready queue. An application object activating program (described later with reference to FIG. 16A) dequeues the receiver object OCB-i at the beginning of the ready queue and passes control to the receiver object to initiate its execution. The receiver object reads out the message from the message buffer MB-i1 (FIG. 10E) enqueued in the message queue and, upon completion of the corresponding processing, reads out the next message buffer MB-i2. When processing of all messages is completed, the receiver object passes control to an application object deactivating program (described later with reference to FIG. 16B). The application object deactivating program performs post-processing and is handed over to the application object activating program, which dequeues the next object control block (OCB-i in FIG. 10E) from the ready queue, initiating the execution of the object. In the interest of brevity, in the following embodiments the message that is stored in each application object will be described to be one at most; that is, the message queue length of the application object will be described to be one at most.

IV-3. Structures of a System Routing Table and a PM Routing Table

Figure 11A:
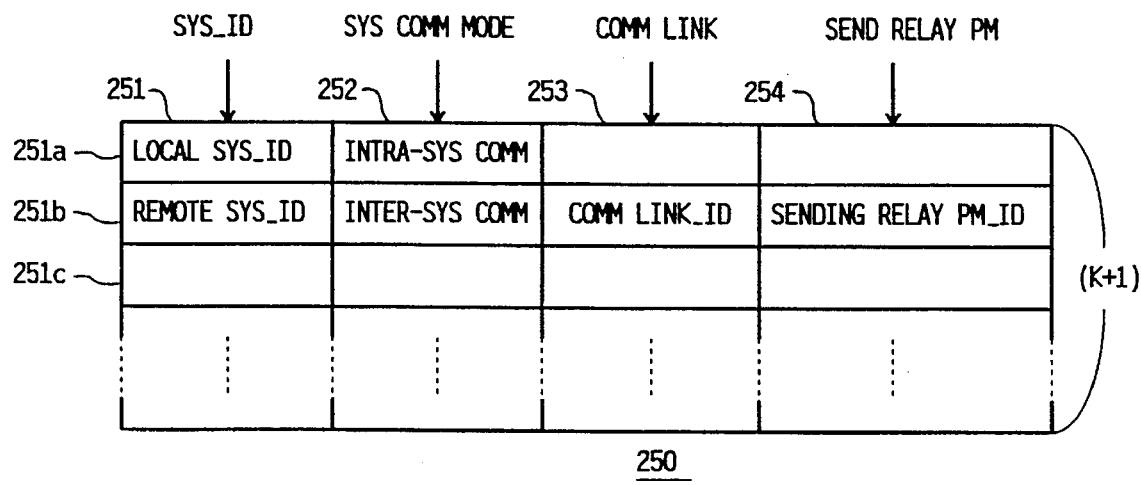
FIG. 11A is a diagram showing the structure of a system routing table necessary to select a message buffer.
Figure 11B:
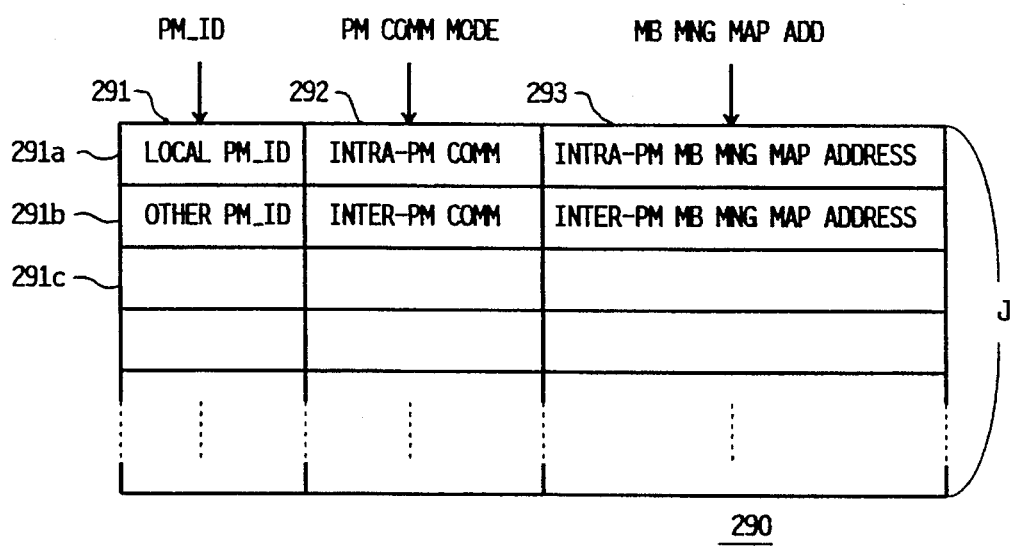
FIG. 11B is a diagram showing the structure of a PM routing table necessary to select a message buffer.

FIGS. 11A and 11B illustrate the structure of a routing table that specifies the processor module through which a message is sent and received, on the basis of the value of the receiver object identification information RID (RID in FIG. 10A). The routing table of this embodiment is made up of a system routing table 250 and a PM routing table 290, which are stored in the local memory 20 of each processor module (FIG. 5).

Each entry of the system routing table 250 comprises a system ID field 251, a system communication mode field 252, a communication link field 253 and a sending relay PM field 254. In the system ID there is stored the identification information "SYS_ID" of the system to which each processor module belongs. In an entry 251a there is stored the identification information of the system to which the processor module having the system routing table belongs. In the system communication mode field 252 of the entry 251a, there is stored information "INTRA-SYS COMM" indicating the intra-system communication. In entries 251b, 251c, . . . of the system ID field 251, there are stored the other system's identification information SYS_ID. In the system communication mode field 252 corresponding to these entries, there is stored information "INTER-SYS COMM" indicating the inter-system communication. In the communication link field 253, there is stored information "LINK_ID" indicating the identification number of the communication link connected to other systems. In the sending relay PM field 254, there is stored information "SENDING RELAY PM" indicating the identification numbers of sending relay PMs accommodating the communication link "LINK ID." When a certain multiprocessor system 17 is connected to K other multiprocessor systems, the total number of entries of the system routing table 250 is (1+K).

The PM routing table 290 comprises a PM_ID field 291, a PM communication mode field 292 and an MB management map address field 293. In the PM_ID field 291, there is stored identification information PM_ID of each processor module. In an entry 291a of the PM_ID field 291, there is stored the identification information PM_ID of the processor module having the PM routing table 290. In the PM communication mode field 292 corresponding to the entry 291a, there s stored information "INTRA-PM COMM" indicating the intra-PM communication. In the MB management map address field 293 corresponding to the entry 291a, there is stored the intra-PM communication MB management map address "INTRA-PM MB MNG MAP ADDRESS." In entries 291b, 291c, . . . of the PM_ID field 291, there are stored identification numbers PM_ID of the other processor modules. In the PM communication mode field 292 of these entries 291b, 291c and so on, there is stored information "INTER-PM COMM", and in the MB management map address field 293 there is stored "INTER-PM MB MNG MAP ADDRESS" (the Inter-PM communication MB management map base address) corresponding to the PM_ID. A detailed description will be given later of how each field is used. When a certain multiprocessor system 17 is made up of J processor modules, the total number of entries of the PM routing table is J.

V. Timing Charts of Various Communication Modes and Various Flowcharts

FIGS. 12 through 15 are timing charts of intra-system-intra-PM communication, the intra-system-inter-PM communication, the non PM-relaying inter-system communication and the PM-relaying inter-system communication. Of execution steps of the processor in FIGS. 12 through 15, the steps indicated by the thick lines (for example, step S100 in FIG. 12: ACTIVATE APL OBJ) are executed in the supervisor mode of the processor and the steps indicated by thin lines (for example, step S102 in FIG. 12: WRITE MESS) are executed in the user mode of the processor.

FIGS. 16 through 22 are flowcharts of programs of kernel themselves or programs that the kernels activate in response to requests from application (APL) objects. The kernel and the related programs are all executed in the supervisor mode of the processor. These programs will hereinafter be generically called a "kernel" unless otherwise specified.

Figure 16A:
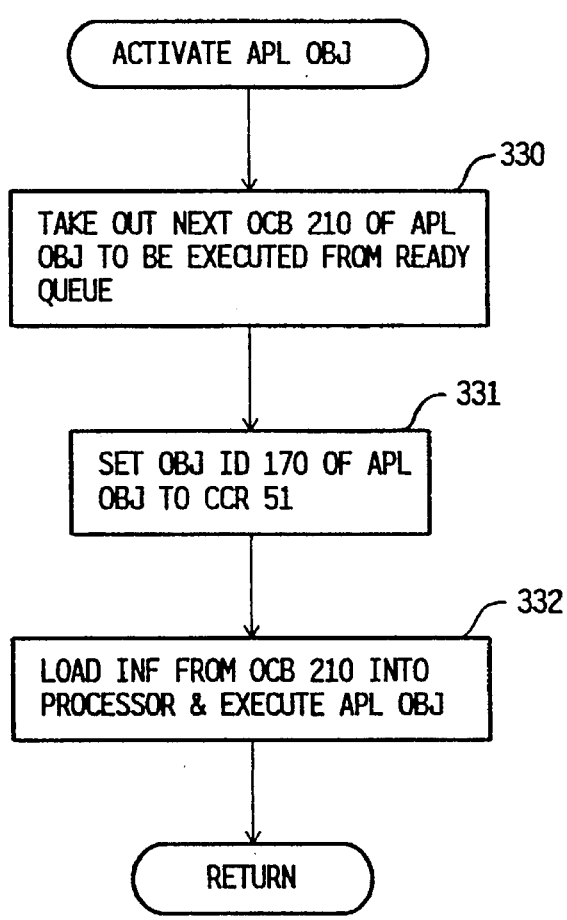
FIG. 16A is a flowchart of kernel processing for activating an application object relating to message communication.
Figure 16B:
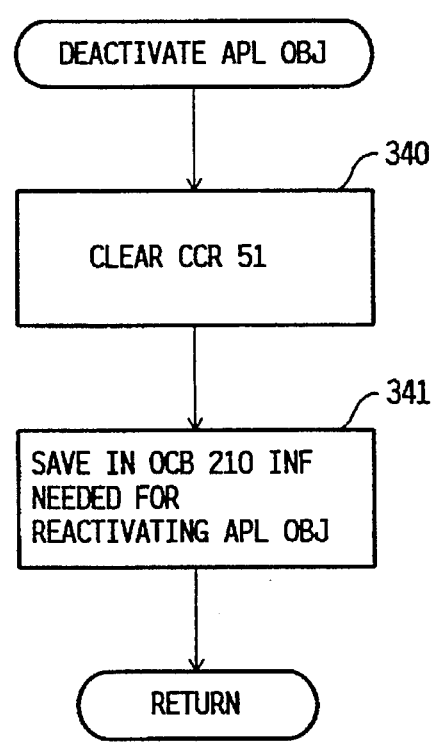
FIG. 16B is a flowchart of kernel processing for deactivating the application object.
Figure 17A:
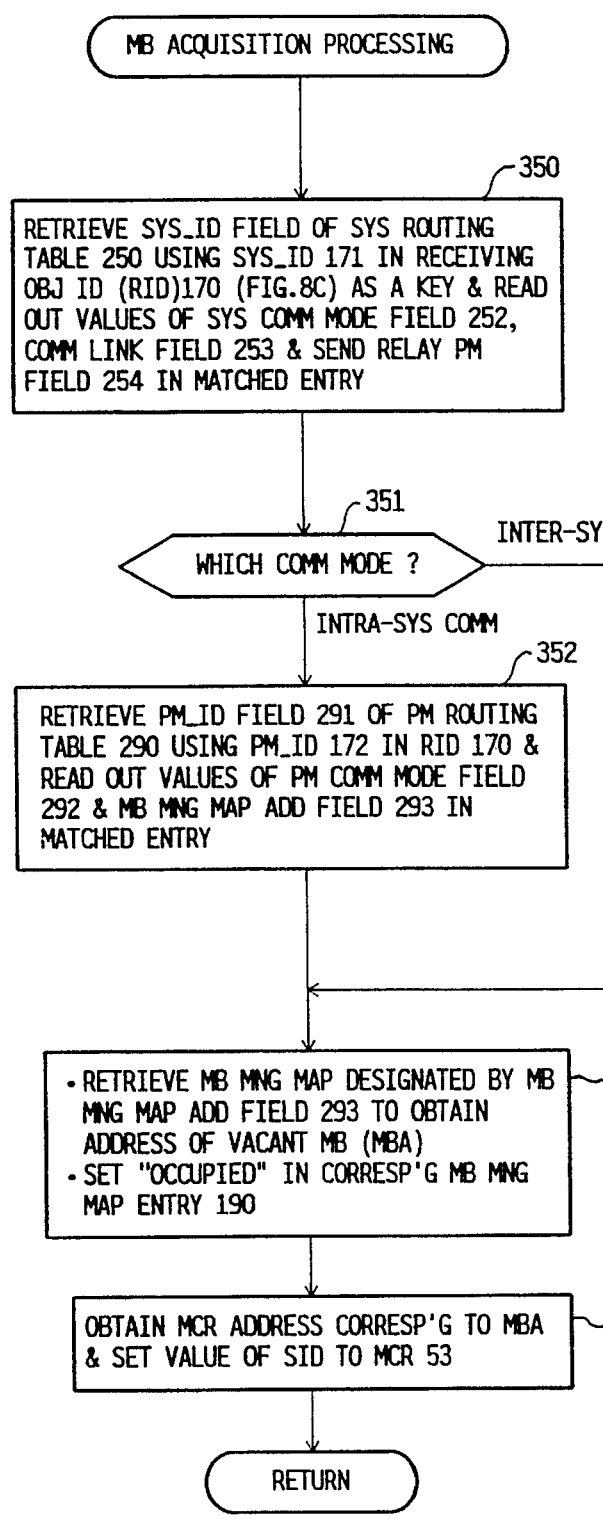
FIG. 17A is a flowchart of message buffer (MB) acquisition processing
Figure 17B:
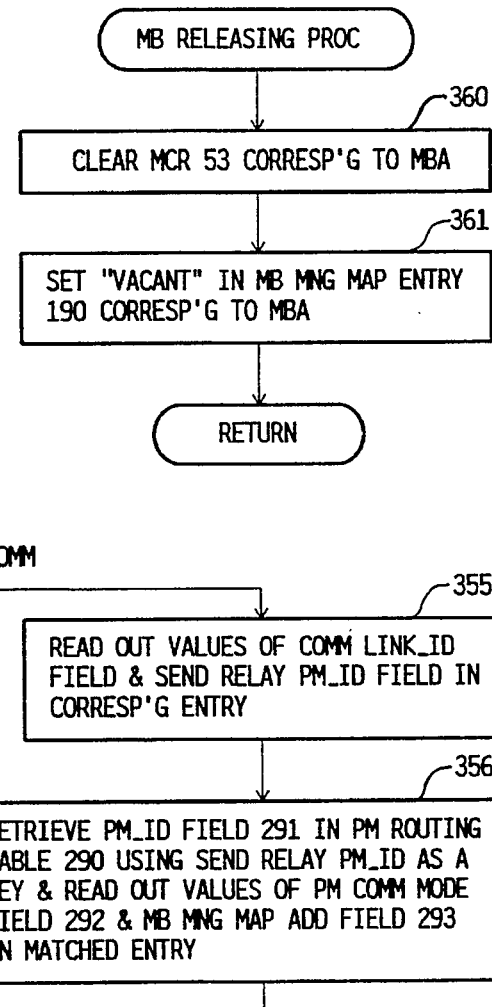
FIG. 17B is a flowchart of MB releasing processing.
Figure 18A:
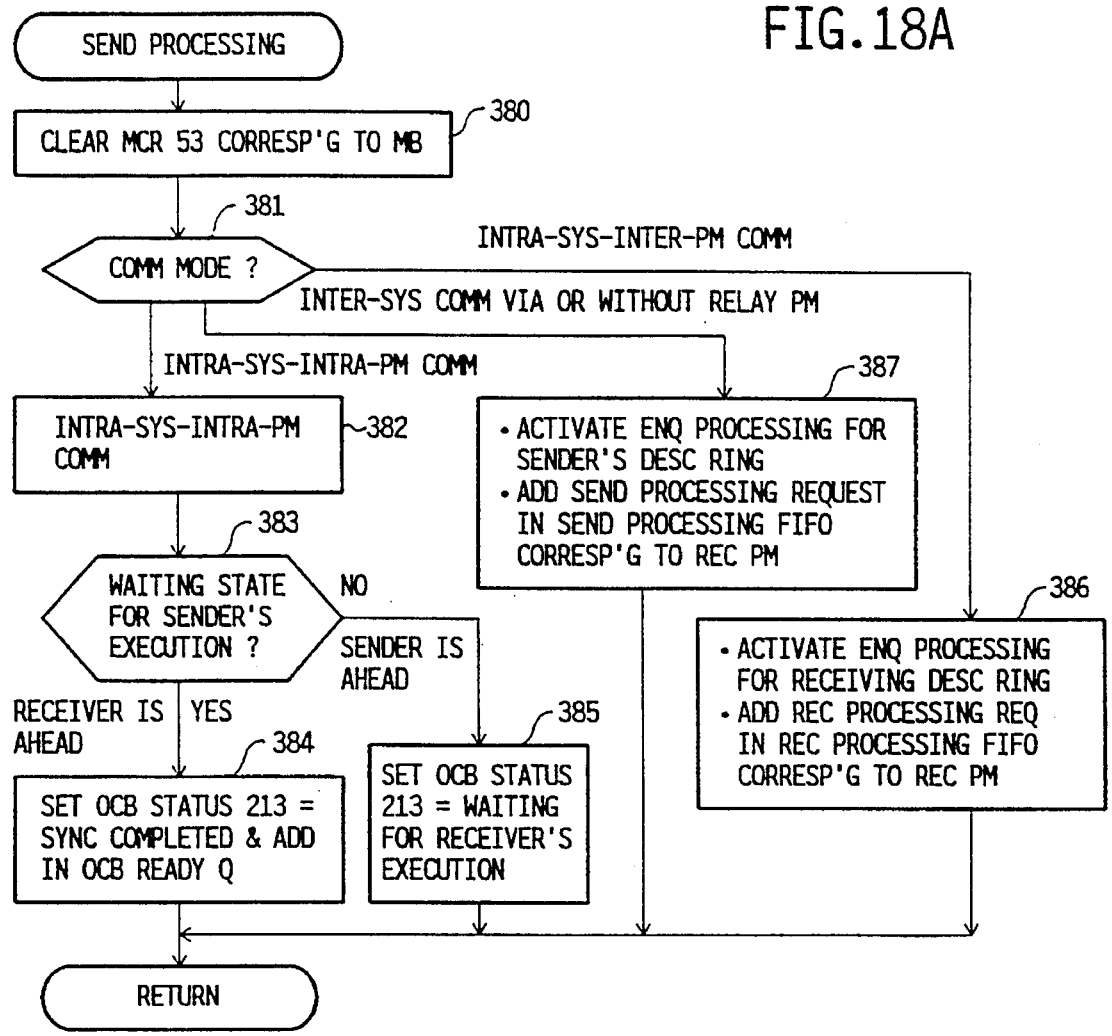
FIG. 18A is a flowchart of send processing.
Figure 18B:
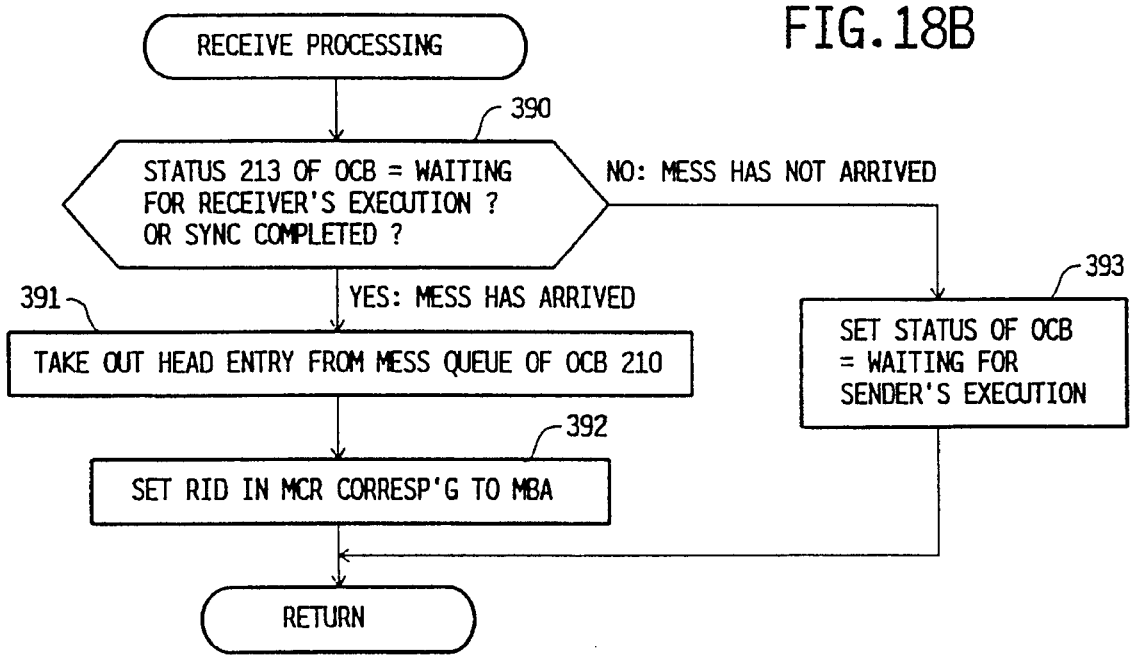
FIG. 18B is a flowchart of receive processing.

FIGS. 16A and 16B are flowcharts of programs which are parts of the kernel, for activating and deactivating the application (APL) object. FIGS. 17A and 17B are flowcharts of an MB acquisition processing program and an MB releasing processing program; these programs are activated by a request from the APL object. FIGS. 18A and 18B are flowcharts of a message send processing program and a message receive processing program; these programs are activated by a request from the APL object.

Figure 19A:
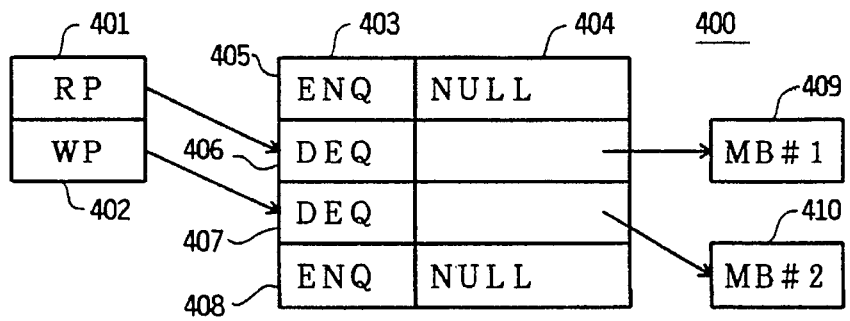
FIG. 19A is a diagram showing the structure of a descriptor ring.
Figure 19B:
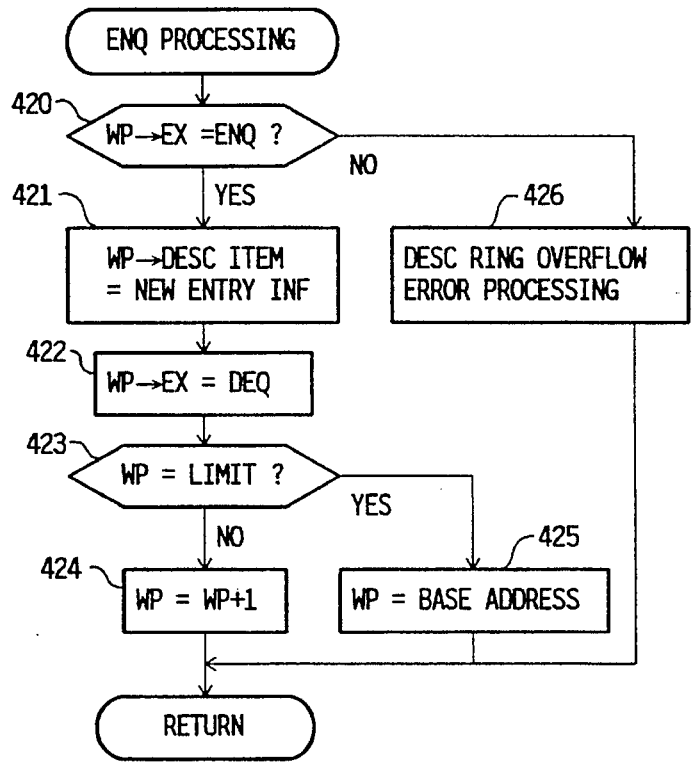
FIG. 19B is a flowchart of enqueue processing.
Figure 19C:
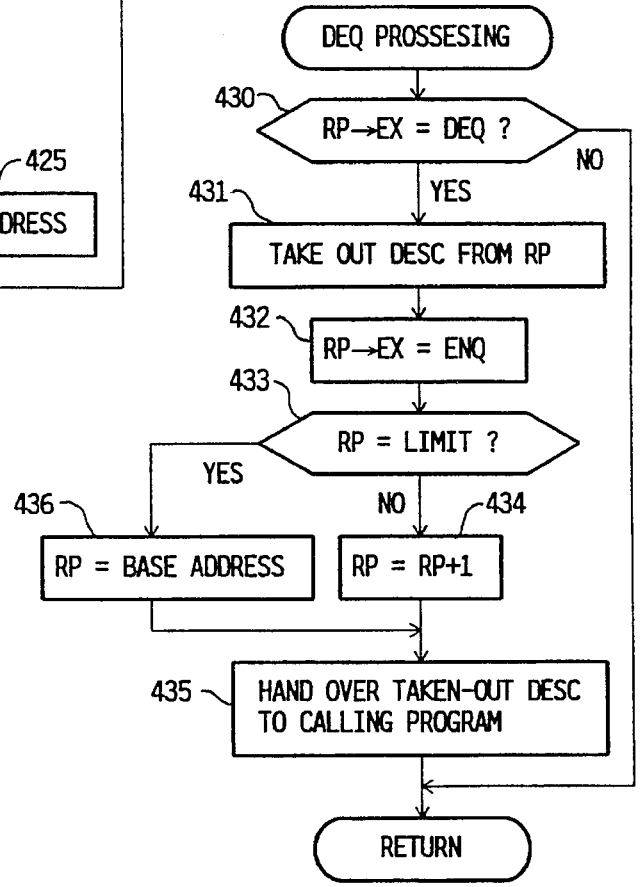
FIG. 19C is a flowchart of dequeue processing.

FIG. 19A shows the logical structure of a descriptor ring 400. FIGS. 19B and 19C are flowcharts of enqueue processing (processing of enqueuing an entry in each descriptor ring) and dequeue processing (processing of dequeuing an entry from each descriptor ring) which are common to the sending descriptor ring, the receiving descriptor ring, the adaptor sending descriptor ring and the adaptor receiving descriptor ring. In FIG. 19A, a read pointer (RP) 401 specifies an entry readout address to dequeue an entry from the descriptor ring 400. A write pointer (WP) 402 specifies an entry write address to enqueue an entry in the descriptor ring 400. Each entry is divided into an execution right field 403 and a descriptor item field 404 for storing processing requests. The contents of the descriptor item field 404 vary, depending on the type of the descriptor ring (the sending or receiving descriptor, for example). The execution right field 403 is to specify whether the object accessing the entry is the enqueuing side or dequeuing side; an indication "ENQ" means that a new entry is allowed to be enqueued, and "DEQ" means that an enqueued entry is allowed to be dequeued. Upon each enqueuing of an entry, the enqueue side increments the right pointer WP (402), announcing the next enqueue position. Upon each dequeuing of an entry, the dequeue side increments the read pointer RP (401), announcing the next dequeue position.

The enqueue processing and dequeue processing are shown in detail in the flowcharts of FIGS. 19B and 19C. In the enqueue processing of FIG. 19B, a test is made in step S420 to determine if the execution right field (403) of the entry indicated by the write pointer WP (402) bears the indication "ENQ." If the result of the test is YES, it means that a new entry can be enqueued; consequently, new entry information is written into the descriptor item field (404) in step 421 and the execution right field (403) of the entry is updated to "DEQ" in step 422. In step 423 a test is made to see if the extremity (END) of the descriptor ring is reached by the enqueue of the new entry. If not, the write pointer WP (402) is incremented in step 424, by which the next enqueue position is set. If the extremity of the descriptor ring is reached, the value of the write pointer WP (402) is assigned to the base address of the descriptor ring in step 425, by which the descriptor ring is used cyclically. If the execution right field 403 is found to bear an indication "DEQ" in step 420, since this means that the previous entry enqueued in the descriptor ring 400 has not yet been read out by the dequeue side and still remains undequeued, error processing of a descriptor ring overflow is performed in step 426.

In the dequeue processing of FIG. 19C, a test is made in step 430 to determine if the execution right field (403) indicated by the read pointer RP (401) bears a display "DEQ." If the result of the test is YES, since this means that the enqueued entry can be dequeued, the descriptor is taken out (from the descriptor item field (404) in step 431 and the execution right field (403) is updated to "ENQ" in stem 432. In step 433 a test is made to determine if the previously enqueued entry has been enqueued at the extremity of the descriptor ring 400. If not, the read pointer RP (401) is incremented in step 434 to announce the next dequeue position and the descriptor entry taken out from the descriptor item field (404) is passed to the calling program in step 435. If it is found in step 433 that the previous entry has been enqueued at the extremity of the descriptor ring (i.e. RP=END), the value of the read pointer RP (401) is assigned to the base address of the descriptor ring in step 436, by which the descriptor ring is used cyclically. If it is found in step 430 that the execution right field bears the indication "ENQ," this means that a new entry has not yet been enqueued by the enqueuing side after the entry was dequeued from the descriptor ring in the previous cycle; in this case, the program returns without performing any operation.

Figure 20:
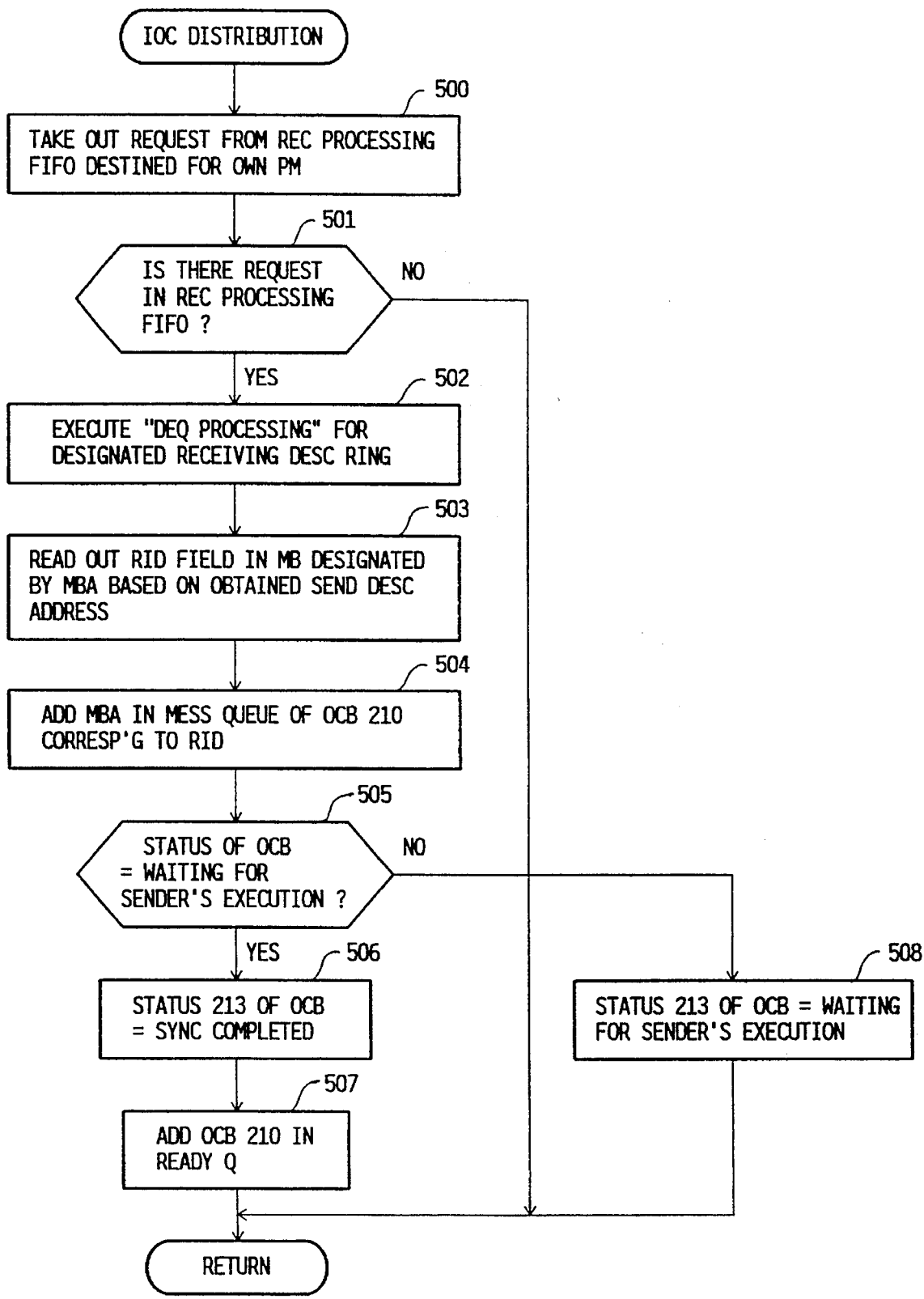
FIG. 20 is a flowchart of IOC distribution processing.
Figure 21A:
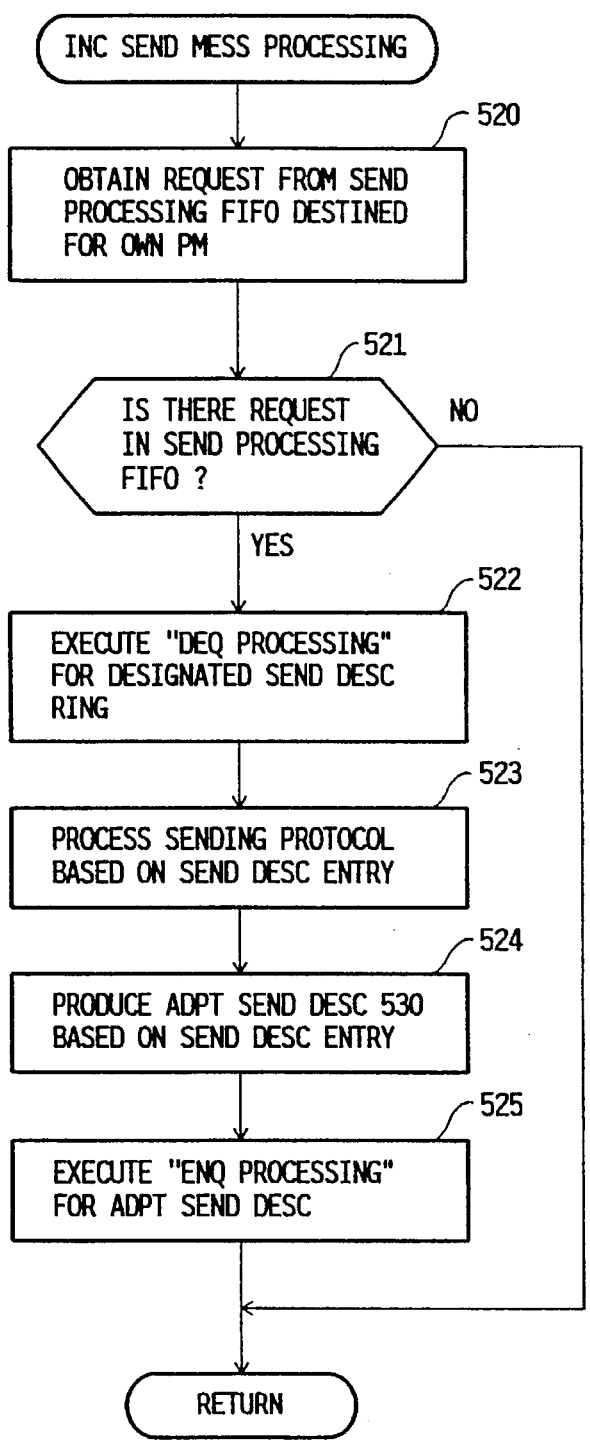
FIG. 21A is a flowchart of INC send processing.
Figure 21B:
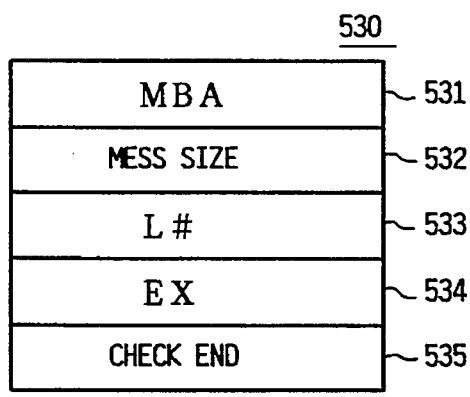
FIG. 21B is a diagram illustrating the structure of an adaptor sending descriptor.

FIG. 20 is a flowchart of an IOC distribution processing program. The IOC distribution program periodically reads out the receive processing FIFO communication area for handling messages destined for the processor modules executing the IOC distribution program (FIG. 4) to see if message receive processing requests have been sent from other processing modules. FIG. 21A is a flowchart of an INC sending message handling program. FIG. 22A is a flowchart of an INC receiving message handling program. FIGS. 12 through 22 will be described in detail in connection with the following embodiments.

Based on the classification of communication patterns in FIGS. 8A and 8B, a description will be given of the four message communication patterns listed below.

Case 1: Intra-system-intra-PM communication

Case 2: Intra-system-inter-PM communication

Case 3: Inter-system communication with no relaying PM (Non-PM-relaying inter-system communication)

Case 4: Inter-system communication through a relaying PM (PM-relaying inter-system communication)

Figure 12:
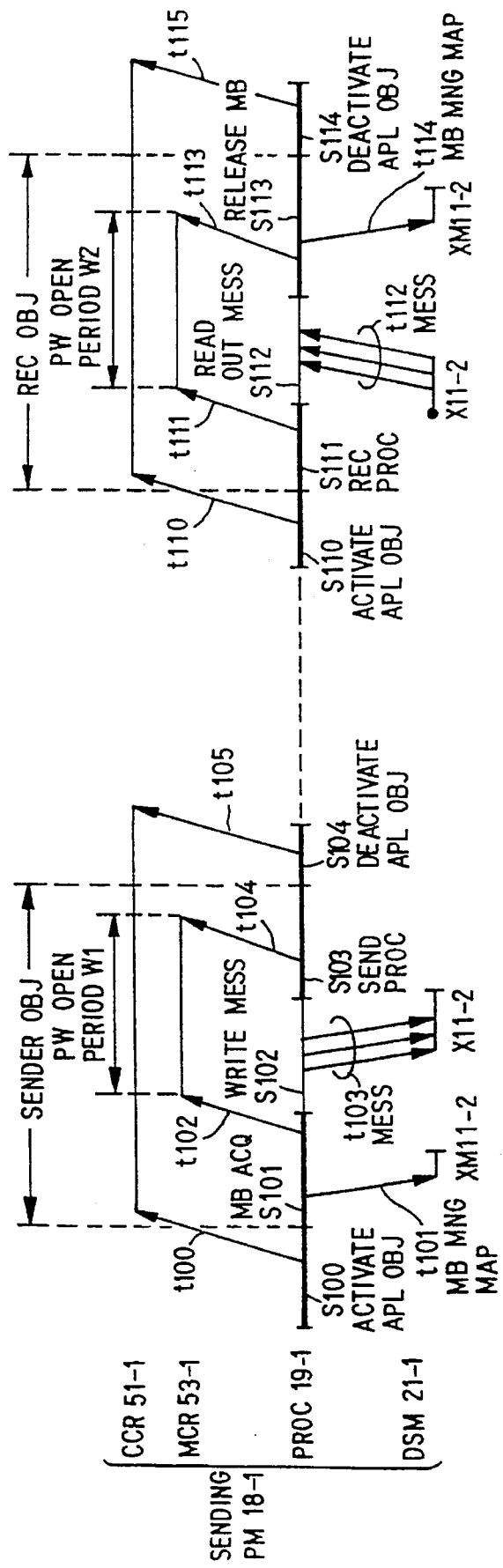
FIG. 12 is a timing chart of intra-PM message communication in the system of the present invention.

V-I. Case 1: Embodiment of Intra-System-Intra-PM Communication (FIG. 12)

V-1-a. Sender's side handling

Assume the case of transferring a message from a sender object in the processor module (PM) 18-1 to a receiver object in the same processor module 18-1. Since the sender object and (the receiver object are executed independently of each other, various timing sequences can be assumed, but in the interest of brevity, let it be assumed that the sender object is executed earlier than the receiver object as shown in FIG. 12. The flow of processing will be described following steps (indicated by SXXX) in FIG. 12 while referring to other drawings.

Step S100:

In step S100 the kernel prepares for the execution of an application (APL) object. What is meant by the APL object is an application program which runs in the user mode. The processing flow of step S100 "ACTIVATE APL OBJ" is shown in FIGS. 16A. In step 330 of FIG. 16A, the kernel takes out from the ready queue (in which executable object control blocks OCBs 210 shown in FIG. 10D are linked in the list structure as shown in FIG. 10E) the object control block OCB (210) of the APL object to be executed next. Then, in step 331 the kernel sets the object ID (170 in FIG. 8C) of the APL object in the current control register CCR 51 (FIG. 5) in the distributed memory protector 23 (FIG. 5). This timing is indicated by timing t100 in FIG. 12. Next, in step 332 of FIG. 16A, the kernel loads necessary information from the object control block OCB 210 into the processor 19, starting the execution of the APL object. In this case, since the APL object is the sender object, the execution of the sender object is initiated.

Step S101:

When the sender object presents the receiver object ID (RID) to the kernel and requests the kernel to acquire a message buffer MB, the kernel executes the MB acquisition processing program shown in FIG. 17A. In step 350 of FIG. 17A, the kernel takes out the system ID field 171 in the receiver object ID (RID: 170 in FIG. 8C). The kernel compares this value with each entry of the system ID field of the system routing table 250 (FIG. 11A) and takes out the values of the system communication mode field 252, the communication link field 253 and the sending relay PM field 254 of the entry that matches the value of the system ID field 171. In this example, since the communication is the one in the same PM in the same system, the value of the system ID field 171 matches the entry 251a and since the corresponding system communication mode field (252) bears an indication "INTRA-SYS COMM, " the kernel proceeds from step 351 to step 352.

In step 352 the kernel compares the PM_ID field 172 of the receiver object ID (RID) in FIG. 8C with each entry of the PM_ID field 291 of the PM routing table 290 (FIG. 11B) and reads out the values of the PM communication mode field 292 and the MB management map address field 293 of the entry that matches the value of the PM_ID field 172. In this example, since the communication is the one in the same PM in the same system, the value of the above-mentioned system ID field 171 matches the entry labelled 291a and the kernel reads out the PM communication mode field labelled "INTRA-PM COMM" and the MB management map address field labelled "INTRA-PM MB MNG MAP ADDRESS."

In step 353 he kernel retrieves the MB management map specified by the selected MB management map address 293 and detects an MB management map entry indicating "vacant," then obtains the corresponding vacant MB address MBA (FIG. 10C) and updates the MB management map entry 190 (FIG. 10B) to "OCCUPIED." The MB management map entries and message buffers are constituted to have a one-to-one correspondence; hence, the MB address can be obtained from the MB management map entry address and vice versa. In this example, the MB management map for the intra-PM communication is selected and a proper vacant message buffer therein, for example, the message buffer (X11-2) in FIG. 4 is selected. At the end of step 353 the MB management map entry (XM11-2) corresponding to the message buffer (X11-2) is updated to "OCCUPIED" at timing t101 in FIG. 12. In the next step 354, the kernel obtains the address of the memo capability register MCR 53 (FIG. 5) corresponding to the message buffer (X11-2) and sets in the memory capability register 53 the sender object ID (SID) of the object having acquired the access right to the message buffer (X11-2) at timing 102 in FIG. 12. With this, the MB acquisition processing of step S101 in FIG. 12 terminates.

Step S102:

In step S102 of FIG. 12, the sender object writes its message into the message buffer (X11-2) at timing t103. A protection window-open period W1 in FIG. 12 is a period during which the APL object ID is set in both of the CCR (51) and MCR (53), and the APL object (the sender object) designated by the MCR and the CCR is allowed to access the message buffer (X11-2) but other APL objects are prohibited from access to the message buffer (X11-2). This effectively protects the message buffer.

Step S103:

When the sender object requests the kernel for sending message, the kernel executes the sending message handling program shown in FIG. 18A. In step 380 of FIG. 18A, the kernel clears the MCR (53) corresponding to the message buffer (X11-2) at timing t104 in FIG. 12. Since the protection window open period W1 in FIG. 12 ends at this timing, any object except the kernel can no longer access the message buffer (X11-2).

Next, in step 381 of FIG. 18A, the kernel checks the communication mode. Since this case is "Intra-System, Intra-PM Communication," the kernel proceeds to step 382 and enqueues the address (MBA) of the message buffer (X11-2) in the message queue of the receiver object control block OCB (210) (FIG. 10D). Then, in step 383 the kernel makes a check to see if the STATUS field 213 (FIG. 10D) of the receiver object control block OCB (210) is "WAITING FOR SENDER'S EXECUTION." The "WAITING FOR SENDER'S EXECUTION" indicates the state in which the receiver object awaits the execution of the sender object after the former is executed earlier than the latter. In this case, since the sender object is executed earlier than the receiver objects, the result of the check in step 383 is "NO" and in step 385 the kernel sets the STATUS field 213 of the receiver object control block 210 to "WAITING FOR RECEIVER'S EXECUTION," indicating the state of awaiting the execution of the receiver object.

Step S104:

In step S104 the kernel deactivates APL object. An APL object deactivation processing program is shown in FIG. 16B. In step 340 the kernel clears the value of the current capability register CCR (51) at timing t105 in FIG. 12. Then, in step 341 of FIG. 16B information necessary for reactivating the sender object is saved in the object control block OCB 210, with which the processing of the sender object is terminated.

V-1-b. Receiver's side handling step S110:

In step S110 of FIG. 12, the kernel selects the receiver object as an object to be executed next and executes an APL object activating program of FIG. 16A. As in the case of the sender object, the kernel sets the receiver object ID (RID) (in FIG. 10A) in the current capability register CCR (51).

Step S111:

When the receiver object is executed and the receiver object requests the kernel for receiving message, the kernel activates a receiving message handling program shown in FIG. 18B. In step 390 of FIG. 18B a test is made to determine if the STATUS field 213 of the object control block RECEIVER OCB (210) of the receiver object is "WAITING FOR RECEIVER'S EXECUTION" or "SYNCHRONIZATION COMPLETED." "WAITING FOR RECEIVER'S EXECUTION" is the state of awaiting the execution of the receiver object after the sender object was executed earlier than the receiver object. "SYNCHRONIZATION COMPLETED" indicates the state in which since the receiver object was executed earlier than the sender object, the receiver object was once blocked and then the sender object was executed, by which the sender and the receiver sides have now been synchronized. In this case, since the STATUS field 213 was set to "WAITING FOR RECEIVER'S EXECUTION" in step S103 in FIG. 12, the result of the test in step 390 is "YES." This means that the message has already been transferred from the sender's side and is ready to be read out. Then, in step 391 the message enqueued in the message queue of the receiver object control block OCB (210) is dequeued therefrom and the address of its message buffer (X11-2) is taken out. Next, in step 392 the receiver ID (RID) (FIG. 10A) is set in the MC R (53) corresponding to the message buffer (X11-2). This timing is indicated by t111 in FIG. 12. As the result of this, the receiver object ID (RID) is set in both of the CCR (51) and the MCR (53), after which during a protection window-open period (W2) in FIG. 12 the message buffer (X11-2) is protected against access from APL objects except the receiver object.

Step S112:

The receiver object reads out the message from the message buffer (X11-2) at timing t112 and performs the corresponding processing.

Step S113:

The receiver object requests the kernel to release the message buffer (X11-2). The kernel activates an MB release processing program shown in FIG. 17B. In FIG. 17B, the kernel clears the MCR (53) corresponding to the message buffer (X11-2) in step 360. This timing is indicated by timing t113 in FIG. 12. Then, in step 361 of FIG. 17B the kernel updates the MB management map entry (XM11-2) corresponding to the message buffer (X11-2) to "VACANT" at timing t114 indicated in FIG. 12. Once the MB management map entry has been set to "VACANT," the message buffer (X11-2) is reusable at any time.

Step S114:

The kernel deactivates the APL object processing and clears the value of the current capability register CCR (51) at timing t115 in FIG. 12. This processing is shown in FIG. 16B and is the same as in the case of the sender object; hence, no description will be repeated.

The example of FIG. 12 has been described in connection with the case where the receiver object is executed after the sender object execution terminates, but in the case where the receiver object has been activated earlier than the message-sending handling step S103, the receiver object enters the state of waiting for the execution of the sender object in step 383 shown in FIG. 18A, and hence the program proceeds to step 384, wherein STATUS 213 of the receiver object control block OCB is set to "SYNC COMPLETED" and enqueued in the OCB ready queue. Thus, when the receiver object is activated again, it is detected in step 390 in FIG. 18B that the STATUS 213 of the receiver object control block OCB is "SYNC COMPLETED," and then steps 391 and 392 are executed as in the above.

As described above, in the case of the intra-system-intra-PM communication, the message buffer is acquired in the distributed shared memory which is directly accessible from the sender object and the receiver object in the user made of the processor—this avoids unnecessary copying between message buffers and permits the implementation of efficient message passing.

Figure 13:
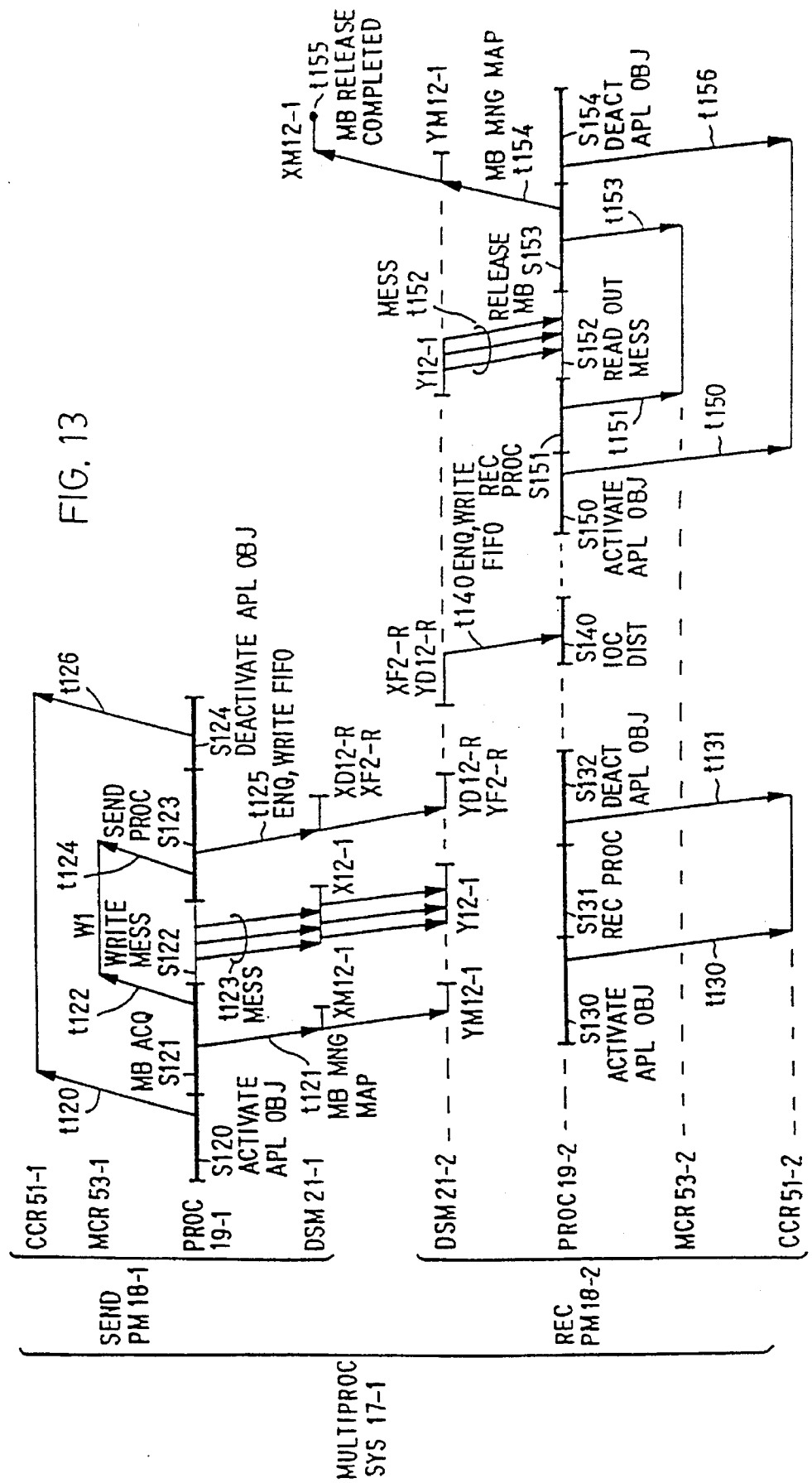
FIG. 13 is a timing chart of message communication between different PMs in the same system.

V-2. Case 2: Embodiment of Intra-System-Inter-PM Communication (FIG. 13)

V-2-a. Processing at Sending PM

Now, assume the case where a message is transferred to a receiver object in the processor module (18-2) from a sender object in the processor module (18-1) in the multi-processor system 17-1. Furthermore, assume the case where the execution of the receiver object is started before the execution of the sender object is completed as shown in FIG. 13. Assume that the message buffer to be used is MB X12-1 shown in FIG. 5. Then, the corresponding MB management map entry is XM12-1. Incidentally, let it be assumed that details of this processing request are stored in the receiving descriptor ring XD12-R and the receive processing request is stored in the receive processing FIFO area (XF2-R) destined for the receiving PM (18-2). The processing flow will be described following steps (indicated by SXXX) in FIG. 13 while referring to other drawings when necessary.

Step S120:

The kernel of the sending processor module (18-1) executes the APL object activating program (FIG. 16A) and sets the sender object ID in the current capability register CCR (51-1) of the processor module (18-1) at timing t120 shown in FIG. 13, and activates the sender object to be executed.

Step S121:

The sender object requests the kernel for MB acquisition, and the kernel executes the MB acquisition processing program shown in FIG. 17A. Since this case is the communication between two processor modules in the same system, the value of the system communication mode field 252 (FIG. 11A) that is taken out in step 350 shown in FIG. 17A is "INTRA-SYS COMM," and the program proceeds from step 351 to step 352. The value of the PM communication mode fields 292 (FIG. 11B) that is read out in step 352 is "INTER-PM COMM," and the kernel reads out "INTER-PM MB MNG MAP ADDRESS" for the receiving PM (18-2) from the MB management map address field 293 correspondingly.

In step 353 the kernel retrieves the MB management map specified by the selected "INTER-PM MB CTL MAP ADDRESS" for an MB management map entry indicating "VACANT," then obtains the vacant MB address corresponding thereto and sets the MB management map entry to "OCCUPIED." In this example, the message buffer (X12-1) is selected as the message buffer for communication from the processor module PM#1 (18-1) to the processor module PM#2 (18-2). In step 353, the corresponding MB management map entry (XM12-1) is set to "OCCUPIED" at timing t121 in FIG. 13, and in parallel with this, the MB management map entry (YM12-1) of the receiver's distributed shared memory (21-2) which has the same address as that of the MB management map entry XM12-1 is also set to "OCCUPIED." This setting is performed by such operations as described below.

First, when the processor (19-1) of the sending processor module PM#1 (18-1) executes an instruction to write to the MB management map entry (XM12-1), its address and the write data are provided onto the processor bus 30-1 in FIG. 5. In the sender's distributed memory coupler 22-1, the bus signal decoder 31-1 detects write access to the sender's distributed shared memory 21-1 and activates the transfer control part 33-1 via the signal line 32-1. The transfer control part 33-1 takes in the address of the MB management map entry (XM12-1) and the write data and feeds the page address of the MB management map entry (XM12-1) to the module ID management part 34-1. Since there is prestored in the CAM command register 67-1 (FIG. 6) a command that instructs "COMPARISON WITH KEY REGISTER 65-1," the entries of the key register 65-1 and the CAM cell part 61-1 are compared when the page address of the MB control map entry (XM12-1) is loaded into the key register (65-1). Each entry of the CAM cell part 61-1 contains the page address SPA shared by other processor modules. In this embodiment, the pair of the page address PA-M of the MB management map entry XM12-1 shared with the receiving processor module (18-2) and the identification number of the receiving processor module (18-2), i.e. PM_ID are stored in the CAM cell part (61-1) and the data memory part (62-12), respectively. Consequently, a match is detected between the key register 65-1 and the CAM cell part 61-1, and the identification number of the corresponding receiving processor module (18-2) is taken out from the data memory part 62-1. This identification number is transferred to the packet sending register 35-1 (FIG. 5). As shown in FIG. 7, "0" is set in the attribute identification field in the packet sending register 35-1 to indicate that the packet is the distributed shared memory access type and the identification number of the processor module (18-2) is set in the destination PM_ID field 81 which has been taken out from the module ID management part 34-1. Furthermore, the address (the address of the MB management map entry XM12-1) and the write data ("OCCUPIED") on the processor bus 30-1 are set in the distributed shared memory address field 82 and the write data field 83, respectively, and a signal specified by the processor bus 30-1 (in concrete terms, the write width) is set in the write width field 84. The sending packet is thus assembled. When supplied with this packet, the packet sending buffer 36-1 (FIG. 5) provides it onto the processor interconnect 25. Based on the destination PM_ID field 81 of the packet, the processor interconnect 25 routes the packet to the packet receiving buffer 37-2 of the receiving processor module PM#2 (18-2).

In the receiving processor module PM#2, the data of the packet receiving buffer 37-2 is input into the packet receiving register (38-2) and decoded by the packet decoder 39-2, and when the data is found to be of the distributed shared memory access type, the transfer control part 33-2 is activated. The transfer control part 33-2 sends the distributed shared memory address (the address of the MB management map entry XM12-1), the write data ("OCCUPIED") and the write width information in the packet receiving register 38-2 to the distributed shared memory 21-2 via the processor bus 30-2. As the result of this, the same value of the write data for the MB management map entry XM12-1 is written into the receiver's distributed shared memory 21-2 at the same address location YM12-1.

As described above, the write by the sending processor module to the distributed shared memory needs only to make a local write into the distributed shared memory of the sending processor module and the same value is automatically copied to a distributed shared memory of a processing module specified by working of the distributed memory coupler 22. This message passing scheme has an outstanding feature that it does not suffer such a copy overhead by software as in the case of DMA scheme.

In a processor 19 having a copy-back type cache, there are cases where when the write access to the distributed shared memory 21 encounters a cache hit, only a write into the cache is performed at that point and the write into the distributed shared memory is not made immediately. In such an instance, by executing an instruction of copying the data written in the cache back to the distributed shared memory, the write to the sender's distributed shared memory 21-1 can be ensured, and consequently, the copying to the receiver's distributed shared memory 21-2 is also ensured.

Next, in step 354 shown in FIG. 17A, the address of the memory capability register MCR 53-1 (FIG. 5) corresponding to the message buffer (X12-1) is obtained so that the identification SID of the sender object having acquired the access right to the message buffer (X12-1) is stored in the memory capability register MCR 53-1. The MB acquisition processing in the step S121 is completed with step 354 mentioned above.

Step S122:

Each time the sender object writes its created message into the message buffer (X12-1) of the sender's side distributed shared memory with the specified write width at timing t123, the write data is propagated to and copied into the message buffer (Y12-1) of the same address in the receiver's distributed shared memory by the distributed memory coupler 22. This operation is the same as described in connection with timing t121, and hence no description will be repeated.

In the message write step of this embodiment, one packet is assembled every write width, for example, every 4-byte write data as shown in FIG. 7 and is sent to and received from distributed memory coupler 22, but in the case of writing data in contiguous areas of a memory like a message, the packet can be assembled into such a configuration that the write base address is followed by a plurality of unit write data blocks. In this instance, it is impossible for the distributed memory coupler 22 to pre-detect whether data is written in contiguous areas or single area; so that when the write is made in contiguous address areas a predetermined number of times within a predetermined period of time, the distributed memory coupler 22 assembles the write data into one packet and sends it to the counterpart. When the contiguous address area write is made a smaller number of times than the predetermined one within the predetermined period of time, the data written in the contiguous address areas before the timeout needs only to be assembled into one packet and sent.

In FIG. 13, during the period in which the values of both the current capability register CCR (51-1) and the memory capability register MCR (53-1) are set (the protection window open period W1 from timing t122 to t124), the sender object specified by the MCR and the CCR is allowed to access the message buffer (X12-1) but other APL objects in the processor module (18-1) are prohibited from access to the message buffer.

In this period from timing t122 to t124, no capability is set in the MCR (53-2) for the receiving message buffer Y12-1 which has the same address as the sending message buffer X12-1. Accordingly, if an illegal access is made to the receiving message buffer Y12-1 from APL objects of the receiver's processor module, the illegal access can be detected, because the value of the MCR (53-2) is not set. Thus, the protection windows are independently opened only when needed for the same address areas on the distributed shared memories of a plurality of processor modules; hence, these areas can be protected, simultaneously.

Step S123:

The sender object requests the kernel for sending message. As shown in FIG. 18A, the sending message handling program first clears the MCR (53-1) corresponding to the message buffer (X12-1) in step 380. This step is indicated by timing t124 in FIG. 13, and since the protection window open period ends at this timing, only the kernel is allowed to access the message buffer (X12-1) thereafter.

Next, in step 381 of FIG. 18A, the communication mode is checked. Since this case is "Intra-System-Inter-PM Communication," the program proceeds to step 386. In this step, the receive processing control information is enqueued in the receiving descriptor ring XD12-R for the processor module (18-2) of the PM_ID 291 (FIG. 11B) matched in step S121 of FIG. 13, and at the same time, the processing request of the format shown in FIG. 9B is written into the receive processing FIFO (XF2-R) for the receiving processor module (18-2). These writes are performed at timing t125. The enqueue processing for the receiving descriptor ring XD12-R is shown in FIG. 19B and since its processing flow has already been described, no detailed description will be repeated. When a write is performed in the receiving descriptor ring XD12-R, the write data is transferred as well to the receiving processor module (18-2) by the distributed memory coupler (22-1) and it is written in the receiving descriptor ring YD12-R of the same address by the distribute a memory coupler (21-2).

As for the write to the receive processing FIFO, the receive processing FIFO area of the sending processor module (18-1) consists of RAM (Random Access Memory) chips, but the receive processing FIFO area (YF2-R) of the receiving processor module (18-2) comprises FIFO memory chips. Accordingly, when the write data to the receive processing FIFO XF2-R is transferred to the receive processing FIFO area (YF2-R) of the receiver's distributed shared memory, the new write data is written by the distributed memory coupler 22-2 into the receive processing FIFO area YF2-R while holding previously written and unprocessed write data intact. Thus, all pieces of information necessary for message passing are all propagated to the receiving processor module (18-2).

Step S124:

The kernel initiates the APL object deactivating process shown in FIG. 16B and clears the value of the current capability register CCR (15-1) at timing t126 in FIG. 13.

V-2-b. Processing at Receiving PM (18-2)

Step S130:

In step S130 in FIG. 13, the kernel selects the receiver object as an object to be executed next and sets the receiver object ID (RID) in the current capability register CCR (51-2) in the receiving processor module (18-2) at timing t130 in FIG. 13.

Step S131:

When the execution of the receiver object is started and the receiver object requests the kernel for receive processing, the kernel activates the receive processing program shown in FIG. 18B. In step 390 of FIG. 18B, a test is made to determine if the STATUS field 213 (FIG. 10D) of the OCB 210 of the receiver object is "WAITING FOR RECEIVER'S EXECUTION" or "SYNC COMPLETED." In this case, since no message has reached from the sender object at this point in time, the STATUS field 213 is not in the state of "WAITING FOR RECEIVER'S EXECUTION" or "SYNC COMPLETED" and the result of the test is "NO." Then, in step 393 the STATUS field 213 is set to "WAITING FOR SENDER'S EXECUTION" so as to indicate that the request from the receiver object has already been reached, and the program returns to the kernel.

Step S132:

The kernel recognizes that the receiver object has entered the state "WAITING FOR SENDER'S EXECUTION" and, to deactivate the receiver object until a message has been transferred from the sender object, the kernel initiates the APL object deactivating process of FIG. 16B, then in step 340 clears the value of the current capability register CCR (51-2) at timing t131 in FIG. 13 and, in step 431, saves control information for reactivating the receiver object to the object control block OCB 210.

Step S140:

An IOC distribution program of the receiving processor module (18-2) periodically reads out the PM#2-destined receive processing request FIFO (YF2-R (FIG. 4)) to make a check for the presence or absence of the receive processing request. In concrete terms, in step 500 of FIG. 20 the receive processing request FIFO (YF2-R) is read out at timing t140 in FIG. 13 to check it for the request. If a request is found, the "dequeue processing" of FIG. 19C is executed in step 502 for the receiving descriptor ring YD12-R specified by the receive processing request, read out at timing t140, by which the receiving descriptor 200 (FIG. 10C) is dequeued. In step 503 the MBA field (FIG. 10C) of the receiving descriptor is referred to and access is made to the message buffer (Y12-1) of the structure shown in FIG. 10A to take out therefrom the receiver object ID (RID) (FIG. 10A). In step 504, the address MBA (202) of the message buffer (Y12-1) is enqueued in the message queue of the object control block OCB 210 (FIG. 10D) corresponding to the receiver object RID.

In step 505, a test is made to determine if the STATUS field 213 (FIG. 10D) of the object control block OCB 210 of the receiver object is "WAITING FOR SENDER'S EXECUTION." In this case, since the STATUS field 213 is set to "WAITING FOR SENDER'S EXECUTION" in step S131 in FIG. 13, the result of the test in step 505 is "YES." This indicates that the receiver object is in its inactive state but ready to receive a message from the sender object. Then, in step 506, the STATUS field 213 of the object control block OCB 210 of the receiver object is set to "SYNC COMPLETED," indicating that both the send request and the receive request are now present. Then, in step 507, the object control block OCB 210 of the receiver object is enqueued in the ready queue so that the receiver object is reactivated.

Step S150:

The kernel of the receiving processor module (18-2) selects, as an object to be executed next, the receiver object from the ready queue (FIG. 10E) and, at timing t150 in FIG. 13, sets the receiver object ID (RID) in the current capability register CCR (51-2) in the receiving processor module (18-2).

Step S151:

When the execution of the receiver object is started and the receiver object requests the kernel for receive processing, the kernel activates the receive processing program shown in FIG. 18B. In step 930 of FIG. 18B, a test is made to determine if the STATUS field 213 of the object control block OCB 210 of the receiver object is "WAITING FOR RECEIVER'S EXECUTION" or "SYNC COMPLETED." In this case, since the STATUS field 213 is set to "SYNC COMPLETED" in step S140 of FIG. 13, the result of the test in step 390 is "YES." This indicates that the message has already been transferred from the sender object, and hence is ready to be read out immediately. Then, in step 391, the message enqueued in the message queue of the object control block OCB 210 is dequeued therefrom and the address of the message buffer (Y12-1) is taken out. Then, in step 392, the receiver object ID (RID) is set in the memory capability register MCR (53-2) corresponding to the taken-out MB address. This timing is indicated by t151 in FIG. 13. As the result of this, the receiver object ID (RID) is set in both of the current capability register CCR (51-2) and the memory capability register MCR (53-2), and consequently, the message buffer (Y12-1) is protected against access from APL objects other than the receiver object.

Step S152:

The receiver object reads out the message from the message buffer (Y12-1) at timing t152 and performs the corresponding process. It is noteworthy that the receiver object reads out the message from the message buffer (Y12-1) of the receiver's distributed shared memory (21-2) storing the copied message, not from the message buffer (X12-1) of the sender distributed shared memory (21-1) in which the sender object wrote the message. Hence, the readout operation is far faster than in the case of making remote memory access.

Step S153:

The receiver object requests the kernel for the MB release. The kernel activates the MB release processing program of FIG. 17B and, in step 360 of FIG. 17B, clears the memory capability register MCR 53-2 (FIG. 5) corresponding to the message buffer (Y12-1) at timing t153 in FIG. 13. Then, in step 361 of FIG. 17B, the kernel updates the MB management map entry (YM12-1) corresponding to the message buffer (Y12-1) to "VACANT" at timing t154 in FIG. 13. At the same time, this update is made not only in the receiver's distributed shared memory (21-2) but also in the same location XM12-1 of the sender's distributed shared memory (21-1). The reason for this is that since the page address SPAs of the respective MB management maps and the sender's PM_IDs are stored in pairs in the module ID directory 60-2 (FIG. 6) in the receiver's distributed memory coupler 22-2, a write to the receiver's distributed shared memory 21-2 triggers a copy to the sender's distributed shared memory 21-1 via the distributed memory couplers 22-2 and 22-1. In the present invention, the message buffers are always placed under control of the sending processor module, and consequently, after completing the update of the sender's MB management map entry XM12-1 at timing t155 in FIG. 13, the sending processor module is allowed to reuse the message buffer (X12-1) at any time.

Incidentally, during the protection window-open period from timing t151 to t153 no capability is set in the memory capability register MCR (53-1) for the sending message buffer X12-1 which has the same address as that of the receiving message buffer Y12-1. Thus, even if an illegal access is made from the APL object in the sending processor module to the sending message buffer X12-1 during this protection window-open period, the illegal access can be detected since the value of the memory capability MCR (53-1) is not yet set.

Step S154:

The kernel executes the APL object deactivating process and clears the value of the current capability register CCR (51-2) at timing t156 in FIG. 13.

As described above, in the case of the intra-system-inter-PM communication, the distributed memory coupler 22 allows much ease in exchanging the message and its control information between the sending processor module and the receiving processor module, permitting the implementation of efficient message communication.

In the embodiments of the present invention, the receiving processor module does not directly use the memory capability set in the sending processor module and instead, the receiving processor module sets the memory capability independently, but it may sometimes be desirable that the memory capability be passed intact from the sender's side to the receiver's side. For example, in the embodiment of FIG. 13, if the kernel in the sending processor module prestores the value of the memory capability in a specified area of the message buffer X12-1 or in the receiving descriptor ring XD12-R in step S123, then the memory capability is copied by the distributed memory coupler to the message buffer (Y12-1) in the distributed shared memory in the receiving processor module or the receiving descriptor YD12-R; thus, the receiver's kernel can read the memory capability out from the distributed shared memory and use it.

Figure 14:
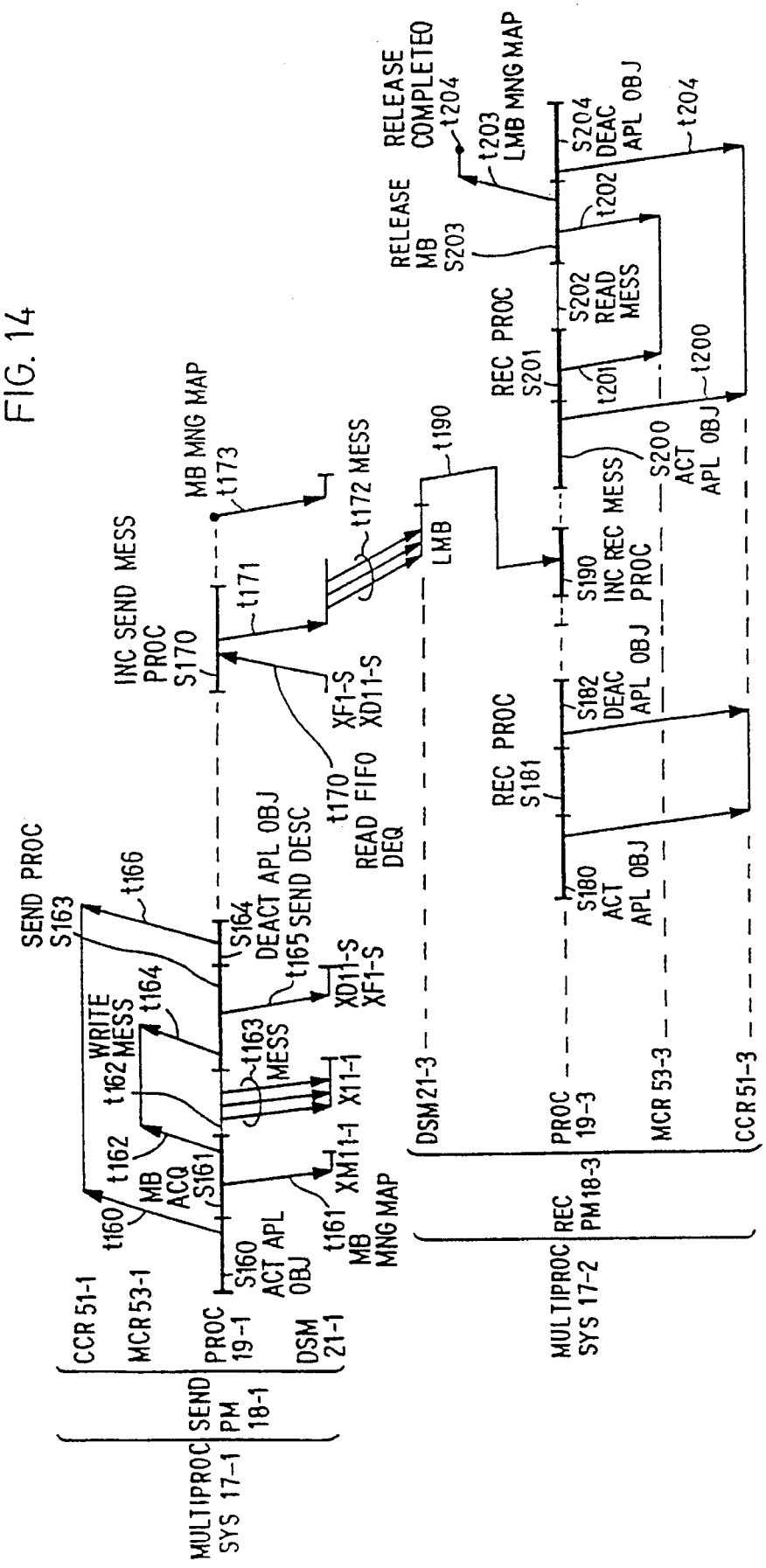
FIG. 14 is a timing chart of an inter-system communication without message-relaying PMs (an inter-system no-PM-relaying communication)

V-3. Case: Embodiment of Non-PM Relaying Inter-System Communication (FIG. 14)

V-3-a. Processing in PM (18-1) of Sending System

The sending multiprocessor system and the receiving multiprocessor system will be described in connection with the inter-system communication with no relaying PM. Now, suppose that a message is transferred via the communication network 26 from the processor module (PM) 18-1 containing the sender object in the multiprocessor system 17-1 to the processor module (PM) 18-3 containing the receiver object in another multiprocessor system 17-2, as shown in FIG. 14. Let it be assumed, in this case, that the execution of the receiver object is initiated before the execution of the sender object comes to an end. Assume that the message buffer to be used by the sender's side is X11-1 and its MB management map entry is XM11-1 shown in FIG. 4, and that details of the processing control information are stored in the sending descriptor ring XD11-S and the send processing request in the send processing FIFO (XF1-S) of the sending processor module (18-1). the processing flow will be described following the steps (indicated by SXXX) in FIG. 4 while referring to other drawings as required.

Step S160:

By activating an APL object, the kernel of the sending processor module (18-1) sets the sender object ID (SID) in the current capability register CCR (51-1) of the processor module (18-1) at timing t160, starting the execution of the sender object.

Step S161:

The sender object requests the kernel to acquire a message buffer and the kernel executes the MB acquisition processing program shown in FIG. 17A. Since this case is the communication between two processor modules belonging to different processor systems, the value of the system communication mode field 252 (FIG. 11A), which is retrieved in step 350 in FIG. 17A, is "INTER-SYS COMM." Accordingly, in step S351 of FIG. 17A, the "INTER-SYS COMM" branch is taken to step 355, in which the communication link ID, COMM LINK_ID (FIG. 11A), of the corresponding entry and the value of the sending relay PM_ID are taken out. In step 356, the PM routing table 290 (FIG. 11B) is retrieved using the sending relay PM_ID as a key, and in step 353, the MB pool to be used for communication between he sending processor module (18-1) and the sending relay processor module. Since the sender's side system of this case is non-PM relayed, the sending processor module (18-1) ID matches the sending relay processor module ID and in step 356, the corresponding MB management map (XM11) is selected. In step 353, the vacant message buffer (X11-1) is selected from among the message buffers (X11) for intra-PM communication and the corresponding MB control map entry XM11-1 is set to "OCCUPIED" at timing t161 in FIG. 14.

In step 354 in FIG. 17A, the identification ID (SID) of the sender object having acquired the right to access the message buffer (X11-1) is stored in the memory capability register MCR (53-1) corresponding to the message buffer (X11-1) at timing t162 in FIG. 14.

Step S162:

The sender object writes its created message in the message buffer (X11-1) of the sender's side distributed shared memory at timing t163. In this message write step, while the values of both the current capability register CCR (51-1) and the memory capability register MCR (53-1) are set, the sender object designated by both registers is allowed to access the message buffer (X11-1) but other APL objects are inhibited from access to it.

Step S163:

The sender object requests the kernel for send processing. In the send processing program of FIG. 18A, the kernel clears the memory capability MCR 53-1 (FIG. 5) corresponding to the message buffer (X11-1) in step 380. This is indicated by timing t164 in FIG. 14, and at this timing, the protection window open period ends, and thereafter APL objects other than the kernel can no longer access the message buffer (X11-1).

Next, in step 381 in FIG. 18A, the communication mode is checked. Since this case is "NON-PM Relaying Inter-System Communication," the program proceeds to step 387, in which send control information is enqueued in the sending descriptor ring XD11-S for the processor module (18-1), which owns the PM_ID 291 (FIG. 11B) matched in step S161 in FIG. 14, and the processing request of the format shown in FIG. 9B is written into the send processing FIFO area (XF1-S) (FIG. 4) for the processor module (18-1). This takes place at timing t165 in FIG. 14. In this case, since the sending descriptor ring XD11-S and the send processing FIFO (XF1-S) of the sending processor module (18-1) have no partner in the other distributed shared memories, a copy to the other distributed shared memories by the distributed memory couplers is not made.

Step S164:

The kernel activates the APL object deactivating process and clears the value of the current capability register CCR (51-1) at timing t166 in FIG. 14.

Step S170:

As shown in FIG. 21A, the INC send processing program of the sending processor module (18-1) periodically reads out the send processing FIFO(XF1-S) for the processor module (18-1) itself to make a check to see if a request is present. Concretely, in step 520 in FIG. 21A, the program reads out the send processing FIFO (XF1-S) at timing t170 in FIG. 14 and, in step 521, makes a check to see if a request is present. At the point of step S170 in this embodiment, a request is already stored in the send processing FIFO (XF1-S), and consequently, the "dequeue processing" of FIG. 19C is executed for the sending descriptor ring XF1-S specified by the request. In step 523, the sending descriptor of the data structure shown in FIG. 10C is read out at timing t170 in FIG. 14 and this information is used to perform various network protocol processing (such as the generation of the header of a network packet, the preparation of re-send control information and the calculation of a checksum). Next, in step 524, an adaptor sending descriptor 530 (FIG. 21B) is prepared which is necessary for activating the network adaptor. The sending descriptor 530 comprises a message buffer address MBA, a message size, a logical link number L#, execution right EX and a completion check respectively loaded in fields 531 through 535. In step 525, this adaptor sending descriptor 530 is enqueued in an adaptor sending descriptor ring in a predetermined area of the local memory 20-1 at timing t171 in FIG. 14.

The network adaptor 24-1 always monitors the adaptor sending descriptor ring in the local memory 20-1 and, upon enqueuing of the descriptor, uses this information to partition the message into segments of a size required by the network, then adds a header and error control information to each segment and transfers it as a network packet onto the network. This timing is indicated by t172 in FIG. 14. When having completed the message transfer or having received an acknowledge of the message arrival from the destination system, the network adaptor 24-1 updates the MB management map entry XM11-1 corresponding to the message buffer (X11-1) at timing t179 in FIG. 14 since the message buffer need not be held any longer. After this, the sending processor module (18-1) can reuse the message buffer (X11-1) at any time.

Step S180:

In FIG. 14, the kernel of the receiving system (17-2) selects the receiver object as an object to be executed next and, at timing t180, sets the receiver object ID (RID) in the current capability register CCR (51-3) in the receiving processor module (18-3).

Step S181:

When the execution of the receiver object is started and the receiver object requests the kernel for receive processing, the kernel activates the receive processing program shown in FIG. 18B. In step 390 in FIG. 18B, a test is made to determine if the STATUS field 213 of the object control block OCB 210 (FIG. 10D) of the receiver object is "WAITING FOR RECEIVER'S EXECUTION" or "SYNC COMPLETED." In this case, since any message has not been transferred from the sender object at this point, the STATUS field 213 is neither "WAITING FOR RECEIVER'S EXECUTION" nor "SYNC COMPLETED," and "NO" branch is taken to step 393. In step 393, to indicate that the request from the receiver object has reached first, the STATUS field 213 is set to "WAITING FOR SENDER'S EXECUTION" and the program returns to the kernel.

Step S182:

The kernel recognizes that the receiver object has entered the state "WAITING FOR SENDER'S EXECUTION" and, to block the receiver object until receiving the message from the sender object, the kernel starts the APL object deactivating program of FIG. 16B, then in step 340, clears the value of the current capability register CCR (53-1) at timing t181 in FIG. 14 and, in step 341, saves information for reactivating the receiver object in the object control block OCB 210.

Step S190:

Having received the network packet from the sending system (17-1) a timing t172 in FIG. 17, the network adaptor 24-3 (FIG. 5) of the receiving system (17-2) stores the network packet in one of empty local message buffers of the intra-PM#3 communication area in the distributed shared memory (21-3) placed under control of the network adaptor 24-3. When the message is sent thereto as a plurality of network packets, the network adaptor places them at specified locations in the local message buffer by referring to their headers to perform a message assembling process to ultimately obtain the original message. Then, control information on the thus obtained message is enqueued in an adaptor receiving descriptor ring in a predetermined area in the local memory 20-3. The INC receive processing program periodically reads out the adaptor receiving descriptor ring in the local memory 20-3 to check it for the presence of a request, as shown in FIG. 22A.

More specifically, in FIG. 22A, the INC receive processing program of the processor module (18-3) of the receiving system (17-2) executes, in step 560, the "dequeue processing" of FIG. 19C for the adaptor receiving descriptor ring and, in step 561, makes a check to see if an entry has been queued in the adaptor receiving descriptor ring. At the point of step S190 in this embodiment, the message sent from the sending system is already enqueued in the adaptor receiving descriptor ring; so that in step 562 an adaptor receiving descriptor ring 590 (FIG. 22B) is taken out at timing t190 in FIG. 14 and is used to perform a protocol receive processing (for example, checking of the header of the network packet, preparation of re-send control information, and so on). The adaptor receiving descriptor 590 comprises a local buffer address LAB, a message size, the logical link bumper L# and execution right EX respectively loaded in fields 590 through 594. Then, in step 563, accesses are made to the local message buffer specified by the local message buffer address LBA (591) of the adaptor receiving descriptor 590 (FIG. 22B) so that the receiver object ID (RID) (FIG. 10A) is taken out. In step 564, the PM_ID field 291 of the PM routing table 290 (FIG. 11B) is searched using, as a key, the PM_ID field 172 of the receiver object ID (FIG. 8C) for the communication mode field 292 of the entry of the same PM_ID as that in the PM_ID field 172. In this embodiment, since the message is destined for the receiver object in the processor module (18-3), the communication mode field 292 is "INTRA-PM COMM" and the program proceeds to step 565, in which the local message buffer address LBA (591) is enqueued in the message queue of the receiver object. Then, in step 566, a check is made to see if the STATUS field 213 (FIG. 10D) of the object control block (210) of the receiver object is "WAITING FOR SENDER'S EXECUTION." In this case, since the STATUS field 213 has been set to "WAITING FOR SENDER'S EXECUTION" in step S181 in FIG. 14, the result of the test in step 566 is "YES." This indicates that the receiver object has been blocked for receiving the message from the sender's side. Then, in step 567, the STATUS field 213 of the object control block OCB (210) is set to "SYNC COMPLETED," indicating that the sending request and the receiving request are both present. Then, in step 568, the object control block OCB (210) of the receiver object is enqueued in the ready queue, allowing the receiver object to restart.

Step S200:

The kernel of the receiving processor module (18-3) of the receiving system (17-2) selects the receiver object from the ready queue as an object to be executed next and, at timing t200 in FIG. 14, sets the receiver object ID (RID) in the current capability register CCR (51-3) in the receiving processor module (18-3).

Step S201:

When the execution of the receiver object starts and the receiver object requests the kernel for receive processing, the kernel starts the receive processing program shown in FIG. 18B. In step S390 in FIG. 18B, a test is made to determine if the STATUS field 213 (FIG. 10D) of the object control block OCB (210) of the receiver object is "WAITING FOR RECEIVER'S EXECUTION" or "SYNC COMPLETED." In this case, since the STATUS field 213 has been set to "SYNC COMPLETED" in step S190 1n FIG. 14, the result of the test in step 390 is "YES." This means that the message has already been received and can be read out immediately. Then, in step 391, the message queued in the message queue of the object control block (210) is dequeued therefrom and its MB address, that is, the local message buffer address (LBA) (591) is taken out. Then, in step 392, the receiver object ID (RID) is set in the memory capability register MCR (53-3) corresponding to the local message buffer address LBA (591). This timing is indicated by t201 in FIG. 14. As the result of this, the receiver object ID (RID) is set in both of the current capability register CCR (51-3) and the memory capability register MCR (53-3), after which the local message buffer is protected against access from APL objects other than the receiver object.

Step S202:

The receiver object reads out the message from the local message buffer at timing t202 in FIG. 14 and performs the corresponding processing. In this instance, the receiver object reads out the message from the local message buffer on the receiver's side distributed shared memory (21-3).

Step S203:

The receiver object requests the kernel to release the local message buffer. The kernel starts the MB release processing program shown in FIG. 17B and, in step 360 in FIG. 17B, clears the memory capability register MCR (53-3) corresponding to the local message buffer at timing t202 in FIG. 14. Then, in step 361 in FIG. 17B, the kernel updates the MB management map entry corresponding to the local message buffer to the value "VACANT." This timing is indicated by t203 in FIG. 14. Once the MB management map entry is thus updated, the network adaptor (24-3) can reuse this local message buffer at any time thereafter.

Step S204:

The kernel executes the APL object termination process and clears the value of the current capability register CCR (51-3) at timing t204 in FIG. 14.

As described above, in the case of the non-PM relaying inter-system communication, high-speed, efficient message passing can be implemented with almost the same overhead as that in the intra-system-inter-PM communication.

Figure 15:
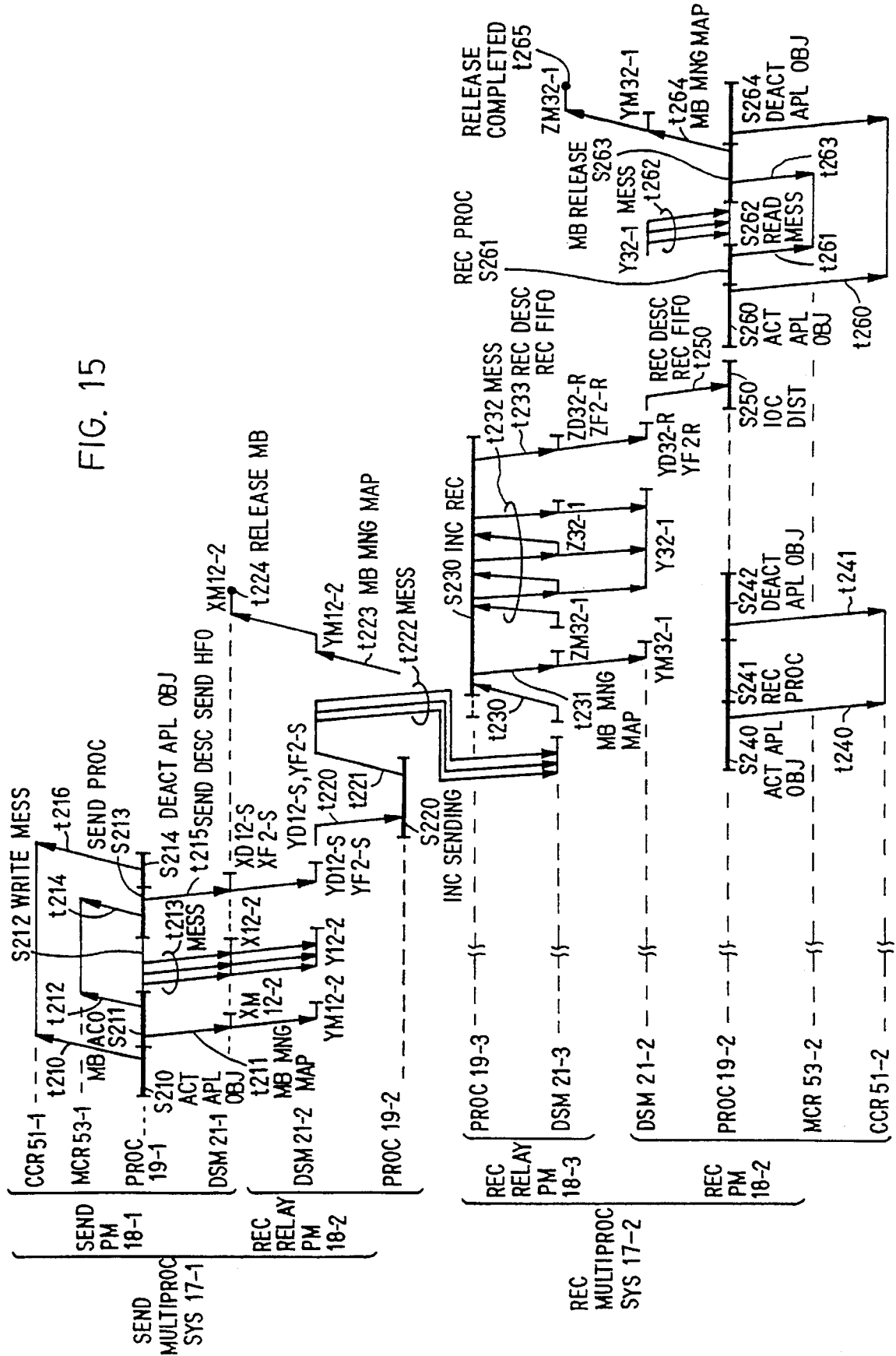
FIG. 15 is a timing chart of an inter-system communication with message-relaying PMs (an inter-system PM-relaying communication)

V-4. Embodiment of PM-Relaying Inter-System Communication (FIG. 15)

Assume the case in which: a message generated by the sender object in the sending processor module (PM) 18-1 in the sending multiprocessor system 17-1 is passed to the sending relay processor module (18-2) having a communication link with the destination system in the sending multiprocessor system 17-1; the sending relay PM (18-2) transfers the message to the other receiving multiprocessor system 17-2 via the communication network 26; and, after receiving the message, the receiving relay processor module (18-3) of the receiving multiprocessor system 17-2 passes the message to the receiving PM (18-2) to which the receiver object belongs. Suppose that the receiver object starts its execution prior to the completion of the sender object's execution. Let it be assumed that the message buffer to be used by the sending processor module (18-1) of the sending system 17-1 is X12-2 in FIG. 4; the MB management map entry is XM12-2; message control information is enqueued in the sending descriptor ring XD12-S; and the send processing request is stored in the send processing FIFO (XF2-S) for the destination processor module (18-2).

Furthermore, let it be assumed that the message buffer to be used by the receiving relay PM (18-3) of the receiving system 17-2 is Z32-1 in FIG. 4; the MB management map entry is ZM32-1; message control information is enqueued in the receiving descriptor ring ZD32-R; and the receive processing request is stored in the receive processing FIFO (ZF2-R) for the destination PM (18-2).

The flow of processing will be described following steps (indicated by SXXX) in FIG. 15 while referring to other drawings as needed.

V-4-a. Processing of Sending PM (18-1) of the Sending System (17-1)

Step S210:

The kernel off the sending processor module (18-1) of the sending multiprocessor system (17-1) executes the APL object activating program and, at timing t210 in FIG. 15, sets the sender object ID (SID) in the current capability register CCR (51-1) of the processor module (18-1), starting the execution of the sender object.

Step S211:

The sender object requests the kernel to acquire a message buffer and the kernel executes the MB acquisition processing program shown in FIG. 17A. Since this case is the communication from the sending processor module (18-1) in the sending system to the relaying processor module (18-2)in the sending system, the value of the system communication mode field 252 (FIG. 11A) that is retrieved in step 350 in FIG. 17A is "INTER-SYS COMM." Accordingly, in step 351 in FIG. 17A, the "INTER-SYS COMM" side is selected, and in step 355, the value of the corresponding communication link ID (COMM LINK_ID) and sending relay PM_ID entry in FIG. 11A are taken out. In this case, since sending relay PM_ID is "PM (18-2)," the PM routing table 290 of FIG. 11B is retrieved using the value of "PM (18-2)" as a key in steps 355 and 356. As the result of this, the entry where PM_ID field 291 is "PM (18-2)" matches the key, and the MB management map address="INTER-PM (18-1, 18-2) COMM MB (X12) MNG MAP ADDRESS" corresponding to the matched entry is taken out from the PM routing table 290. In step 353, a vacant message buffer (X12-2) is selected from among the message buffers (X12) for inter-PM communication and the corresponding MB management map entry XM12-2 is written to "OCCUPIED." This write is made in both of the MB management map entry (XM12-2) on the sender's side distributed shared memory (21-1) and the MB management map entry (YM12-2) of the distributed shared memory (21-2) at the sending relay side which has the same address as that of the MB management map entry XM12-2. This is done at timing t211 in FIG. 15. The write and copy method has already been described in step S121 of FIG. 13; no description will be repeated in this regard.

Then, in step 354 in FIG. 17A, the identification ID (SID) of the sender object having acquired the right to access the message buffer (X12-2) is stored in the memory capability register MCR (53-1) corresponding to the message buffer (X12-2) at timing t212 in FIG. 15.

Step S212:

When the sender object writes its created message into the message buffer (X12-2) of the sender's side distributed shared memory, the write data is propagated by the distributed memory coupler (22-1) to the sending relay processor module (18-2) and written into the message buffer (Y12-2) in the ending relay side distributed shared memory (21-2) as well. This operation is exactly the same as described previously in connection with the operation at timing t121 in FIG. 13. During the period in which the values of both the current capability register (51-1) and the memory capability register MCR (53-1) are set, the sender object can access the message buffer (X12-2) but other application objects cannot. Incidentally, the sending relay processor module (18-2) also has the memory capability register MCR (53-2) for each message buffer, but no capability is set in the memory capability register (53-2), and consequently, even if an application object in the sending relay processor module (18-2) accesses the message buffer (Y12-2), the contents of the two registers (53-2) and (51-2) do not match; hence, the illegal access in the ending relay processor module (18-2) can be detected Step S213:

The sender object requests the kernel for send processing. As shown in FIG. 18A, the send processing program starts with step 380 in which the memory capability register (53-1) corresponding to the message buffer (X12-2) is cleared at timing t214 in FIG. 15. This terminates the protection window open period, and thereafter only the kernel is allowed to access the message buffer (X12-2) and other application objects are prohibited from accessing it. Next, in step 381 in FIG. 18A, it is decided that the communication mode is "INTER-SYS PM RELAY SENDING," and in step 387, send control information is enqueued in the sending descriptor ring XD12-S for the processor module PM#2 (18-2) of the PM_ID (field 291 in FIG. 11) found to match in step S211 in FIG. 15 and the processing request of the format shown in FIG. 9B is written into the PM#2-destined send processing FIFO (XF2-S) (FIG. 4). This write is indicated by timing t215 in FIG. 15. As the result of this, the data written to the sending descriptor ring (XD12-S) is copied by the distributed memory coupler (22-1 in FIG. 5) to the same address location (YD12-S) on the distributed shared memory (21-2) at the sending relay side. Moreover, the data written to the send processing FIFO (XF2-S) is copied to the sending relay PM side send processing FIFO (YF2-S) as well. Thus, all the pieces of information necessary for message communication are transferred to the sending relay processor module PM#2 (18-2).

Step S214:

The kernel starts the APL object deactivation process and clears the value of the current capability register CCR (51-1) at timing t216 in FIG. 15.

V-4-b. Processing at Sending Relay PM (18-2) Side in Sending System (17-1)

Step S220:

As shown in FIG. 21A, an INC send processing program of the sending relay PM (18-2) periodically reads out the FIFO (YF2-S) for processing a message destined for the sending relay processor module (18-2), by which a check is made to see if a send request has been made. In concrete terms, in step 520 in FIG. 21A, the send processing FIFO (YF2-S) is read out at timing t220 in FIG. 15, and in step 521, a check is made to determine if the request is present. If the request is found, the "dequeue process" of FIG. 19C is executed for the sending descriptor ring in step 522. In this embodiment, since the request was already stored in the send processing FIFO (YF2-S) in step S213, the sending descriptor entry 200 of the structure shown in FIG. 10C is dequeued in step 523 at timing t220 in FIG. 15. This information is used to perform various network protocol processing (such as the generation of the header of the network packet, the generation of re-send control information, the calculation of a checksum, etc.). Then, in step 524, an adaptor sending descriptor is generated which is needed to activate the network adaptor. In step 525, this adaptor sending descriptor is enqueued in an adaptor sending descriptor ring in a predetermined area in the local memory 20 at timing t221 in FIG. 15.

The network adaptor 24-2 always monitors the adaptor sending descriptor ring in the local memory 20-2; upon enqueuing of a descriptor in the descriptor ring, the network adaptor 24-2 uses this information to partition the message into segments of a size required by the network, adds a header and error control information to each segment and transfers it onto the network as a network packet of the "destination defined by RID (see FIG. 10A) specified by the message. This timing is indicated by t222 in FIG. 15. When having completed the message transfer or having received an acknowledgement of the message arrival from the destination system, the network adaptor 24-2 updates the MB management map entry XM12-2 to "VACANT" at timing t223 in FIG. 15, since the message buffer need no longer be held at the sender's side. In consequence, the update information is propagated to the sender's side distributed shared memory and the MB management map entry XM12-2 is also updated at timing 224. Thus, the sending processor module (18-1) can reuse the corresponding message buffer (X12-2) thereafter.

Incidentally, in the sending relay processor module (18-2), no capabilities are set in the memory capability register (53-2) and the current capability register CCR (51-2) unlike in the case of the sending processor module (18-1). Even if an illegal access is made to the message buffer (Y12-2) from an application object in the sending relay processor module (18-2), the illegal access can be detected because no capability is set in the memory capability register MCR (53-2) corresponding to the message buffer (Y12-2).

V-4-c. Processing at Receiving Relay PM (18-3) Side of Receiving System (17-2)

Step S230:

Having received the network packet from the sending system (17-1), he network adaptor (24-3 in FIG. 5) of the receiving relay processor module (18-3) of the receiving system (17-2) stores the network packet in an empty local message buffer in the intra-PM#3 communication area on the distributed shared memory (21-3) placed under control of the network adaptor (24-3). When the message is transferred as a plurality of network packets, the network adaptor 24-3 loads the received packets at specified address locations in the local message buffer by referring to the packet headers to assemble the message to ultimately obtain the original message. Control information on the thus assembled message is enqueued in the adaptor receiving descriptor ring. As shown in FIG. 22A, the INC receive processing program of the receiving relay processor module (18-3) periodically reads out the adaptor receiving descriptor ring to make a check to see if a request is present.

The above processing will be described in more detail. In FIG. 22A, the INC receive processing program executes the "dequeue processing" of FIG. 19C for the adaptor receiving descriptor ring in step 560 and, in step 561, makes a check to determine if an entry has been queued in the adaptor receiving descriptor ring. At the point of step S230 in this embodiment, the request sent from the sending system has already been enqueued in the adaptor receiving descriptor ring; so that in step 562, the adaptor receiving descriptor entry 590 (FIG. 22B) is dequeued at timing t230 in FIG. 15 and is used to perform network protocol processing (for example, checking of the header of the network packet, preparation of re-send control information, etc.). Then, in step 563, the local message buffer is accessed on the basis of the local message buffer address LBA (591) in the adaptor receiving descriptor shown in FIG. 22B and the receiver object ID (RID) (FIG. 10A) in the message is taken out. In step 564, the PM_ID field 291 of the PM routing table 290 shown in FIG. 11B is searched using, as a key, the PM_ID field 172 of the object ID (FIG. 8C) for the communication mode field 292 of the entry of the same PM_ID as that in the PM_ID field 172. In this embodiment, since the entry of the communication mode field 292 matches the entry of the PM_ID field "RECEIVING PM (18-2) OF RECEIVING SYSTEM (17-2)," the corresponding communication mode field 292 is "INTER-PM COMM" and the program proceeds to step 570. In step 570, the MB management map address "INTER-PM (18-3, 18-2) MB (Z32) MNG MAP ZM32) ADDRESS" corresponding to the matched entry is taken out from the PM routing table (290). In step 571, a vacant message buffer (Z32-1) is selected referring to the MB management map ZM32, and the corresponding MB management map entry ZM32-1 is written to "OCCUPIED." When the MB management map entry ZM32-1 is thus written, the MB management map entry YM32-1 of the receiver's distributed shared memory (21-2), which has the same address as that of the entry ZM32-1, is also written to "OCCUPIED" via the distributed memory couplers 22-3 and 22-2 of the receiving system. Then, in step 572, the message in the local message buffer is transferred to the message buffer (Z32-1) at timing t232 in FIG. 15. At the same time, the message is copied to the message buffer (Y32-1) of the distributed shared memory (21-2) of the receiving processor module via the distributed memory couplers (22-3 and 22-2). That is, this copying operation is to send the write data to the receiver's side distributed shared memory (21-2). In steps 573 and 574, message control information is enqueued in the receiving descriptor ring ZD32-R destined for the receiving processor module (18-2) from the receiving relay processor module (18-3) at timing t233 in FIG. 15, and at the same time, the receive processing request is written into the FIFO (ZF2-F) destined for the receiving processor module (18-2). As a result, the message control information is also transferred by the distributed memory couplers (22-3, 22-1); the contents of the receiving descriptor ring ZD32-R are copied to the corresponding address location YD32-R of the distributed shared memory of the receiving processor module (18-2) and the contents of the receive processing FIFO (ZF2-R) are copied to the corresponding address location YF2-R of the distributed shared memory (21-2) of the receiving processor module (18-2). Thus, information necessary for message communication is provided to the receiving processor module (18-2).

Incidentally, in the receiving relay processor module (18-3) no capability is set in either of the memory capability register MCR (53-3) and the current capability register CCR (51-3), but an illegal access to the message buffer (Z32-1) from an application object in the receiving relay processor module can be detected, since no capability is set in the memory capability register MCR (53-3) corresponding to the message buffer (Z32-1). In the above embodiment, the message sent from another system is once loaded in the local message buffer and then the processor 19-3 copies it from the local message buffer to the message buffer (Z32-1) for the message destined for the receiving processor module (18-2), but it is also possible to eliminate the copying from the local message buffer to the message buffer for the message destined for the receiving processor module, by use of a processing scheme in which the message received by the network adaptor 24-3 for each packet is loaded directly into the message buffer for the message destined for the receiving processor module which corresponds to the PM_ID of the receiver object ID (RID) included in the message. In such an instance, the network adaptor 24-3 executes the MB acquisition process of FIG. 17A to acquire the message buffer (Z32-1) destined for the receiving processor module, and writes therein the received message after which the processor executes the INC receive processing flowchart of FIG. 22A after replacing the local message buffer address LBA with the address of the acquired message buffer, without performing steps 570 through 572.

V-4-d. Processing at Receiving PM (18-2) of Receiving System (17-2)

Step S240:

in step S240 in FIG. 15, the kernel selects the receiver object as an object to be executed next and sets the receiver object ID (RID) in the current capability register CCR (51-2) in the receiving processor module (18-2) at timing t240 in FIG. 15.

Step S241:

When the receiver object requests the kernel for receive processing, the kernel starts the receive processing program shown in FIG. 18B. In step 390 in FIG. 18B, a test is made to determine if the STATUS field 213 of the object control block OCB 210 of the receiver object, shown in FIG. 10D, is "WAITING FOR RECEIVER'S EXECUTION" or "SYNC COMPLETED." In this case, no message is yet received from the sender object at this point of time, and consequently, the STATUS field 213 is neither "WAITING FOR RECEIVER'S EXECUTION" nor "SYNC COMPLETED"; hence, the result of this test is "NO". Then, in step 393, to indicate that the request from the receiver object is received, the STATUS field 213 is set to "WAITING FOR SENDER'S EXECUTION" and the program returns to the kernel.

Step S242:

The kernel recognizes that the receiver object has entered the state WAITING FOR SENDER'S EXECUTION" and, to block the receiver object until the message is sent from the sender object, the kernel starts the APL object deactivating process of FIG. 16B. In step 340, the kernel clears the value of the current capability register CCR (51-2) at timing t241 in FIG. 15 and, in step 341, saves information necessary for reactivating the receiver object into the object control block OCB (210).

Step S250:

As shown in FIG. 20, the IOC distribution program of the receiving processor module PM#2 (18-2) periodically reads out the PM#2-destined message receive processing FIFO (YF2-R (FIG. 4)) to make a check to see if the receive processing request is present. More specifically, in step 500 in FIG. 20, the receive processing FIFO (YF2-R) is read out, and in step 501, a check is made to determine if the receive processing request has been made. If the request is found, the "dequeue processing" shown in FIG. 19C is executed for the receiving descriptor ring (YD32-R). In step 503, the receiving descriptor entry of FIG. 10C is taken out at timing t250 and the message buffer (Y32-1) of the structure shown in FIG. 10A is accessed by referring to the message buffer address MBA entry. Then, the receiver object ID (RID) in the message is taken out. In step 504, the address MBA (FIG. 10C) of the message buffer (Y32-1) is enqueued in the message queue of the object control block OCB 210 (FIG. 10D) corresponding to the receiver object ID (RID).

In step 505, a check is made to determine if the STATUS field 213 of the object control block OCB 210 of the receiver object is "WAITING FOR SENDER'S EXECUTION." In this case, the STATUS field 213 has been set to "WAITING FOR SENDER'S EXECUTION" in step S241 in FIG. 15, and hence the result of the test is "YES." This indicates that the receiver object has been blocked for receiving a message from the sender's side. Then, in step 506, the STATUS field 213 of the object control block OCB (210) of the receiver object is set to "SYNC COMPLETED," indicating that sending and receiving requests are both present. Next, in step 507, the object control block OCB (210) of the receiver object is enqueued in the ready queue, permitting the receiver object to be reactivated.

Step S260:

The kernel selects the receiver object from among objects in the ready queue as an object to be executed next, and at timing t260 in FIG. 15, the kernel sets the receiver object ID (RID) in the current capability register CCR (51-2) in the receiving processor module (18-2).

Step S261:

When the receiver object starts its execution and requests the kernel for receive processing, the kernel executes the receive processing program shown in FIG. 18B. In step 390 in FIG. 18B, a test is made to determine if the STATUS field 213 of the object control block OCB (210) of the receiver object is "WAITING FOR SENDER'S EXECUTION" or "SYNC COMPLETED." In this case, the STATUS field 213 is set to "SYNC COMPLETED" in step S250 in FIG. 15, and consequently, the result of the test is "NO." This means that a message has already been received from the sender's side and can be read out immediately. Therefore, in step 391, the message enqueued in the message queue of the object control block (210) is dequeued, and the address of the message buffer (Y32-1) is taken out. Next, in step 392, the receiver object ID (RID) is set in the memory capability register MCR (53-2) corresponding to the message buffer (Y32-1). This timing is indicated by t261 in FIG. 5. Thus, the receiver object ID (RID) is set in both of the current capability register (51-2) and the memory capability register (53-2), and hence the message buffer (Y32-1) is protected against access from any application objects other than the receiver object thereafter.

Step S262:

The receiver object reads out the message from the message buffer (Y32-1) of the receiver's side distributed shared memory (21-2) at timing t262 in FIG. 15 and performs the corresponding processing. The readout from the memory buffer (Y32-1) is a local memory access in the processor module to which the receiver object belongs, and hence is far faster than remote memory access.

Step S263:

The receiver object requests the kernel for MB release processing. The kernel executes the MB release processing program shown in FIG. 17B and, in step 360, clears the memory capability register MCR (53-2) corresponding to the message buffer (Y32-1). This timing is indicated by t263 in FIG. 15. Next, in step 361 in FIG. 17B, the MB management map entry YM32-1 corresponding to the message buffer (Y32-1) is updated to the value "VACANT." This update is made not only in the distributed shared memory 21-2 at the receiver's side but also in the same address location ZM32-1 of the distributed shared memory 21-3 at the receiving relay side via the distributed memory couplers 22-2 and 22-3. After the MB management map entry ZM32-1 of the receiving relay processor module (18-3) is updated to "VACANT" at timing t265 in FIG. 5, the receiving relay processor module (18-3) can reuse the message buffer (Z32-1) at any time.

Step S264:

The kernel executes the APL object deactivating process and clears the value of the current capability register CCR (51-2) at timing t266 in FIG. 15.

As described above, also in the case of the PM-relaying inter-system communication, the message and its control information can be transferred between the sending processor module and the receiving one with much ease and at high speed.

In this embodiment, the IOC distribution processing of FIG. 20, the INC send processing of FIG. 21A and the INC receive processing of FIG. 22A have been described to be executed by what is called a polling type processing scheme which detects a request by reading out a specified address of the distributed shared memory, but they can be implemented by an interrupt type processing scheme which utilizes the interrupt data type packet of FIG. 7 and the function of the interrupt control part 42 in FIG. 5.

VII. Evaluation of Present Invention by Simulation

Next, to evaluate the effectiveness of the present invention, a description will be given of comparison between the conventional DMA system and this invention system in terms of the kernel dynamic instruction counts and the message transfer latency obtained by simulation. The preconditions for evaluation are such as listed below.

(A) The processor performance is 50 MIPS.

(B) The transfer bandwidth of the ATM (Asynchronous Transfer Mode)-based communication network is 156 Mb/s (effective transfer bandwidth: 156×48/53=141 Mb/s).

(C) The transfer bandwidth of the DMA system is three-machine-cycles/4-bytes.

(D) All the copy operations by the distributed memory coupler are completed during the kernel execution.

(E) The execution time of the application program and various protocol-dependent processes of kernel are not included.

(F) Buffering delay in the application program, synchronization queuing delay in the system, polling queuing delay and similar intra-system queuing delay are not included.

The following table shows the comparison between the conventional DMA system and this invention system in terms of the required kernel dynamic instruction counts and the message transfer latency in the transfer of a 256-byte message.

| 256 Byte Message Transfer | | |
|---|---|---|
| Subject of Comparison | DMA | Present Invention |
| Kernal dynamic instruction counts | | |
| Intra-system-inter-PM communication | 1320 instructions | 860 instructions |
| PM-relay inter-system communication | 2600 instructions | 1340 instructions |
| Message transfer latency | | |
| Intra-system-inter-PM communication | 26.1 μsec | 6.4 μsec |
| PM-relay inter-system communication | 81.6 μsec | 46.0 μsec |

It will be seen from the above that, as compared with the DMA system, the system of the present invention reduces the kernel execution overhead by 35 to 50% and the message transfer latency by 50 to 75%. In FIGS. 23 and 24 there are shown the kernel dynamic instruction counts and the message transfer latency, for various message lengths, in the PM-relay inter system message transfer and in the intra-system-inter-PM message transfer. In FIGS. 23 and 24, crosses and solidly-shaded squares indicate the results of simulation on the PM-relay inter-system transfer and the intra-system-inter-PM transfer according to the present invention system, respectively; asterisks and hollow squares indicate the results of simulation on the PM-relay inter-system transfer and the intra-system-inter-PM transfer according to the conventional DMA system, respectively. In FIG. 23, the dynamic instruction counts in the PM-relay inter-system transfer according to the present invention increases with an increase in the message length. The reason for this is that, as shown in step 572 in FIG. 22A, the processor of the receiving relay processor module of the receiving system must copy a message to the message buffer for the message destined for receiving processor module under program control.

The above demonstrates that the present invention allows the kernel execution overhead for message passing and the message transfer latency to be substantially reduced as compared with those in the conventional loosely-coupled multiprocessor system. Especially the present invention is suited for highly-frequent message passing system and/or massively parallel processor systems.

VII. Effectiveness of the Invention

As described above, according to the present invention, each processor module has a distributed shared memory and a distributed memory coupler, and the distributed memory coupler stores information about the processor modules which share the address of the distributed shared memory. Upon occurrence of a write into the shared address location of the distributed shared memory of the processor module at the sender's side, the distributed memory coupler transfers write information to the other processor module of the shared address, and the distributed memory coupler at the receiver's side, which receives the write information, copies the write data to the distributed shared memory at the receiver's side. This transfer operation is performed without software intervention, and hence eliminates the need for the execution of a DMA controller driver program needed for the transfer between distributed shared memories in the past and permits substantial reduction of the software overhead. In the traditional system using the DMA mechanism, the message transfer does not start until all pieces of transfer data are provided, whereas in the present invention, upon occurrence of a write in the distributed shared memory at the sender's side, the transfer to the distributed shared memory of the receiver's side is started—this markedly reduces the latency of message transfer from the sender's side to the receiver's side. Moreover, the present invention allows flexible implementation of various communication patterns, such as unidirectional communication, bidirectional communication and broadcast communication, in accordance with the processor module information that is stored in the distributed memory coupler. Thus, the present invention is highly flexible.

In the message passing between the sending processor module and the receiving processor module according to the present invention, the message buffer, the descriptor which is message control information and the MB management map which indicates the "use" status of the message buffer are loaded in the distributed shared memory of the sending processor module. The sending processor module writes these pieces of information in the distributed shared memory at the sender's side and the receiving processor module needs only to read out the same address location of the receiver's side distributed shared memory; hence, communication synchronization between the processor modules can easily be provided. Furthermore, the receiving processor module writes reply data to the descriptor and the MB management map of the receiver's side distributed shared memory and the sending processor module reads the reply data from the MB descriptor and the MB control map of the same address locations in the sender's distributed shared memory as those in the receiver's distributed shared memory—this facilitates reporting between processor modules, and helps to readily make a decision as to whether to reuse the descriptor or message buffer.

By using the FIFO memories for certain address locations of the distributed shared memory of the receiver's side processor module, pieces of information which the sending processor module writes into the distributed shared memory belonging thereto are sequentially written into the FIFO of the distributed shared memory at the receiver's side. Thus, even if a plurality of processor modules at the sender's side simultaneously write data into their distributed shared memories at the same address, the FIFO of the distributed shared memory at the receiver's side and the processor interconnect arbitrate the contention to write therein the data in a sequential order; accordingly, there is no need of arbitration of the contention by software. The receiver's side can efficiently extract only actual requests simply by reading out the request-storing FIFO in the distributed shared memory. Thus, the present invention eliminates the need for searching a large number of monitoring points one after another in the prior art, and hence provides a substantial reduction of the message handling overhead.

Hence, the present invention avoids the resource contention between processors (simultaneous access to the same memory area, for example) which is a serious problem in the prior art. Therefore, high-performance in proportion to the number of processors can be obtained for a massively parallel processor system having a large number of processors.

Besides, according to the present invention, the distributed shared memories at both of the sender's side and the receiver's side can be protected against illegal accesses thereto by setting the memory capability in the memory capability register and the current capability in the current capability register at proper timing in the processor modules at the sender's and the receiver's side. Furthermore, by adding the memory capability at the sender's side to the message or descriptor and passing it intact to the receiver's side, it is possible to implement flexible, highly efficient memory protection.

It will be apparent that many modifications and variations may be effected without departing from the scope of the novel concepts of the present invention.

What is claimed is:

1. A multiprocessor system which has a plurality of processor modules which are interconnected via a channel for communication and each having unique identifying information and being capable of executing an application object, each one of said plurality of processor modules comprising:

a distributed shared memory which has addresses common to all of said processor modules and includes a plurality of communication areas for sending use which are dedicatedly assigned to respective ones of all possible combinations of one-to-one communication between said one of the plurality of processor modules at a sender's side and each of said plurality of processor modules at a receiver's side and a plurality of communication areas for receiving use which are dedicatedly assigned to respective ones of all possible combinations of point-to-point communication between said one of the plurality of processor modules at a receiver's side and each of said processor modules at a sender's side, each of said communications areas for sending use and for receiving use having message buffers each for writing therein a message to be transferred, each pair of sender's side and receiver's side processor modules defining point-to-point communication being assigned shared addresses of a dedicated communication area, by which said shared addresses are associated with said identifying information of said sender's side and receiver's side processor modules forming said each pair;

message buffer management means which responds to a request by said application object for writing a message into one of said communication areas corresponding to one of said processor modules designated as a receiver's side processor module to acquire a vacant one of said message buffers in said communication area at said sender's side corresponding to said receiver's side processor module; and distributed shared memory control means which, as said application object writes said message into said acquired vacant message buffer in said sender's side communication area corresponding to said receiver's side processor module, sends the address of said acquired message buffer and said message to said receiver's side processor module specified by said application object to write said message into a receiver's side message buffer of the same address shared with said acquired message buffer.

2. The system of claim 1, wherein said distributed shared memory control means of each of said processor modules has a data memory in which pieces of identifying information of all of said processor modules with which said each processor module communicates are prestored as a table in correspondence with their shared addresses, and said distributed shared memory control means sends the address of said acquired message buffer and said message to said receiver's side processor module specified by the identifying information obtained by referring to said table in said data memory to write said message into said receiver's side message buffer of the same address shared with said acquired message buffer.

3. The system of claim 1, wherein the identifying information of said sender's side processor module and the identifying information of said receiver's side processor module of said each pair defined by each of said shared addresses are defined in different bit positions of said each shared address.

4. The system of claim 1, wherein each of said communication areas of said distributed shared memory of said each processor module includes a control area for storing control data which controls a message transfer, said distributed shared memory control means responds to a write request to write said control data into an address shared between said sender's side processor module and said receiver's side processor module, and said receiver's side processor module responds to a processing request from said sender's side processor module to process said message written in said receiver's side message buffer specified by said control data stored in said control area at the receiver's side.

5. The system of claim 4, wherein said control area of said each communication area includes a descriptor ring for storing the address of said message buffer where to write a message to be transferred and execution right information which specifies the execution right of processing by said sender's side and receiver's side processor modules, said distributed shared memory control means responds to said write request to write said descriptor ring in the corresponding address of said distributed shared memory of said receiver's side processor module, and said receiver's side processor module responds to said processing request from said sender's side processor module to process said message written in said receiver's side message buffer specified by said descriptor ring.

6. The system of claim 4, wherein said message buffer management means of said each processor module includes a management map area provided in said control area of said each of said communication area, for indicating the state of use of each of said message buffers in said each communication area.

7. The system of claim 1, wherein said distributed shared memory of said each processor module has a processing request area exclusively for writing a processing request for each of said processor modules, and said processing request area for said processor module to which said distributed shared memory belongs has a FIFO structure.

8. The system of claim 1, 4, or 7, wherein said each processor module further comprises memory protection means including: memory capability storage means for storing the access right for said each message buffer of said distributed shared memory; current capability storage means for storing access right information for an application object being executed in said each processor module; and capability comparison means for comparing the stored contents of said memory capability storage means and said current capability storage means to decide whether access to said each message buffer is legal.

9. A communication method using the multiprocessor system defined in claim 1 comprising the following steps:

a) said sender's side processor module acquires, by said message buffer management means, a vacant sender's side message buffer in said communication area corresponding to said receiver's side processor module;

b) said sender's side processor module writes a message in said acquired sender's side message buffer;

c) said sender's side distributed memory control means extracts the identifying information of said receiver's side processor module on the basis of the address of said sender's side message buffer and transfers the address of said sender's side message buffer and write data on said message written therein to said receiver's side processor module;

d) said receiver's side distribution shared memory control means copies said message to that one of the receiver's side message buffers in said receiver's side distributed shared memory which has the same address as that of said sender's side message buffer, on the basis of the address of said sender's side message buffer and said write data; and e) said receiver's side processor module reads out said message from said receiver's side message buffer.

10. The method of claim 9, wherein said distributed shared memory control means of each of said processor modules has a data memory in which pieces of identifying information of all of said processor modules with which said each processor module communicates are prestored as a table in correspondence with their shared addresses, and said distributed shared memory control means sends the address of said acquired message buffer and said message to said receiver's side processor module specified by the identifying information obtained by referring to said table in said data memory to write said message into said receiver's side message buffer of the same address shared with said acquired message buffer.

11. The method of claim 9, wherein the identifying information of said sender's side processor module and the identifying information of said receiver's side processor module of said each pair defined by each of said shared addresses are defined in different bit positions of said each shared address.

12. The method of claim 9, wherein each of said communication areas of said distributed shared memory of said each processor module includes a control area for storing control data which controls the transfer of said message, said method further comprising the following steps:

f) said sender's side distributed shared memory control means extracts the identifying information of said receiver's side processor module on the basis of the address of said control area and transfers the address of said control area and write data to said receiver's side processor module;

g) said receiver's side distributed shared memory control means copies said control data to the control area of said receiver's side distributed shared memory which has its address shared with said sender's side control area, on the basis of the address of said sender's side control area and said write data;

h) said receiver's side processor module reads out said control data from said receiver's side control area, recognizes the contents of control on said message, executes the corresponding process and writes response control data in said receiver's side control area;

i) said receiver's side distributed shared control means takes out the identifying information of said sender's side processor module on the basis of the address of said receiver's side control area and transfers the address of said receiver's side control area and write data on said response control data to said sender's side processor module;

j) said senders side distributed shared memory control means copies said control data to said sender's side control area of said sender's side distributed shared memory which has its address shared with said receiver's side control area, on the basis of the address of said receiver's side control area and said response control data received from said receiver's side distributed shared memory control means; and k) said senders side processor module reads out said response control data from said sender's side control area and recognizes the results of processing at the receiver's side, thereby implementing a bidirectional communication between said processor modules.

13. The method of claim 12, wherein said sender's side and receiver's side control areas each includes a descriptor ring area for writing thereinto the address of said message buffer where said message to be transferred is written and enqueue data indicating the transfer of the process execution right from said sender's side to said receiver's side; said step f) includes a step wherein said sender's side distributed shared memory control means writes said enqueue data in said descriptor ring area to cause it to copy said enqueue data to said receiver's side descriptor ring area having its address shared with said sender's side descriptor ring area; and said step i) includes a step wherein dequeue data indicating the return of the process execution right from said receiver's side to said sender's side is written in said receiver's side descriptor ring area to cause it to copy said dequeue data to said sender's side descriptor ring area having its address shared with said receiver's side descriptor ring area.

14. The method of claim 12, wherein said control area of each of said communication areas includes a message buffer management map area corresponding to one of said message buffers; said step a) includes a step wherein said sender's side distributed shared memory control means acquires a vacant one of said message buffers and writes data indicating the occupied state of said acquired message buffer in the corresponding message buffer management map area to cause it to copy said occupied state data to the message buffer management map area of said receiver's side distributed shared memory which has its address shared with said sender's side message buffer management map area; and said step i) includes a step wherein when an application object at said receiver's side completes the readout of said message from said receiver's side message buffer, said receiver's side distributed shared memory control means writes data indicating the vacant state of said receiver's side message buffer in the corresponding message buffer management map area to cause it to copy said vacant state data to the message buffer management map area of said sender's side distributed shared memory which has its address shared with said receiver's side message buffer management map area.

15. The method of claim 9, wherein said distributed shared memory of said each processor module has a processing request area exclusively for writing a processing request for each of said processor modules, and said processing request area for said processor module to which said distributed shared memory belongs has a FIFO structure;

said method further comprising the steps:

wherein when said plurality of sender's side processor modules send processing requests to one of said receiver's side processor modules, said sender's side processor modules each write processing request data in an area on said sender's side distributed shared memory for writing processing requests to said one receiver's side processor module;

wherein said each sender's side distributed shared memory control means takes out the identifying information of said receiver's side processor module on the basis of the address of said processing request area and transfers said processing revest area address and write data to said one receiver's side processor module;

wherein, on the basis of said processing request are address and said write data transferred thereto, said receiver's side distributed shared memory control means writes said processing request data in said processing request area of said FIFO structure which has its address shared with said processing request area at said sender's side, thereby storing in said FIFO-structured processing request area a plurality of pieces of processing request data in order of arrival; and wherein said one receiver's side processor module detects said processing requests by reading out said plurality of pieces of processing request data from said FIFO-structured processing request area on said receiver's side distributed shared memory in a sequential order.

16. The method of claim 9, 12, or 15, wherein said each processor module further comprises memory protection means including: memory capability storage means for storing the access right for said each message buffer of said distributed shared memory; current capability storage means for storing access right information for an application object being executed in said each processor module; and capability comparison means for comparing the contents of said memory capability storage means and said current capability storage means to decide whether access to said each message buffer is legal; when a sender object which is executed by one of said processor modules transfers a message to a receiver application object which is executed by a different one of said processor modules, said method performs the steps:

wherein said receiver's side processor module acquires a sender's side message buffer on said distributed shared memory in said sender's side processor module and sets said access right information in said current capability storage means and said memory capability storage means in said sender's side processor module corresponding to said sender's side message buffer, and upon each occurrence of memory access from a processor in said sender's side processor module to said sender's side message buffer on said distributed shared memory thereof, said capability comparison means compares the contents of said memory capability storage means and said current capability storage means to make a check to determine if said memory access is legal; and wherein when the message written in said sender's side message buffer is transferred to said distributed shared memory of said receiver's side processor module, said receiver's side processor module sets said access right information in said current capability storage means and said memory capability storage means corresponding to said receiver's side message buffer, and upon each occurrence of memory access from said processor in said receiver's side processor module to said receiver's side message buffer on said receiver's side distributed shared memory, said capability comparison means compares the contents of said memory capability storage means and said current capability storage means to make a check to determine if said memory access is legal.

17. The method of claim 16, wherein when a sender application object which is executed by one of said sender's side processor modules transfers a message to a receiver application object which is executed by a different one of said processor modules, said method performs the steps:

wherein said sender's side processor module transfers said access right information from said sender's side to said receiver's side while holding it in one of a message buffer and message control area on said sender's side distributed shared memory; and wherein said receiver's side processor module receives said access right information from said sender's side by reading it out from one of a message buffer and message control area on said receiver's side distributed shared memory corresponding to said one of the message buffer and the message control area on said sender's side distributed shared memory.

18. The method of claim 9, wherein when said sender's side processor module and said receiver's side processor module are the same, said receiver's side processor module reads out a message directly from said sender's side processor module to thereby implement message communication in the same processor module.

19. The method of claim 18, wherein said each communication area of said distributed shared memory of said each processor module includes a descriptor ring area in which the address of said message buffer for writing a message to be transferred and execution right information specifying the execution right for processing by said sender's side and receiver's side processor modules are stored in correspondence with each other, said method further comprising the step:

wherein said receiver's side processor module reads out control data directly from said sender's side control area, recognizes the contents of message control, executes the corresponding process and writes response control data in said sender's side control area, and said sender's side processor module reads out said response control data from said sender's side control area and recognizes the result of processing at the receiver's side, thereby implementing a bidirectional communication in the same processor module.

20. The method of claim 18, wherein said control area of said each communication area includes a message buffer management map area corresponding to each of said message buffers; said step a) includes a step wherein said sender's side distributed shared memory control means acquires a vacant one of said message buffers and writes data indicating the occupied state of said acquired message buffer in the corresponding message buffer management map area; and another step is included wherein when an application object at said sender's side completes the read out of said message from said receiver's side message buffer, said receiver's side distributed shared memory control means writes data indicating the vacant state of said receiver's side message buffer in the corresponding message buffer management map area.

21. The method of claim 18, wherein said distributed shared memory of said each processor module has a processing request area exclusively for writing a processing request for each of said processor modules, and said processing request area for said processor module to which said distributed shared memory belongs has a FIFO structure;

said method further comprising the steps:

wherein when said plurality of sender's side processor modules send processing requests to one of said receiver's side processor modules, each of said sender's side processor modules writes processing request data in said processing request area on the sender's side distributed shared memory destined for said receiver's side processor module thereby storing in said FIFO structured processing request area of said receiver's side distributed shared memory a plurality of pieces of processing request data in order of arrival; and wherein said one receiver's side processor module detects said processing requests by reading out said plurality of pieces of processing request data from said FIFO-structured processing request area on said receiver's side distributed shared memory in a sequential order.

22. The method of claim 9, wherein said receiver's side processor module is a sending relay processor having a network adaptor connected to another multiprocessor system via a communication network, said method further comprising the steps:

f) wherein when the identifying information of a receiver object contained in said received message is identifying information of an application object belonging to said another processor system, said sending relay processor module enqueues an adaptor sending descriptor for said received message;

g) wherein said network adaptor detects said enqueued adaptor sending descriptor, reads out said message from said message buffer of said relay processor module and provides it on said communication network, using as its destination the identifying information of said receiver object indicated in said message;

h) wherein a network adaptor of a third processor module of the multiprocessor system specified by said identifying information of said receiver object stores said received message in a local buffer and enqueues an adaptor receiving descriptor; and i) wherein, upon detection of said enqueued adaptor receiving descriptor, said third processor module makes a check to determine if the destination of said message stored in said message buffer is said third processor module itself, and processes said message in accordance with the result of said check.

23. The method of claim 22, wherein said step i) is a step wherein when the destination of said message is another processor module other than said third one, a vacant message buffer in the distributed shared memory corresponding to said destination processor module is acquired, said message is written in said vacant message buffer, and at the same time, said message is copied to the corresponding message buffer of said distributed shared memory of said destination processor module by said distributed shared memory control means.

24. The method of claim 9, wherein said receiver's side processor module is a sending relay processor module having a network adaptor connected to another multiprocessor system via a communication network, said method further comprising the steps:

f) wherein when the identifying information of a receiver object contained in said received message is identifying information of another multiprocessor system, said sending relay processor module enqueues an adaptor sending descriptor for said received message;

g) wherein said network adaptor detects said enqueued adaptor sending descriptor, reads out said message from said message buffer and provides it onto said communication network, using as its destination the identifying information of said receiver object indicated in said received message; and h) wherein a network adaptor of a third processor module of the multiprocessor system specified by said identifying information of said receiver object writes said message directly into a communication area in the distributed shared memory corresponding to the processor module of the destination specified by the identifying information of said receiver object indicated in said message.

\* \* \* \* \*